United States Patent [19]
Terasawa

[11] Patent Number: 6,084,721
[45] Date of Patent: Jul. 4, 2000

[54] ZOOM LENS

[75] Inventor: Chiaki Terasawa, Utsunomiya, Japan

[73] Assignee: Canon Kabushiki Kaisha, Tokyo, Japan

[21] Appl. No.: 09/201,795

[22] Filed: Dec. 1, 1998

[30] Foreign Application Priority Data

Dec. 1, 1997 [JP] Japan .................................. 9-345860

[51] Int. Cl.$^7$ .............................................. G02B 15/14
[52] U.S. Cl. .......................... 359/684; 359/686; 359/687; 359/688
[58] Field of Search ........................... 359/684, 686–688, 359/676, 683

[56] References Cited

U.S. PATENT DOCUMENTS

| | | | |
|---|---|---|---|
| 5,136,431 | 8/1992 | Terasawa et al. | 359/684 |
| 5,179,472 | 1/1993 | Ohno et al. | 359/687 |
| 5,191,475 | 3/1993 | Terasawa et al. | 359/684 |
| 5,636,060 | 6/1997 | Suzuki | 359/688 |
| 5,675,439 | 10/1997 | Nakatsuji | 359/384 |
| 5,737,128 | 4/1998 | Usui | 359/686 |
| 5,760,967 | 6/1998 | Terasawa et al. | 359/684 |
| 5,790,316 | 8/1998 | Terasawa et al. | 359/687 |
| 5,815,323 | 9/1998 | Abe et al. | 359/688 |
| 5,917,658 | 6/1999 | Yamanashi | 359/676 |

FOREIGN PATENT DOCUMENTS

| | | |
|---|---|---|
| 54-127322 | 10/1979 | Japan . |
| 59-74524 | 4/1984 | Japan . |
| 7-13075 | 1/1995 | Japan . |

*Primary Examiner*—Georgia Epps
*Assistant Examiner*—David N. Spector
*Attorney, Agent, or Firm*—Fitzpatrick, Cella, Harper & Scinto

[57] ABSTRACT

A zoom lens has, in succession from the object side, a first lens unit fixed during a focal length change and having positive refractive power, a second lens unit moved along the optical axis thereof during the focal length change, a third lens unit for correcting the fluctuation of the image plane resulting from the focal length change, and a fourth lens unit fixed during the focal length change and having positive refractive power. The second lens unit has a lens subunit of negative refractive power and a lens subunit of positive refractive power. The lens subunits are moved at different speeds during the focal length change, and the conditions of the lens are satisfied to correct the fluctuations in aberration during the focal length change.

7 Claims, 29 Drawing Sheets

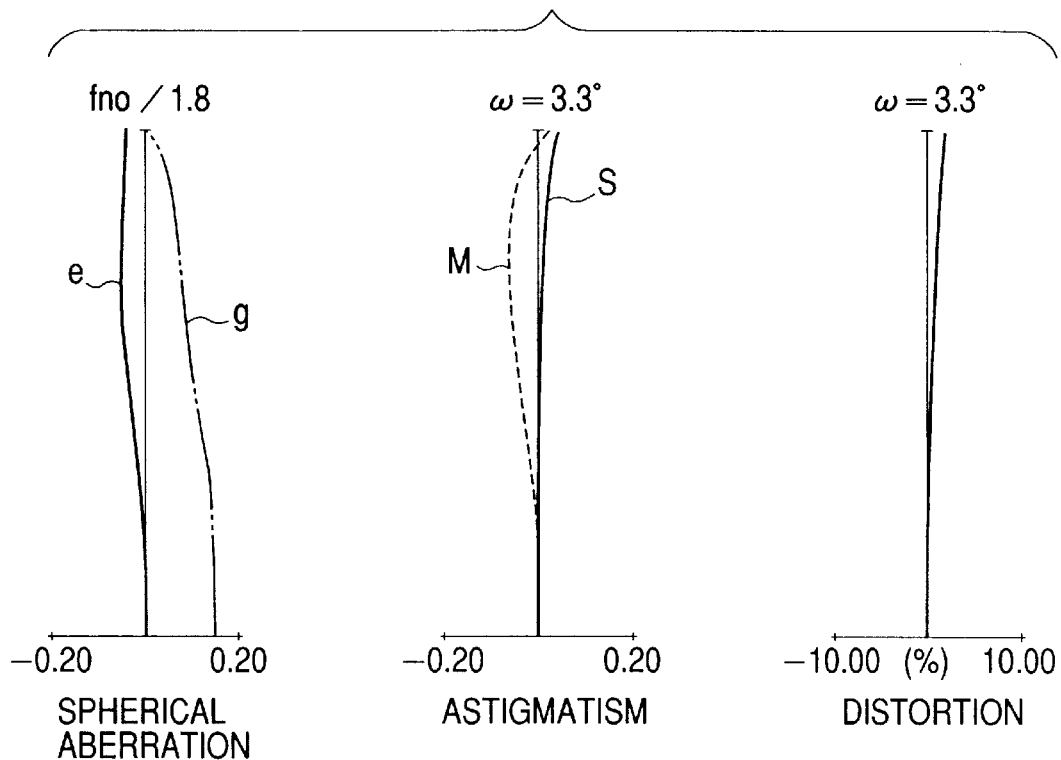
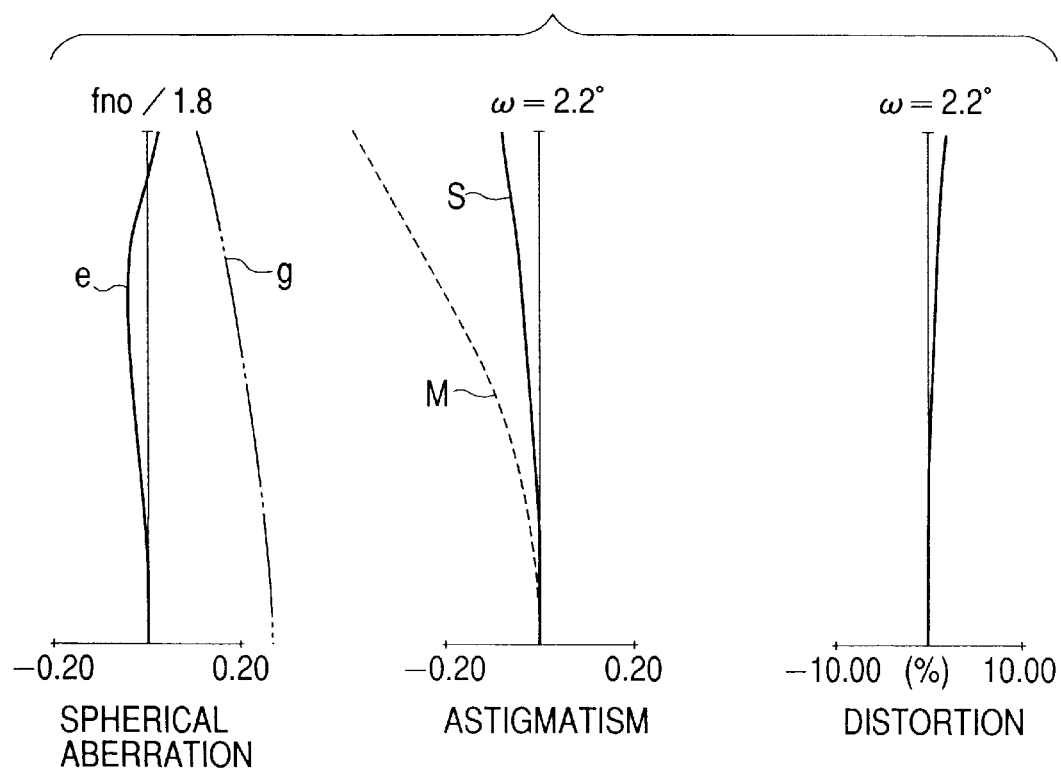

FLUCTUATION IN SPHERICAL ABERRATION WITH RESPECT TO PARAXIAL IMAGE SURFACE

WIDE ANGLE END: fw fwm fm

VICINITY OF F-DROP: fd

TELEPHOTO END: ft

ZOOM LENS

BACKGROUND OF THE INVENTION

1. Field of the Invention

This invention relates to a zoom lens, and particularly to a so-called four-unit zoom lens in which a second unit for focal length change is comprised of two lens units exhibiting a floating operation in which the amounts of movement resulting from a focal length change are made to differ from each other and is utilized to correct the fluctuation of aberrations resulting from the focal length change. The F number at the wide angle end is as great as 1.75, and the variable power ratio is as high as 16. The zoom lens to which the current invention is directed has good optical performance over an entire variable power range and is suitable for a television camera, a photographic camera and a video camera.

2. Related Background Art

Zoom lenses having a great aperture, high variable power and high optical performance have heretofore been required for television cameras, photographic cameras and video cameras. Among these, in color television cameras for broadcasting, importance is attached to operability and mobility, and in response to such requirements, a CCD (solid state image pickup device), having achieved as high as two millions of pixels per ⅔ inch, has recently been announced as an image pickup device. This CCD has substantially uniform resolving power over the entire image pickup range and therefore, it is required of a zoom lens using it that the resolving power be substantially uniform from the center of the image field to the periphery of the image field.

Of zoom lenses, a so-called four-unit zoom lens comprising, in succession from the object side, four lens units, i.e., a first lens unit of positive refractive power for focusing, a second lens unit of negative refractive power for focal length change, a third lens unit of positive or negative refractive power for correcting image plane fluctuating with a focal length change, and a fourth lens unit of positive refractive power for imaging, relatively easily achieve higher variable power and a greater aperture ratio and therefore are often used in color television cameras for broadcasting.

Of four-unit zoom lenses, a four-unit zoom lens having an F number of the order of 1.6 to 1.8, and high variable power ratio of the order of 13 is proposed, for example, in Japanese Laid-Open Patent Application No. 54-127322. Also, a four-unit zoom lens in which a second lens unit for focal length change is divided into two lens units of negative refractive power and in which during a focal length change, the spacing between these two lens units is changed to thereby correct any aberration fluctuation resulting from the focal length change is proposed, for example, in Japanese Laid-Open Patent Application No. 7-13075.

To obtain a great aperture ratio (an F number 1.7 or greater) and a high variable power ratio (a variable power ratio 13 or greater) and high optical performance over an entire variable power range in a zoom lens, it is necessary to appropriately set the refractive power and lens construction of each lens unit.

Generally, to obtain small aberration fluctuation and high optical performance over an entire variable power range, it becomes necessary to increase, for example, the number of lenses in each lens unit to thereby increase the degree of freedom in aberration correction. Therefore, an attempt to produce a zoom lens of a great aperture ratio and a high variable power ratio unavoidably gives rise to the problem that the number of lenses is increased and the entire lens system becomes bulky.

Also, regarding imaging performance, the fluctuation of the point at the center of the image field at which the image contrast is best, i.e., the so-called best image plane, resulting from a focal length change poses a problem. This is attributable chiefly to the fluctuation of spherical aberration resulting from a focal length change.

Generally, the fluctuation of spherical aberration resulting from a focal length change, when the zoom ratio is defined as Z and the focal length of the wide angle end is defined as fw, becomes such as shown in FIG. 57 of the accompanying drawings wherein spherical aberration tends to be under (minus) with respect to the Gaussian image plane from the wide angle end to a zoom position $fwm=fw \times Z^{1/4}$ or $fm=fw \times Z^{1/2}$. When the vicinity of the zoom position fwm or fm is passed, the under amount becomes smaller and becomes 0 at a certain zoom position, and now tends to become over (plus). In the vicinity of a zoom position fd at which F drop in which F number becomes greater (the lens system becomes darker) begins, the under amount becomes most over (plus), and when this zoom position is passed, the over amount becomes smaller toward the telephoto end, and becomes substantially 0 at the telephoto end.

FIGS. 58 to 62 are illustrations showing the states when a light beam passes through a lens system from a first lens unit (F) to a third lens unit (C) at the wide angle end fw, the intermediate fwm ($=fw \times Z^{1/4}$ or so), the intermediate fm ($=fw \times Z^{1/2}$), the zoom position fD of F drop and the telephote end ft of a four-unit zoom lens.

As shown in these figures, the incidence height of an on-axis ray onto the compensator C suddenly becomes lower from the wide angle end fw to the focal length $fwm=fw \times Z^{1/4}$ or the zoom position $fm=fw \times Z^{1/2}$. The incidence height becomes higher to the focal length fd near F drop, and becomes lower again at the telephoto end ft due to F drop. On the other hand, the height of the on-axis ray in the variator V gradually becomes higher from the wide angle end fw toward the telephoto side, and becomes highest at the focal length fd near F drop, and becomes lower at the telephoto end ft due to F drop. This can be summed up as shown in Table 1 below.

TABLE 1

| | Zoom Position | | | |
|---|---|---|---|---|
| | wide angle end fw | fwm:fm | fd | telephoto end ft |
| variator V | | ↗ | ↗ | ↘ |
| compensator C | | ↘ | ↗ | ↘ |
| spherical aberration | 0 | under | over | 0 |

↗: The height of the on-axis ray increases.

↘: The height of the on-axis ray decreases.

In the compensator C, basically spherical aberration is under-corrected. When in the relay lens unit, spherical aberration is corrected so as to become substantially 0 at the wide angle end, the influence of the change in the on-axis ray in the compensator C is great at the zoom positions fwm and fm on the wide angle side and the height of the on-axis ray in the compensator C becomes lower relative to the wide angle end and therefore, spherical aberration fluctuates to under. When in the fore lens unit, spherical aberration is corrected so as to become substantially 0 at the telephoto end, the height of the on-axis ray in the variator V and the compensator C becomes higher at the zoom position fd of F drop relative to the telephoto end and therefore, the high-order component of spherical aberration fluctuates to over.

On the other hand, even when the third lens unit (compensator) has a positive refractive power, the fluctuation of spherical aberration resulting from a focal length change is similar to that when the third lens unit (compensator) has a negative refractive power, and is summed up in Table 2 below.

TABLE 2

| | Zoom Position | | | |
|---|---|---|---|---|
| | wide angle end fw | fwm:fm | fd | telephoto end ft |
| variator V | | ↗ | ↗ | ↘ |
| compensator C | | ↗ | ↗ | ↘ |
| spherical aberration | 0 | under | over | 0 |

↗: The height of the on-axis ray increases.

↘: The height of the on-axis ray decreases.

It differs from the case where the compensator is of negative refractive power (not shown) in that the light beam becomes convergent from the compensator to the relay lens unit, but the aberration corrected situations of the variator and compensator conforming to the focal length change are similar.

When in the relay lens unit, spherical aberration is corrected so as to become substantially 0 at the wide angle end, basically spherical aberration is under-corrected in the compensator and therefore, the influence of the change in the on-axis ray in the compensator is great at the zoom positions fwm and fm on the wide angle side, and the height of the on-axis ray in the compensator becomes high relative to the wide angle end fw and therefore, spherical aberration fluctuates to under. When in the fore lens, spherical aberration is corrected so as to become substantially 0 at the telephoto end, the height of the on-axis ray in the variator of particularly strong negative refractive power relative to the telephoto end becomes high at the zoom position fd of F drop and at this time, in the compensator as well, the height of the on-axis ray becomes greatest and due to the influence of the cemented surface of a concave lens used for the aberration correction solely by the compensator, the high-order component of spherical aberration fluctuates to over.

These fluctuations of spherical aberration become more remarkable as the refractive powers of the variator V and the compensator C become greater when the refractive power of the compensator is both positive and negative.

Particularly recently, it has been attempted to strengthen the refractive power of each lens unit and achieve a zoom lens from the desire for compactness and lighter weight and the wider angle of view or higher variable power of the zoom lens. Above all, in the four-unit zoom lens, the refractive powers of the variator, which is a second lens unit, and the compensator, which is a third lens unit, are strengthened and their amounts of movement are decreased to thereby achieve downsizing of the entire zoom lens system and therefore, there has been the tendency that the burden of those movable lens units for aberration correction increases.

Particularly in the case of a zoom lens like a zoom lens for broadcasting of which a high specification and high performance are required, a variator V and a compensator C each are comprised of a combination of at least one negative lens and a positive lens. In addition, a divergence surface for the correction of spherical aberration by a cemented lens is provided or a difference in the refractive index of a medium is provided to correct the aberrations in the interior of each lens unit.

However, the correction of the fluctuation of spherical aberration resulting from a focal length change and high-order chromatic aberration or the like is insufficient and therefore, the number of lenses has been increased or the refractive power of each lens unit has been weakened. Therefore, it has been very difficult to achieve compactness and higher performance of the zoom lens.

In contrast, in the proposition by the aforementioned Japanese Laid-Open Patent Application No. 7-13075, the diameter of the fore lens is made paraxially small and therefore, a second lens unit for focal length change is divided into two lens units of negative refractive power and the spacing therebetween is only changed in conformity with a focal length change and no mention is made about the effect in aberration correction.

SUMMARY OF THE INVENTION

The present invention has as its object the provision of a so-called four-unit zoom lens of a great aperture ratio and a high variable power ratio at the wide angle end having high optical performance over an entire variable power range in which floating is applied to a variator (a second lens unit) for focal length change and elements such as the lens construction and power sharing thereof are appropriately set to thereby well correct aberration fluctuations resulting from a focal length change, particularly the fluctuation of spherical aberration.

The zoom lens of the present invention comprises, in succession from the object side, a first lens unit fixed during a focal length change and having a positive refractive power, a second lens unit moved along the optical axis thereof during the focal length change, a third lens unit for correcting the fluctuation of the image plane resulting from the focal length change, and a fourth lens unit fixed during the focal length change and having a positive refractive power, the second lens unit having a lens subunit of negative refractive power and a lens subunit of positive refractive power, the lens subunits being moved at different speeds during the focal length change. Also, particularly, when the focal lengths of the negative lens subunit and the positive lens subunit are defined as f2A and f2B, respectively, $$7.3 < |f2B/f2A| < 27$$

is satisfied, and when the focal length of the entire system at the wide angle end is defined as fw and the spacings between the principal points of the negative lens subunit and the positive lens subunit at the wide angle end and any zoom position are defined as DW and D, respectively, and the zoom ratio is defined as Z, $$DW < D$$

is satisfied at least at a zoom position Z0 within a zoom range of a focal length fm (=fw×$Z^{1/2}$) from the wide angle end, and when at the zoom position Z0, the sum total of the tertiary (third order) spherical aberration coefficients of the positive lens subunit and the third lens unit is defined as Im and at the zoom position Z0, the negative lens subunit is fixed and the positional relation of the positive lens subunit relative to the negative lens subunit is a state at the wide angle end and the sum total of the tertiary spherical aberration coefficients of the positive lens subunit and the third lens unit, when a case where the fluctuation of the image plane is corrected by the third lens unit is prescribed, is defined as Ip, the condition that $$Im-Ip<0$$

is satisfied.

BRIEF DESCRIPTION OF THE DRAWINGS

FIG. 20 shows the aberrations of Numerical Value Embodiment 2 of the present invention at the focal length fd.

FIG. 21 shows the aberrations of Numerical Value Embodiment 2 of the present invention at the focal length ft.

DESCRIPTION OF THE PREFERRED EMBODIMENTS

FIGS. 1 to 9 are cross-sectional views of the lenses of Numerical Value Embodiments 1 to 9 of the present invention which will be described later at a certain zoom position.

Figure 10:
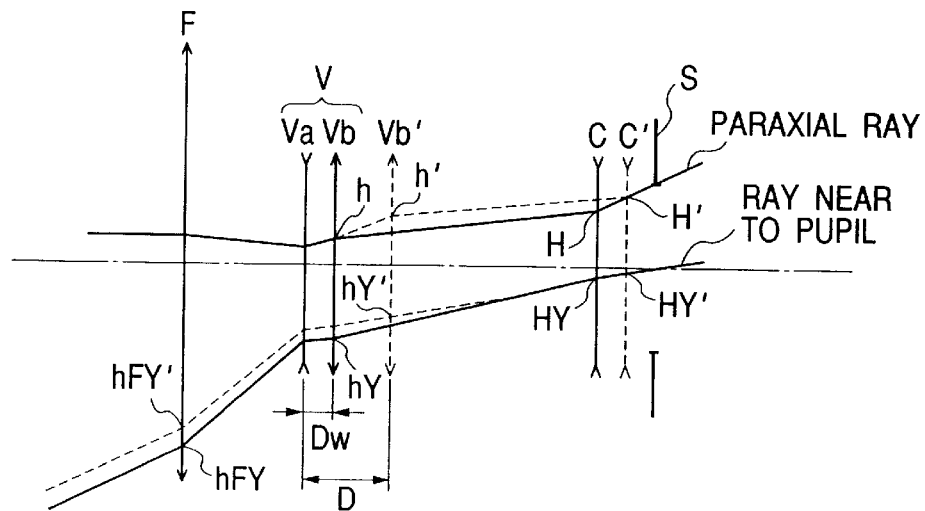
FIG. 10 is an illustration of the paraxial refractive power arrangement of the zoom lens of the present invention.
Figure 11:
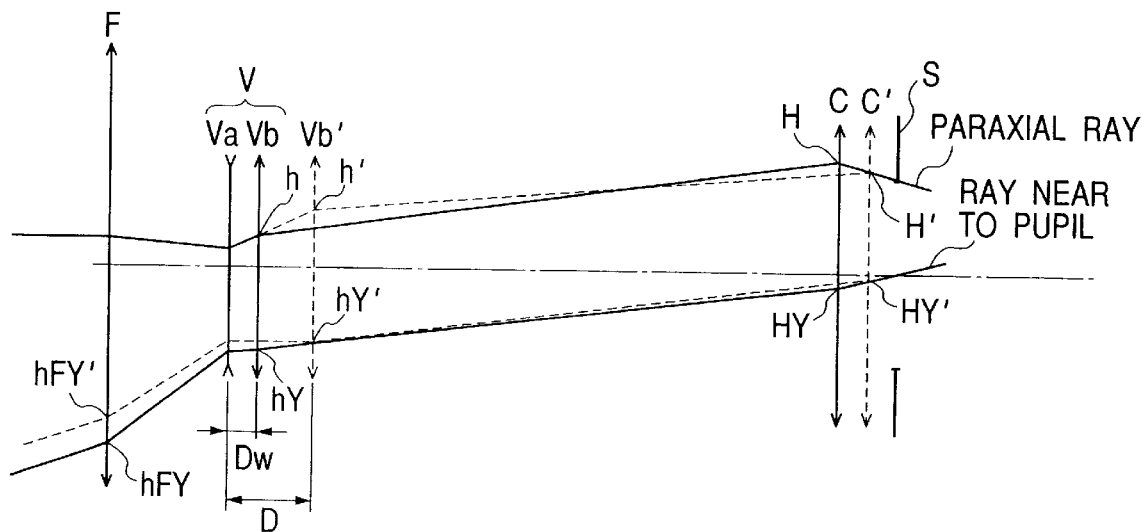
FIG. 11 is an illustration of the paraxial refractive power arrangement of the zoom lens of the present invention.
Figure 12:
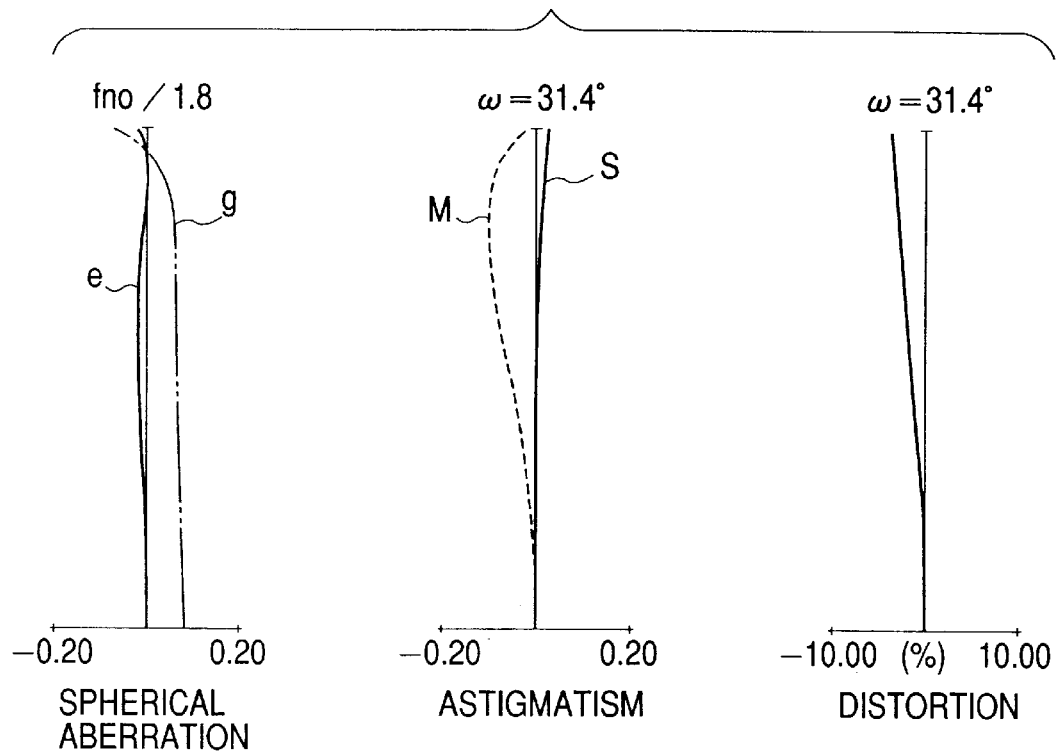
FIG. 12 shows the aberrations of Numerical Value Embodiment 1 of the present invention at a focal length fw.
Figure 13:
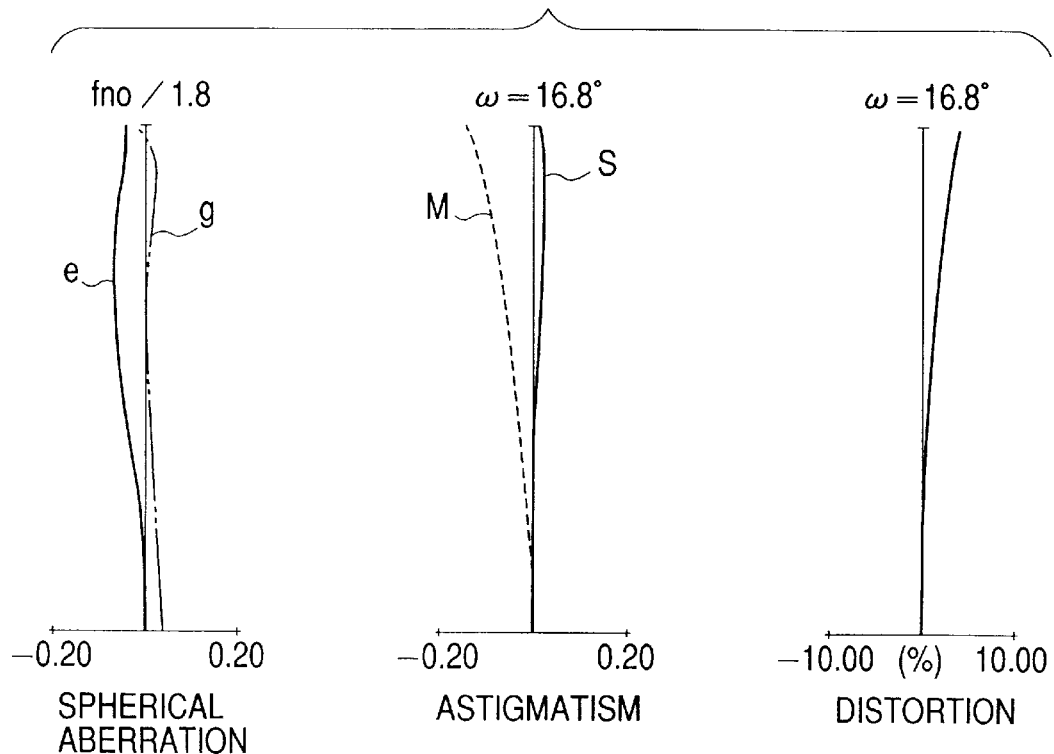
FIG. 13 shows the aberrations of Numerical Value Embodiment 1 of the present invention at a focal length fwm.
Figure 14:
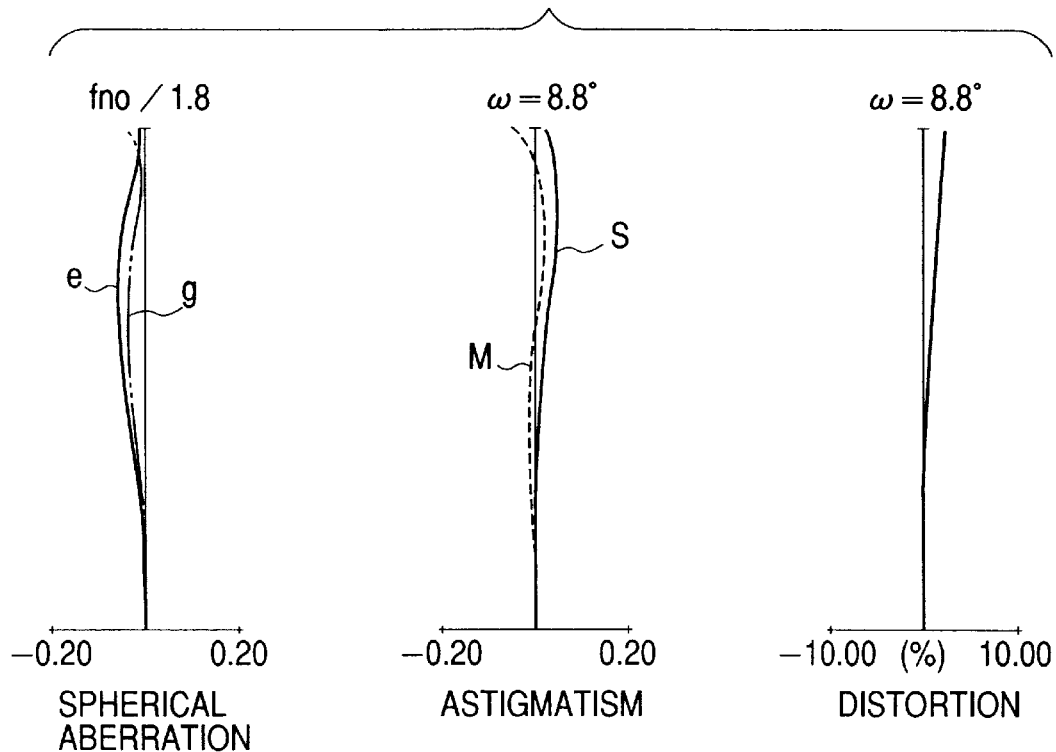
FIG. 14 shows the aberrations of Numerical Value Embodiment 1 of the present invention at a focal length fm.
Figure 15:
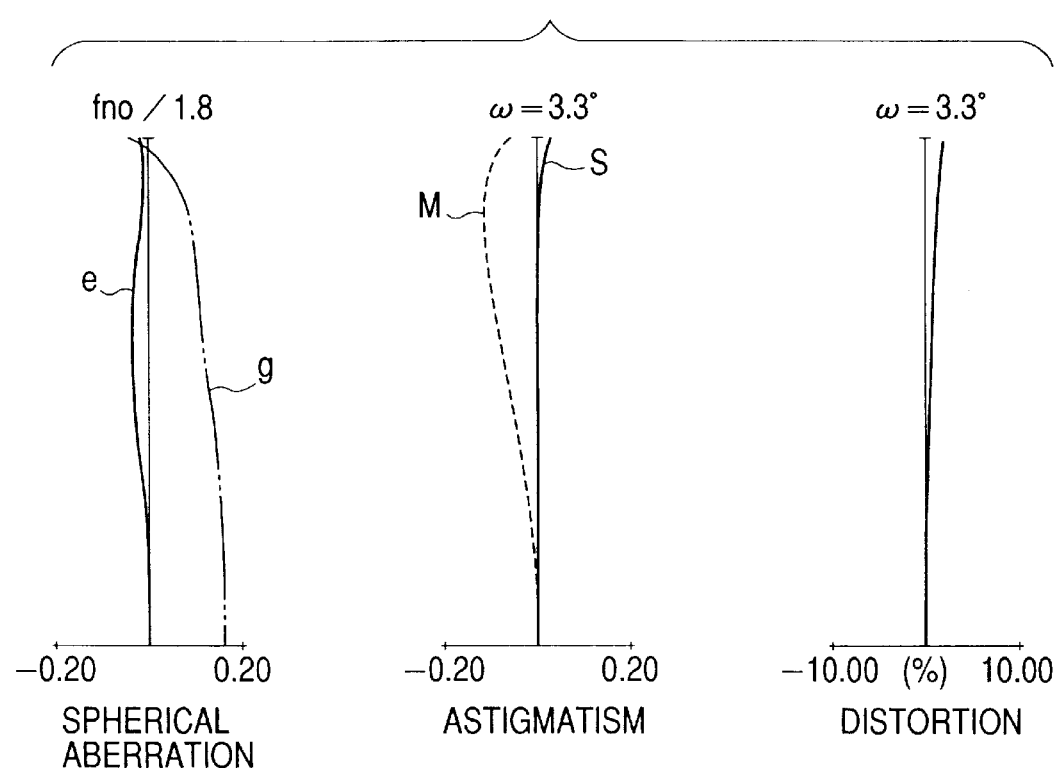
FIG. 15 shows the aberrations of Numerical Value Embodiment 1 of the present invention at a focal length fd.
Figure 16:
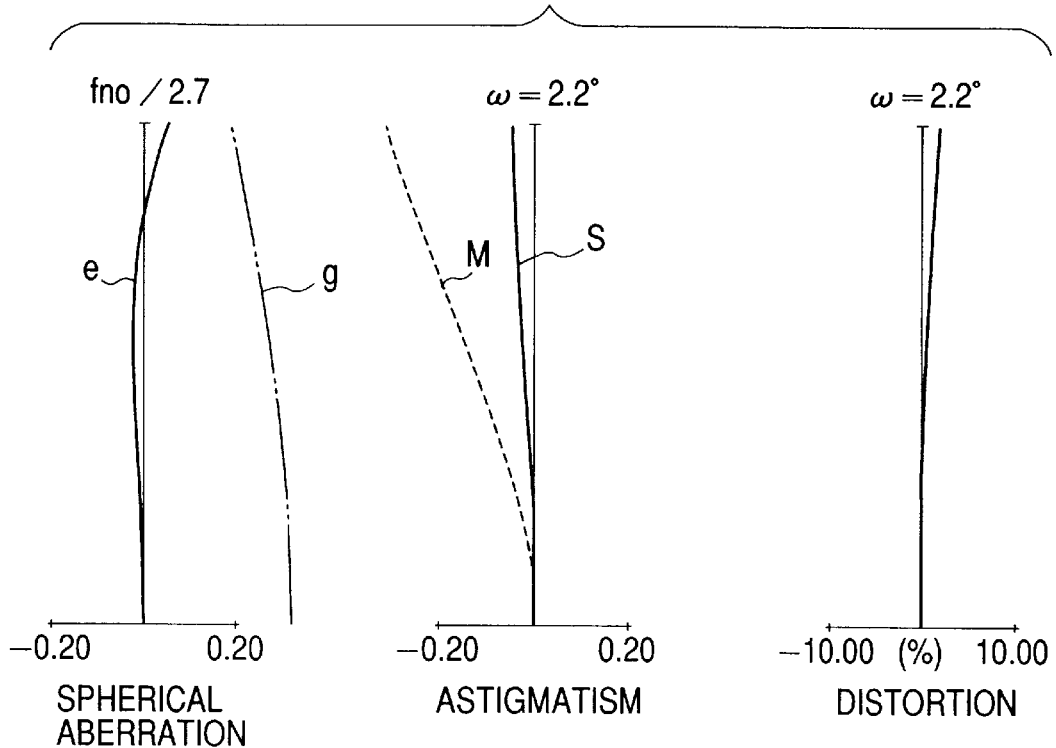
FIG. 16 shows the aberrations of Numerical Value Embodiment 1 of the present invention at a focal length ft.
Figure 17:
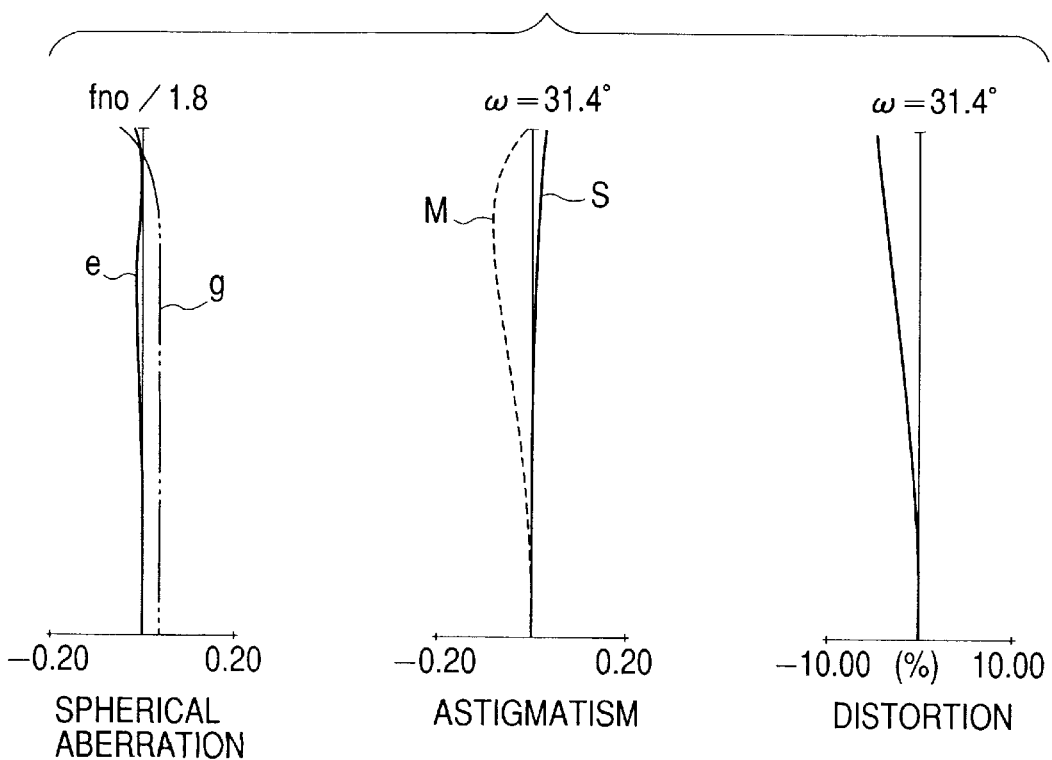
FIG. 17 shows the aberrations of Numerical Value Embodiment 2 of the present invention at the focal length fw.
Figure 18:
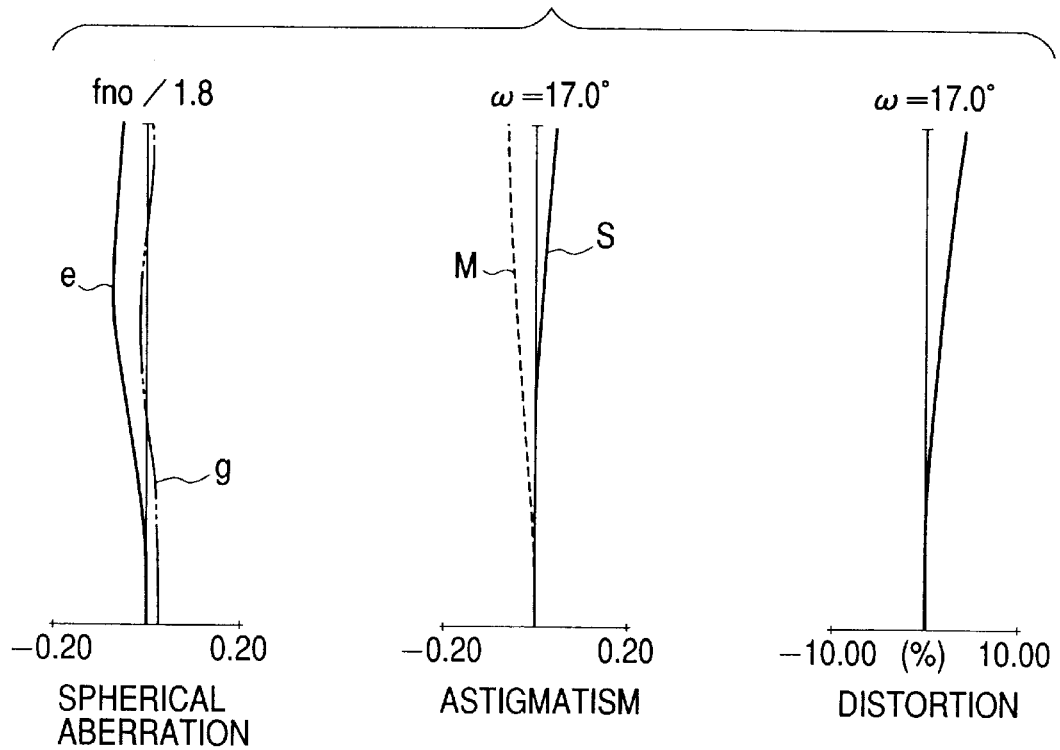
FIG. 18 shows the aberrations of Numerical Value Embodiment 2 of the present invention at the focal length fwm.
Figure 19:
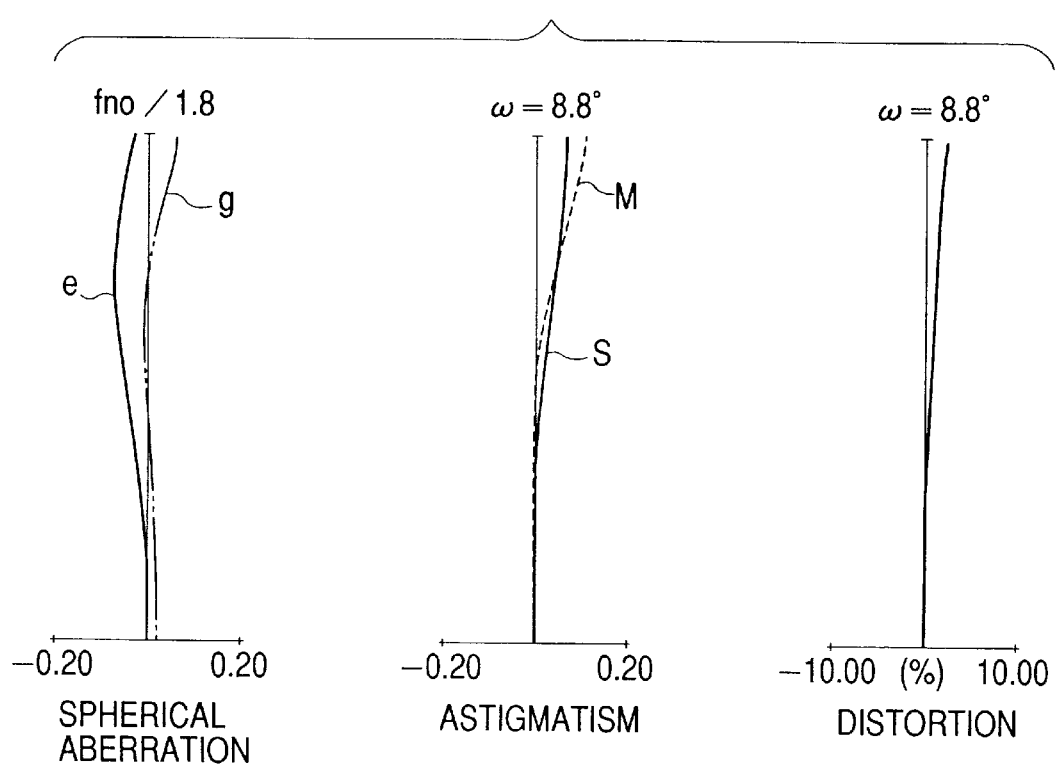
FIG. 19 shows the aberrations of Numerical Value Embodiment 2 of the present invention at the focal length fm.
Figure 22:
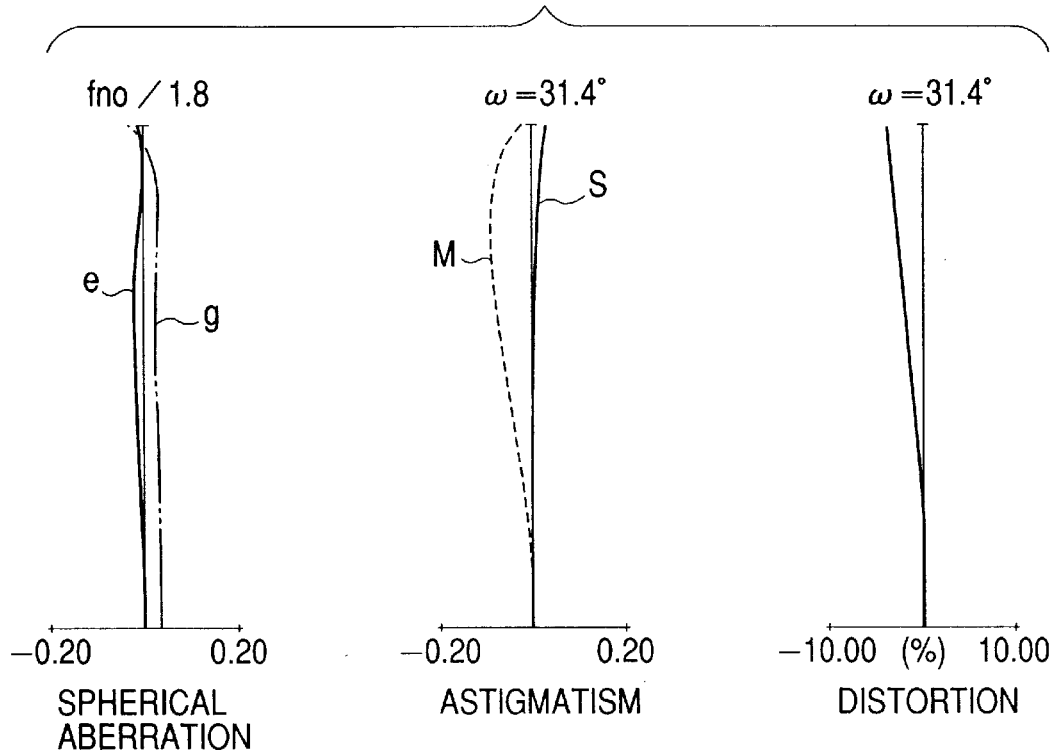
FIG. 22 shows the aberrations of Numerical Value Embodiment 3 of the present invention at the focal length fw.
Figure 23:
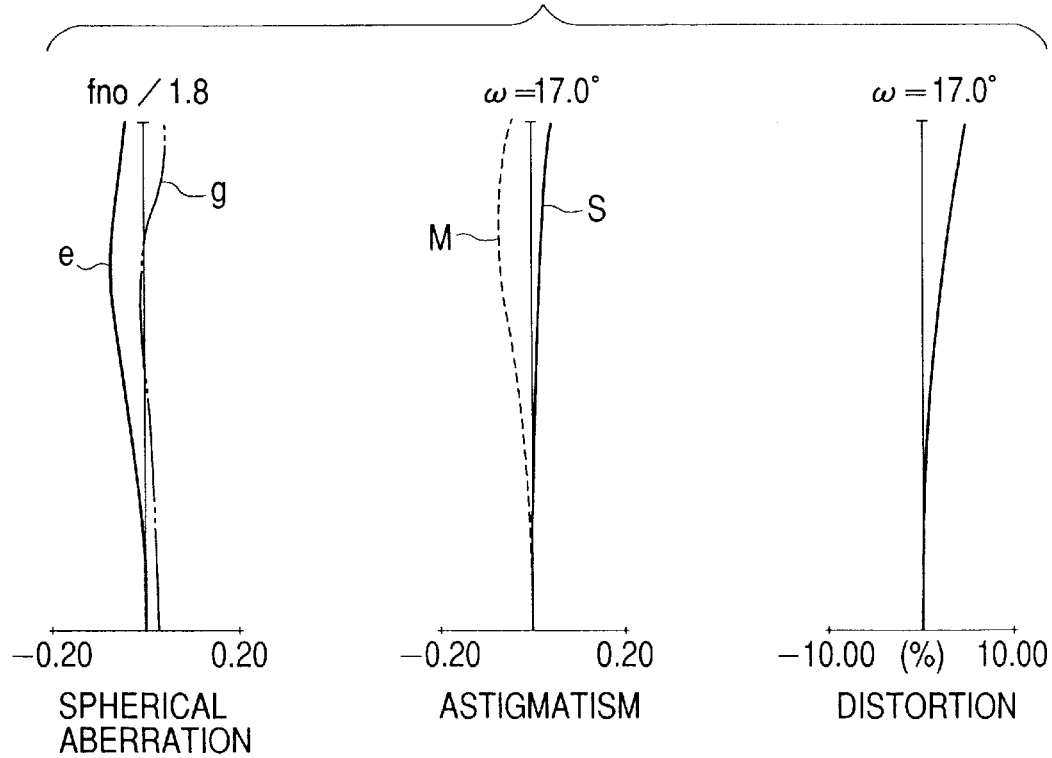
FIG. 23 shows the aberrations of Numerical Value Embodiment 3 of the present invention at the focal length fwm.
Figure 24:
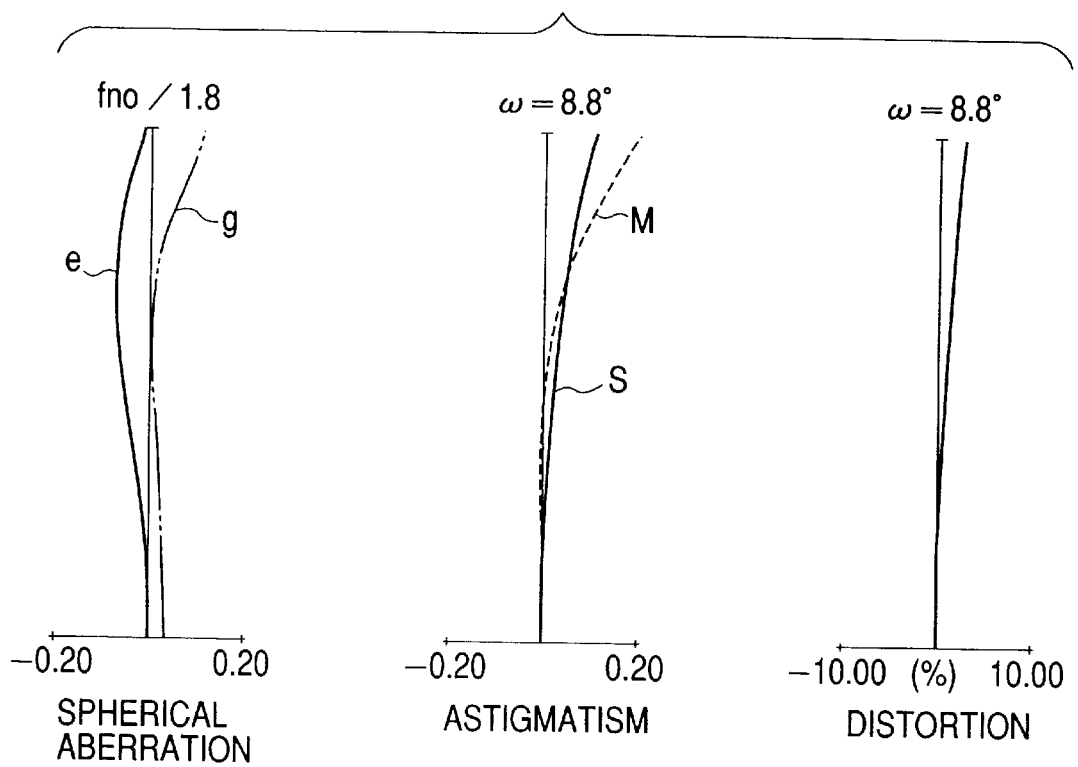
FIG. 24 shows the aberrations of Numerical Value Embodiment 3 of the present invention at the focal length fm.
Figure 25:
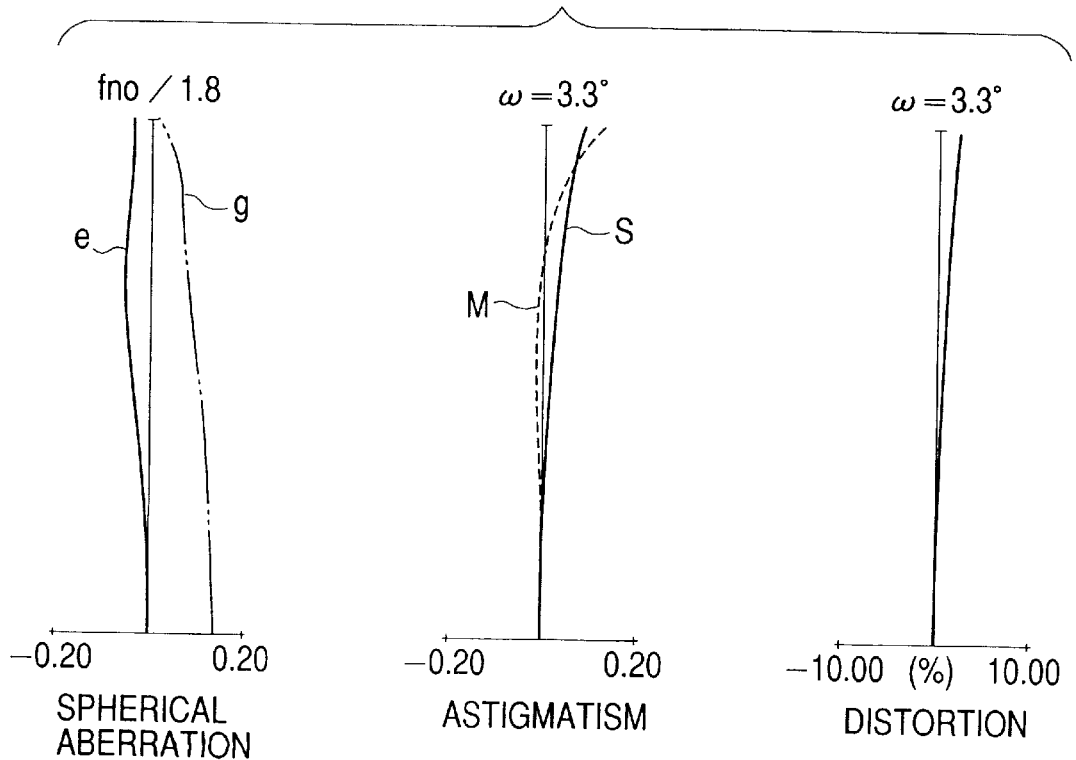
FIG. 25 shows the aberrations of Numerical Value Embodiment 3 of the present invention at the focal length fd.
Figure 26:
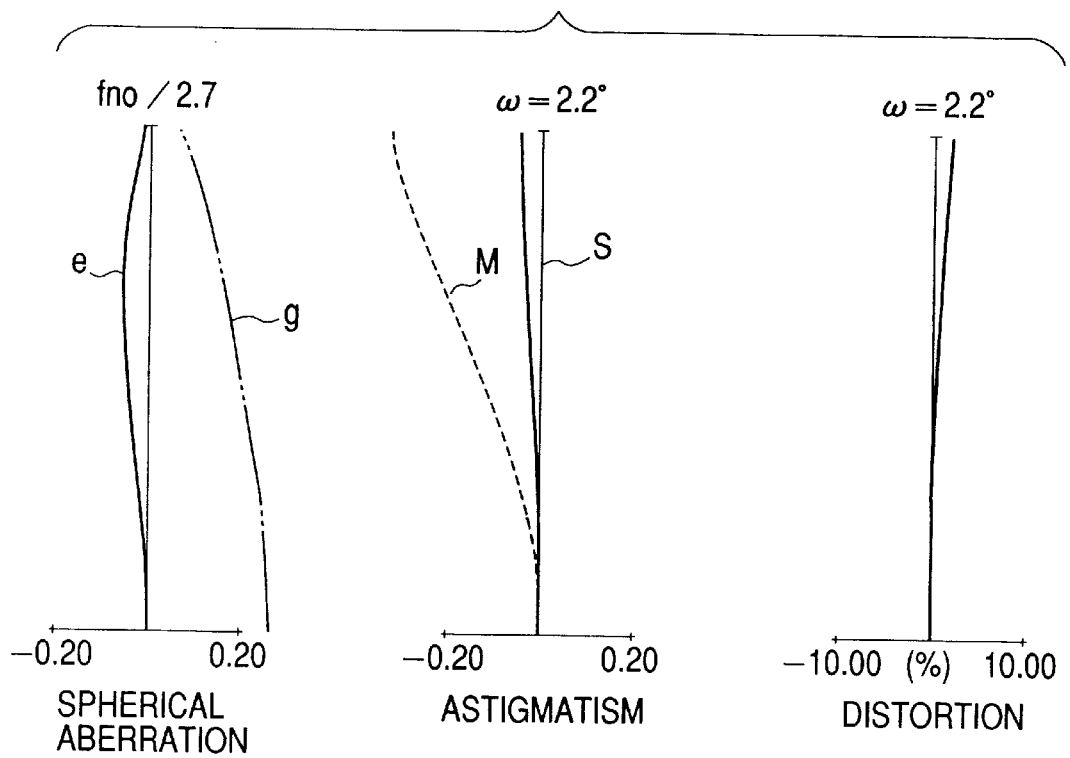
FIG. 26 shows the aberrations of Numerical Value Embodiment 3 of the present invention at the focal length ft.
Figure 27:
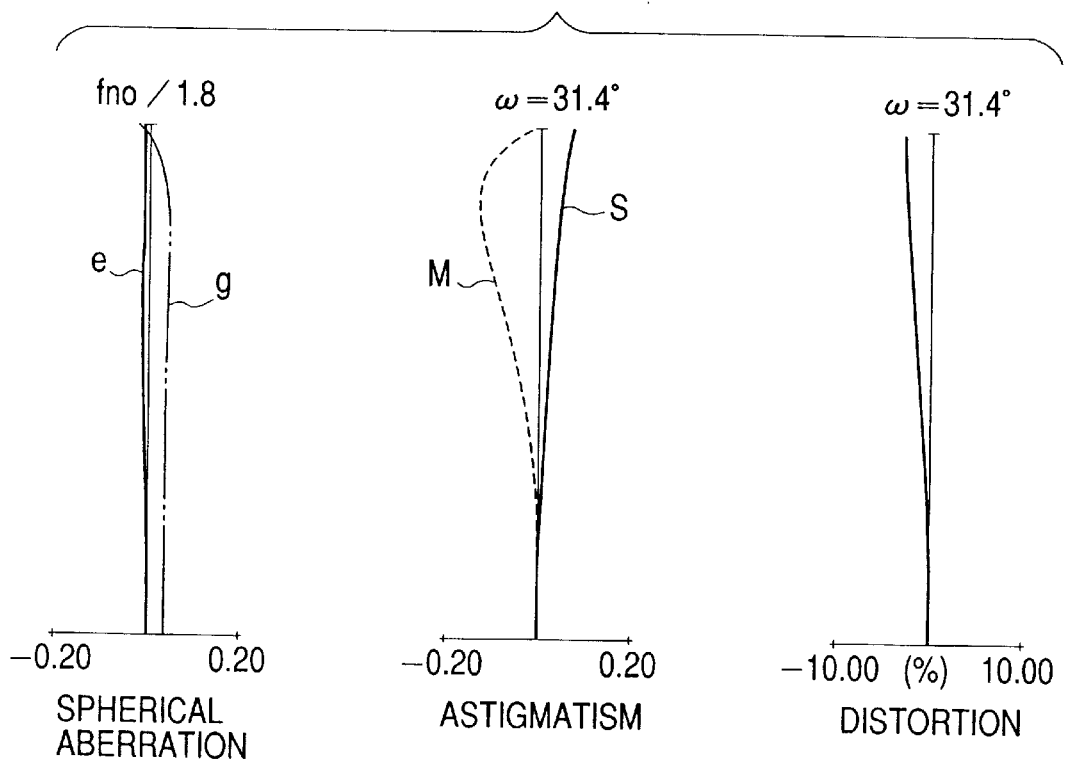
FIG. 27 shows the aberrations of Numerical Value Embodiment 4 of the present invention at the focal length fw.
Figure 28:
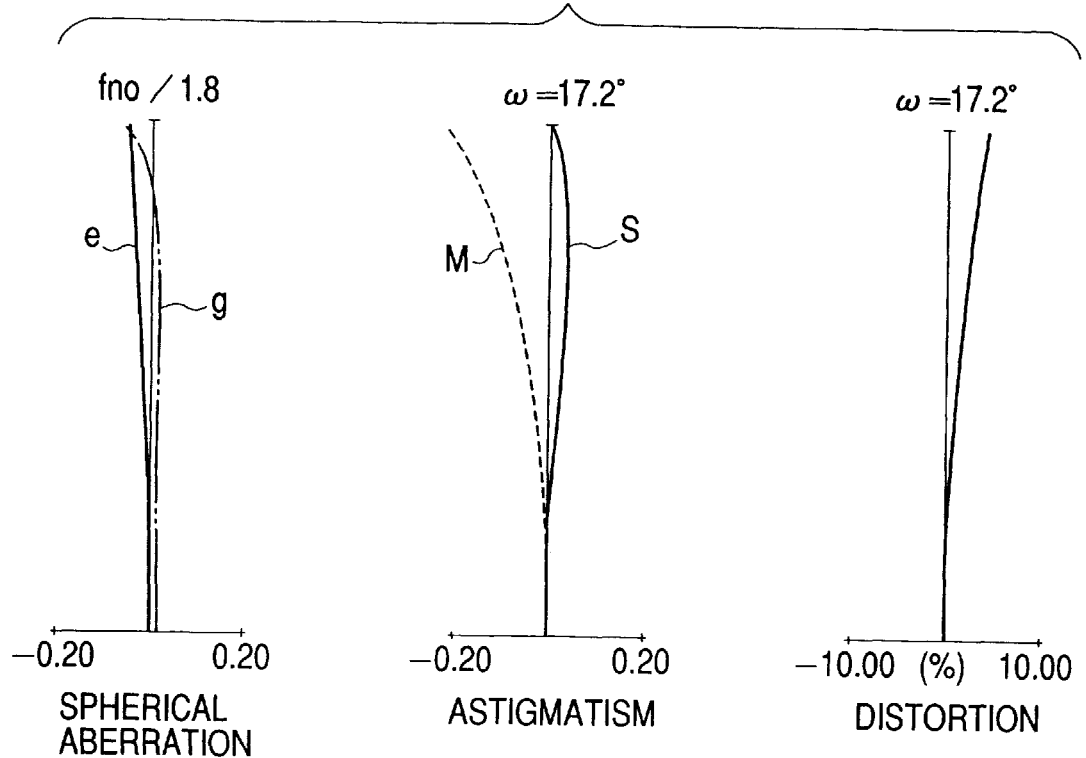
FIG. 28 shows the aberrations of Numerical Value Embodiment 4 of the present invention at the focal length fwm.
Figure 29:
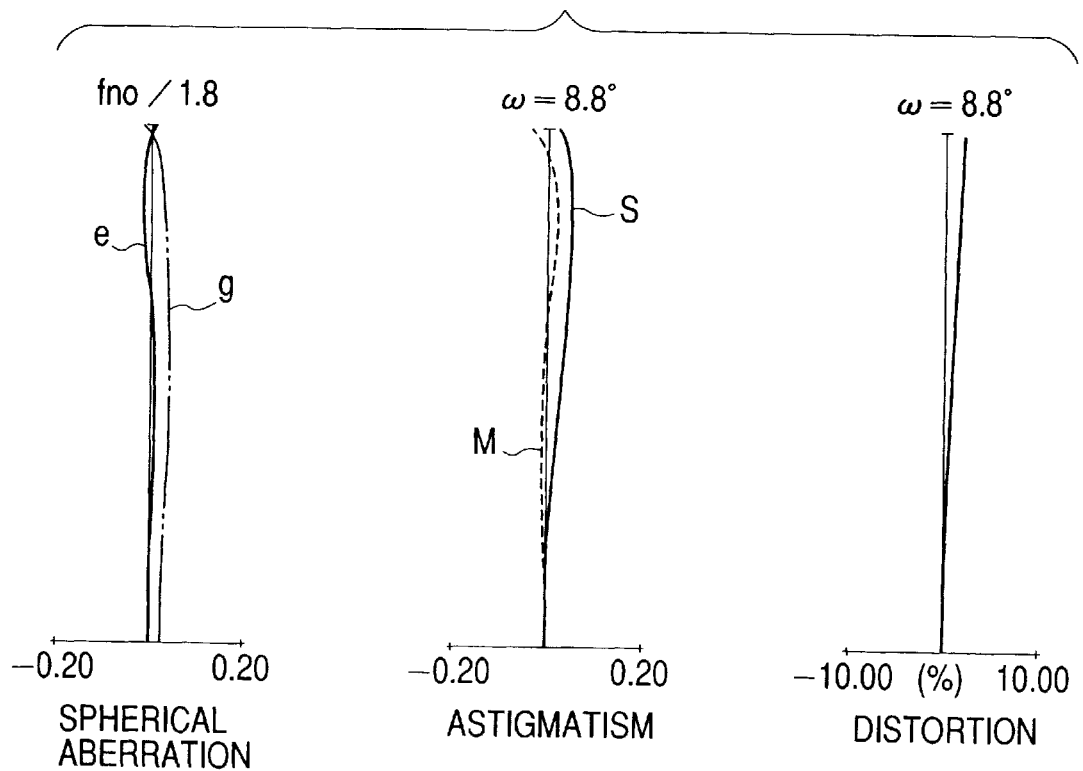
FIG. 29 shows the aberrations of Numerical Value Embodiment 4 of the present invention at the focal length fm.
Figure 30:
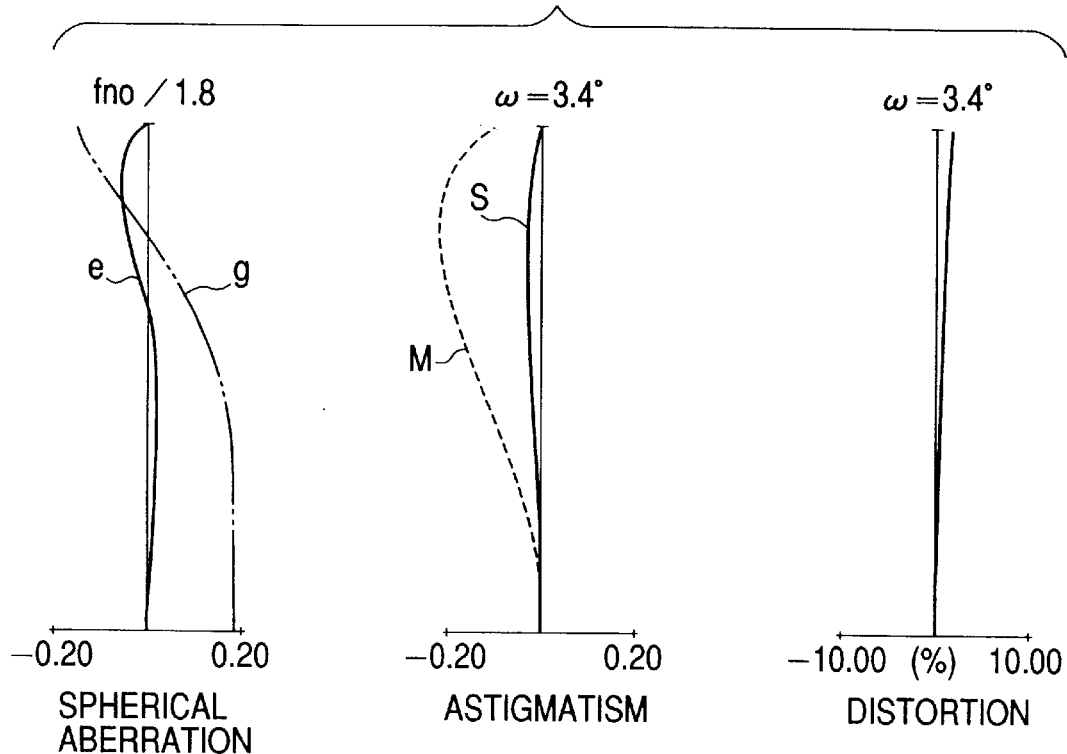
FIG. 30 shows the aberrations of Numerical Value Embodiment 4 of the present invention at the focal length fd.
Figure 31:
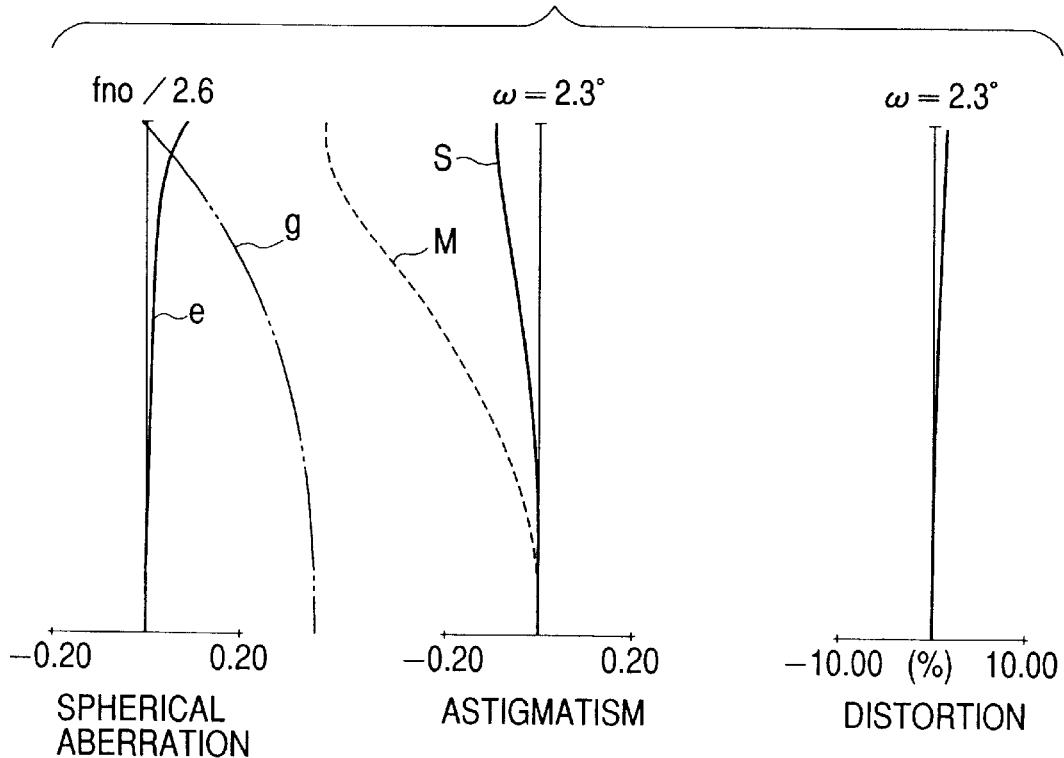
FIG. 31 shows the aberrations of Numerical Value Embodiment 4 of the present invention at the focal length ft.
Figure 32:
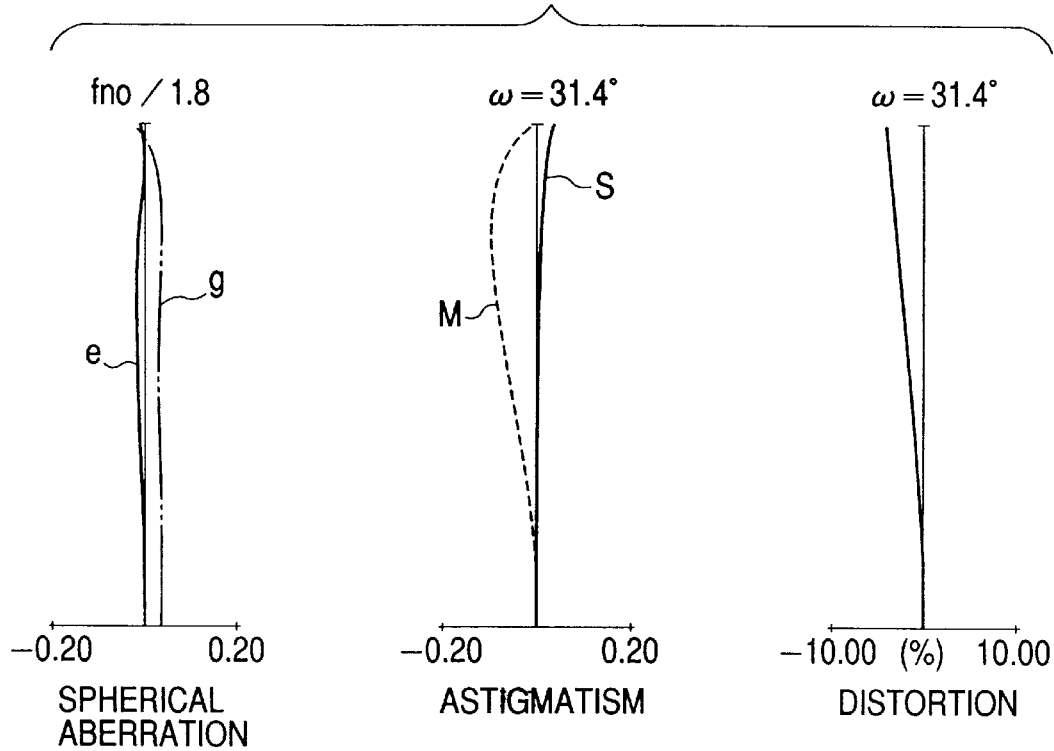
FIG. 32 shows the aberrations of Numerical Value Embodiment 5 of the present invention at the focal length fw.
Figure 33:
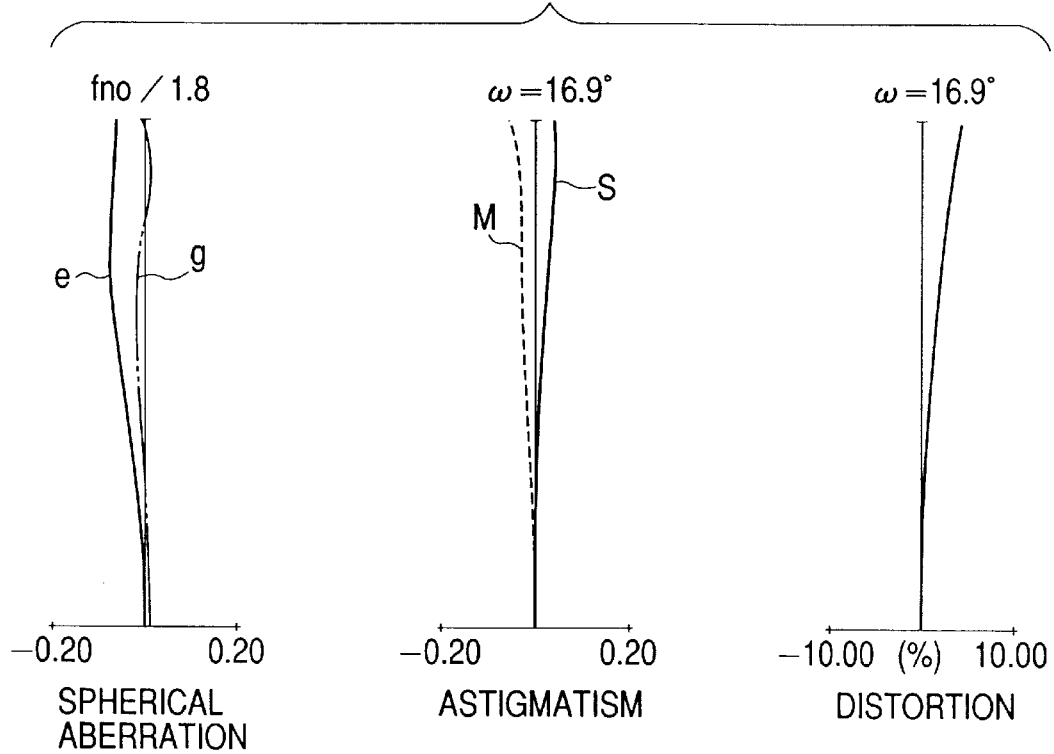
FIG. 33 shows the aberrations of Numerical Value Embodiment 5 of the present invention at the focal length fwm.
Figure 34:
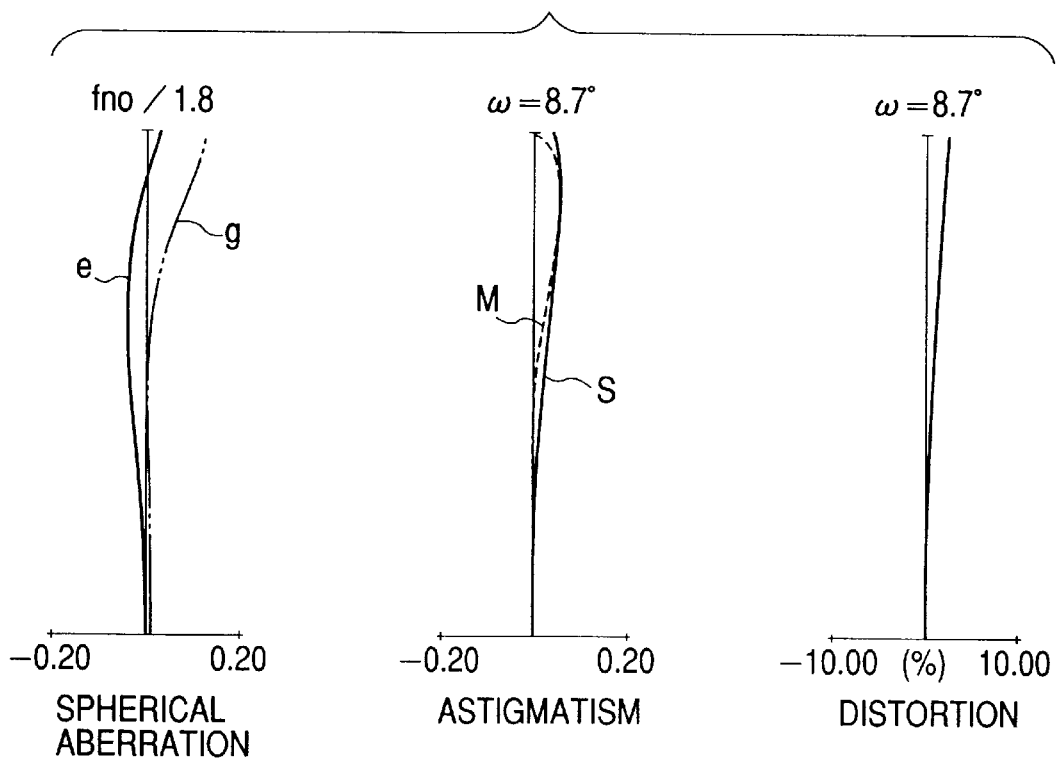
FIG. 34 shows the aberrations of Numerical Value Embodiment 5 of the present invention at the focal length fm.
Figure 35:
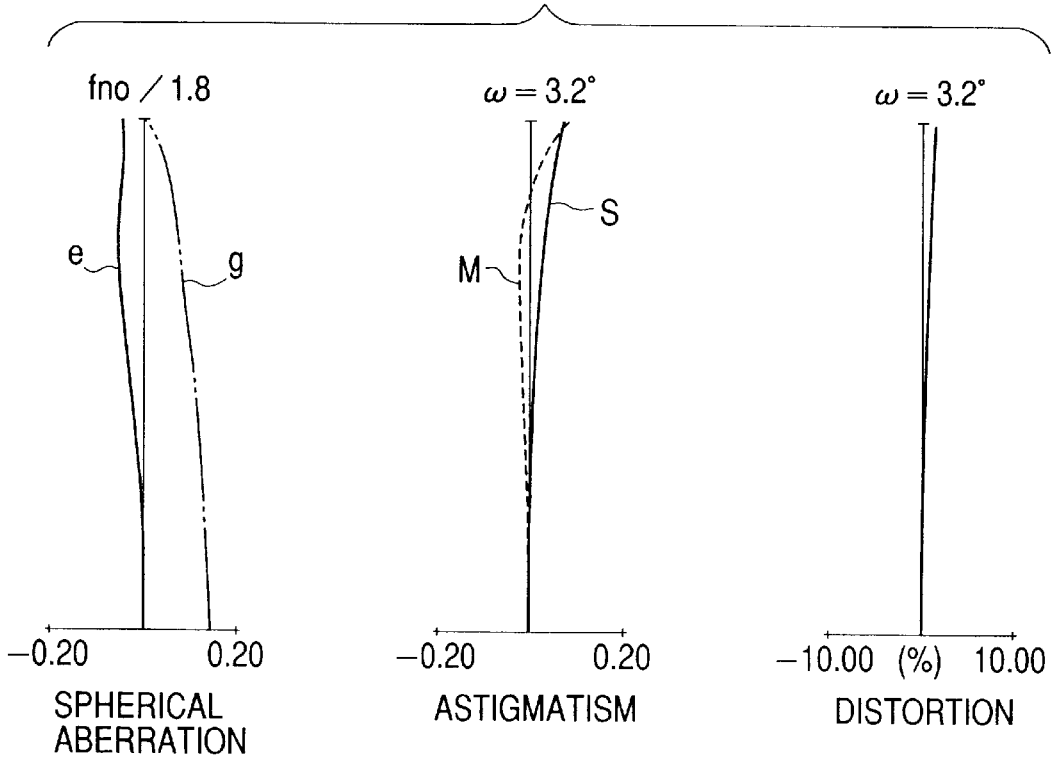
FIG. 35 shows the aberrations of Numerical Value Embodiment 5 of the present invention at the focal length fd.
Figure 36:
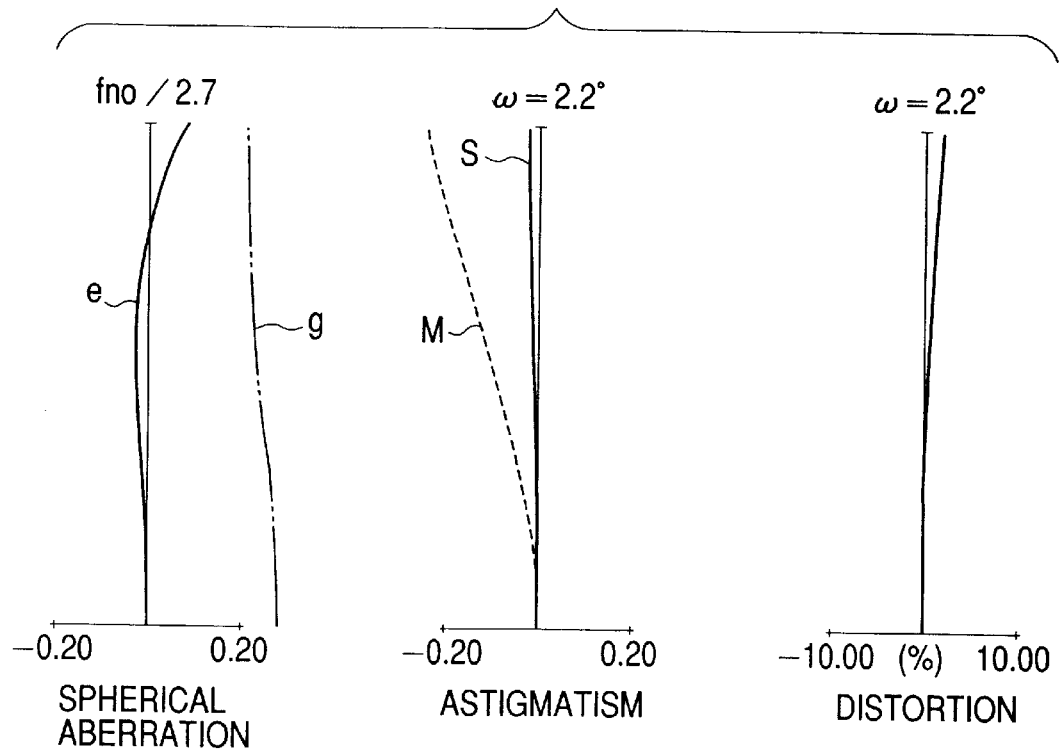
FIG. 36 shows the aberrations of Numerical Value Embodiment 5 of the present invention at the focal length ft.
Figure 37:
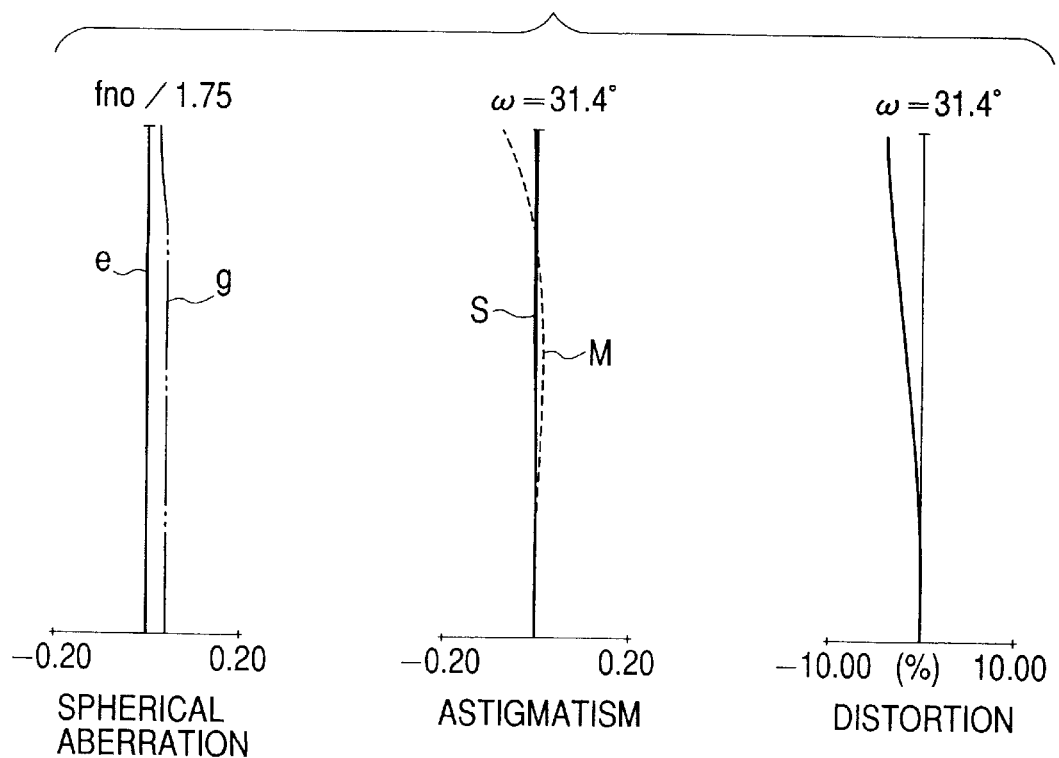
FIG. 37 shows the aberrations of Numerical Value Embodiment 6 of the present invention at the focal length fw.
Figure 38:
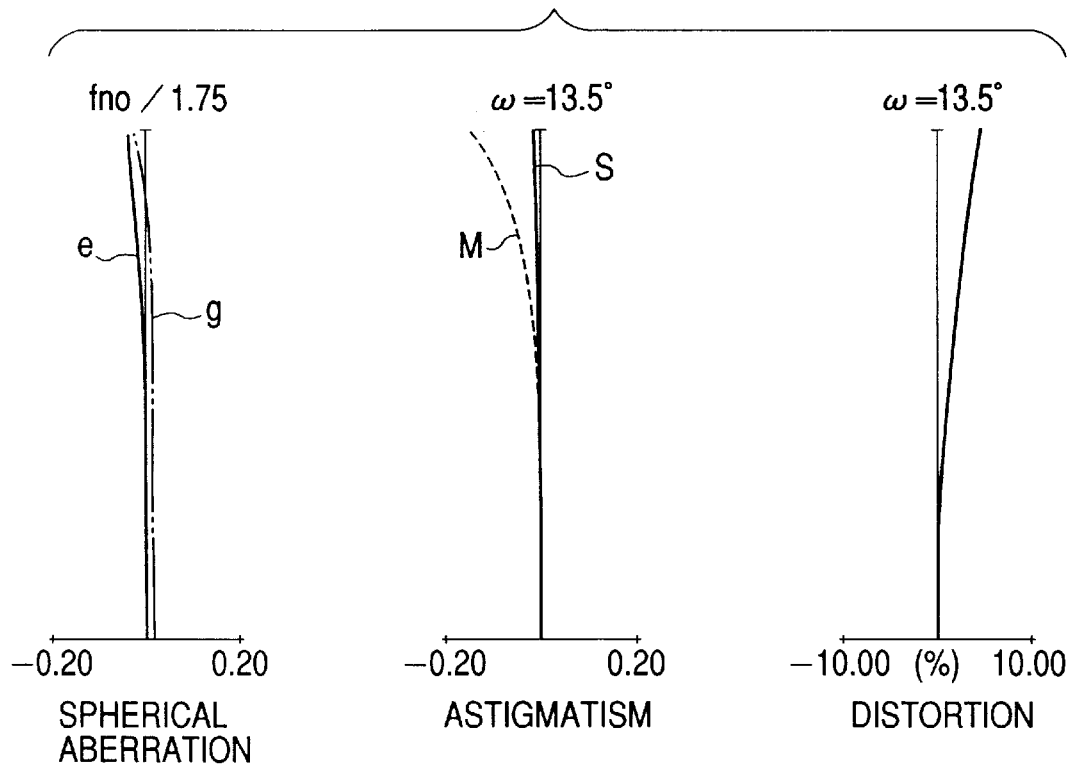
FIG. 38 shows the aberrations of Numerical Value Embodiment 6 of the present invention at the focal length fwm.
Figure 39:
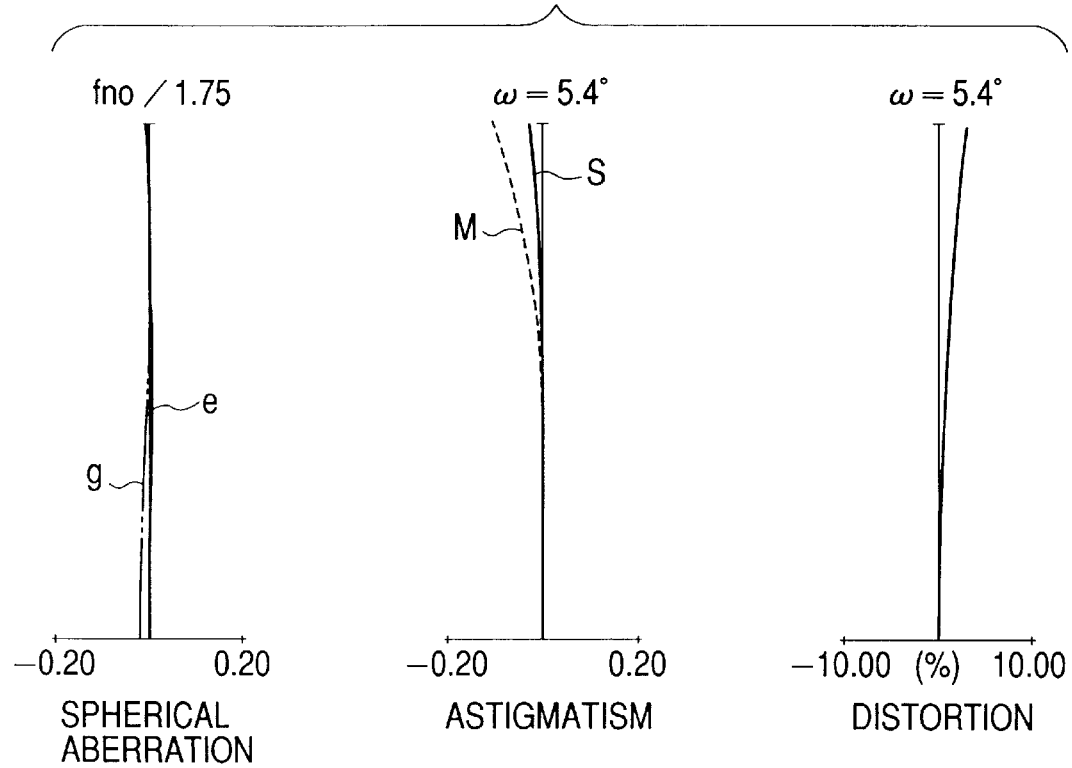
FIG. 39 shows the aberrations of Numerical Value Embodiment 6 of the present invention at the focal length fm.
Figure 40:
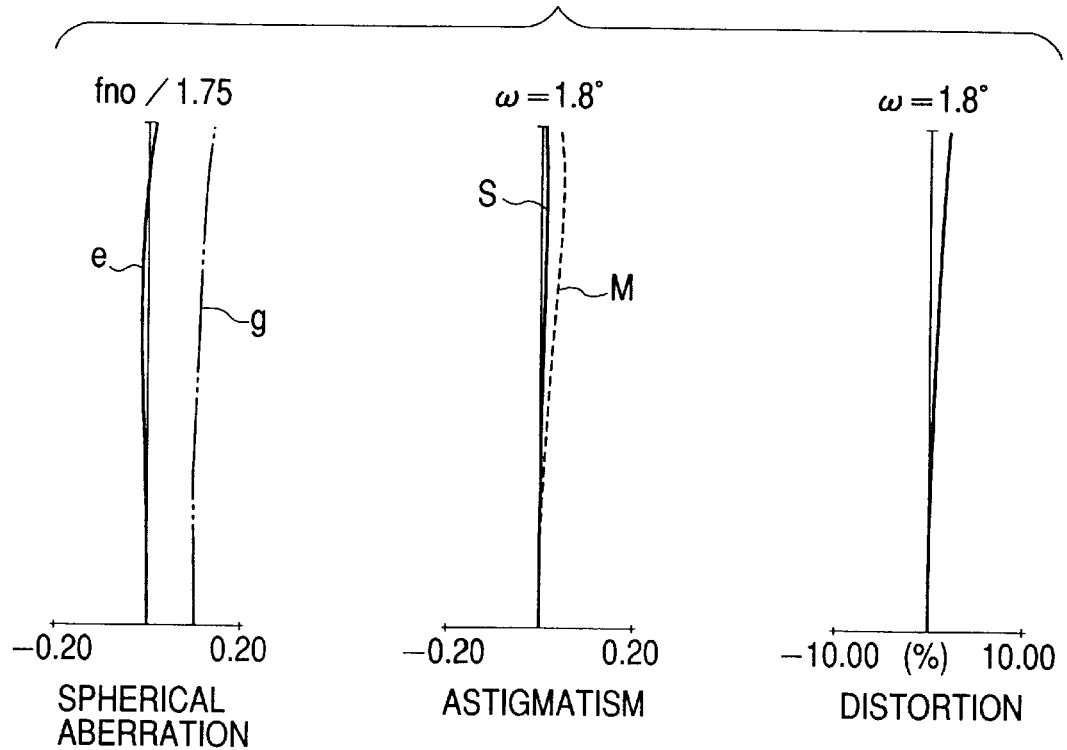
FIG. 40 shows the aberrations of Numerical Value Embodiment 6 of the present invention at the focal length fd.
Figure 41:
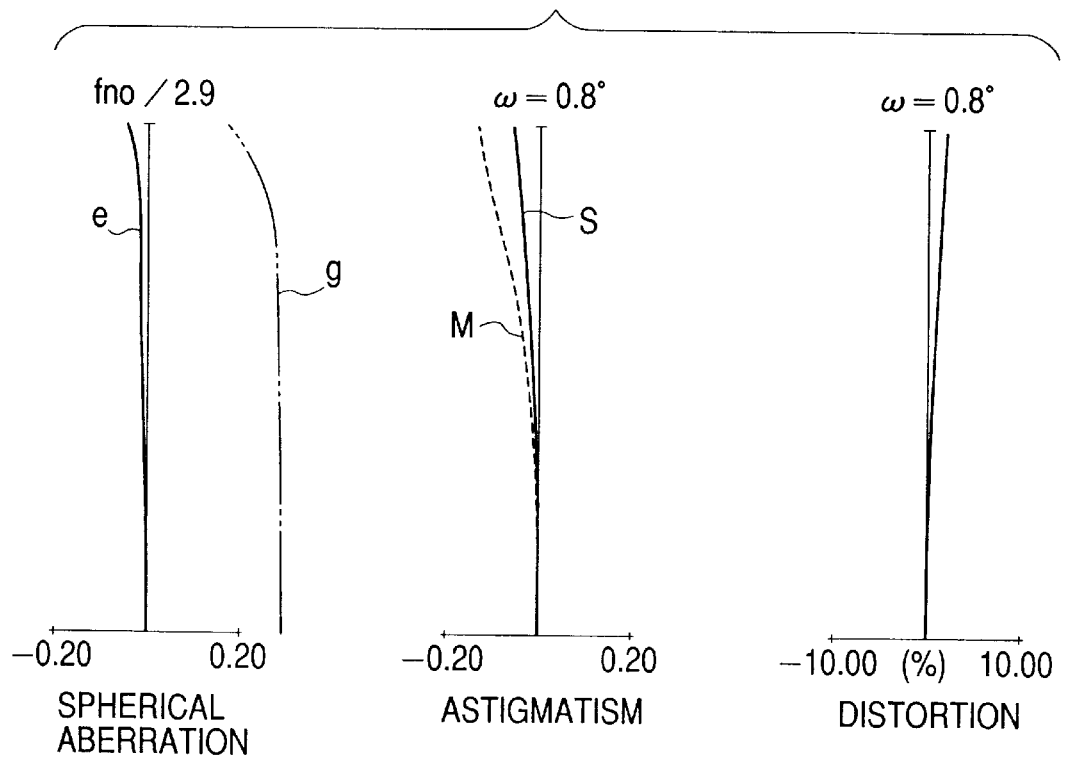
FIG. 41 shows the aberrations of Numerical Value Embodiment 6 of the present invention at the focal length ft.
Figure 42:
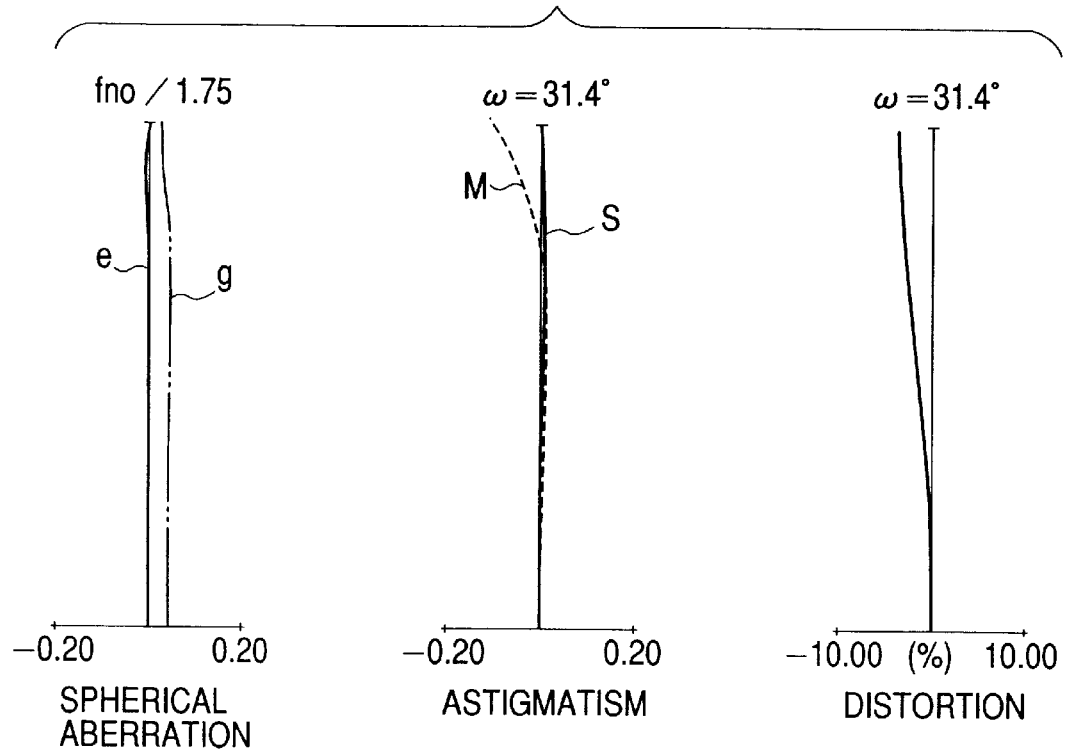
FIG. 42 shows the aberrations of Numerical Value Embodiment 7 of the present invention at the focal length fw.
Figure 43:
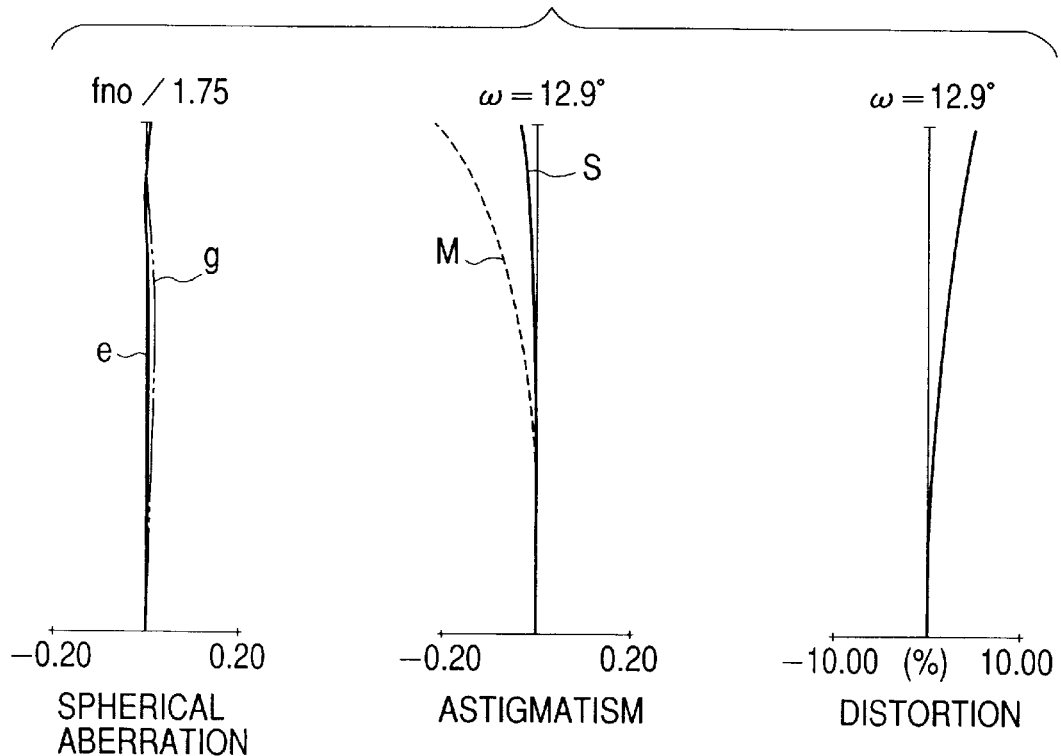
FIG. 43 shows the aberrations of Numerical Value Embodiment 7 of the present invention at the focal length fwm.
Figure 44:
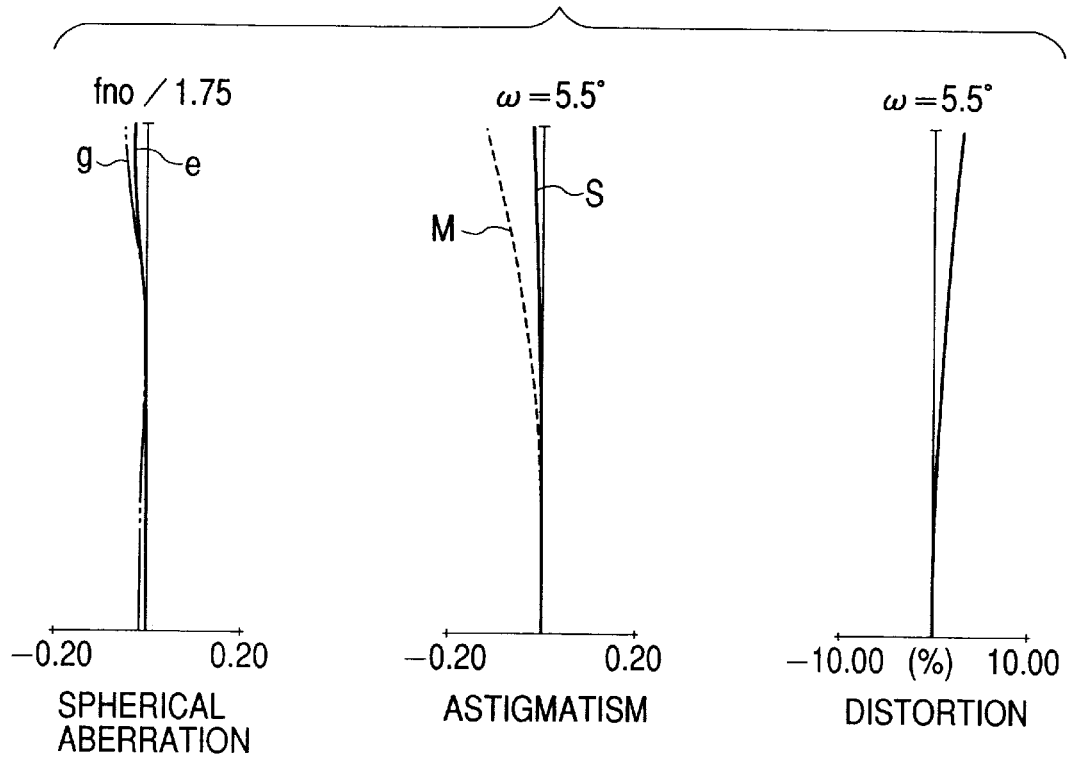
FIG. 44 shows the aberrations of Numerical Value Embodiment 7 of the present invention at the focal length fm.
Figure 45:
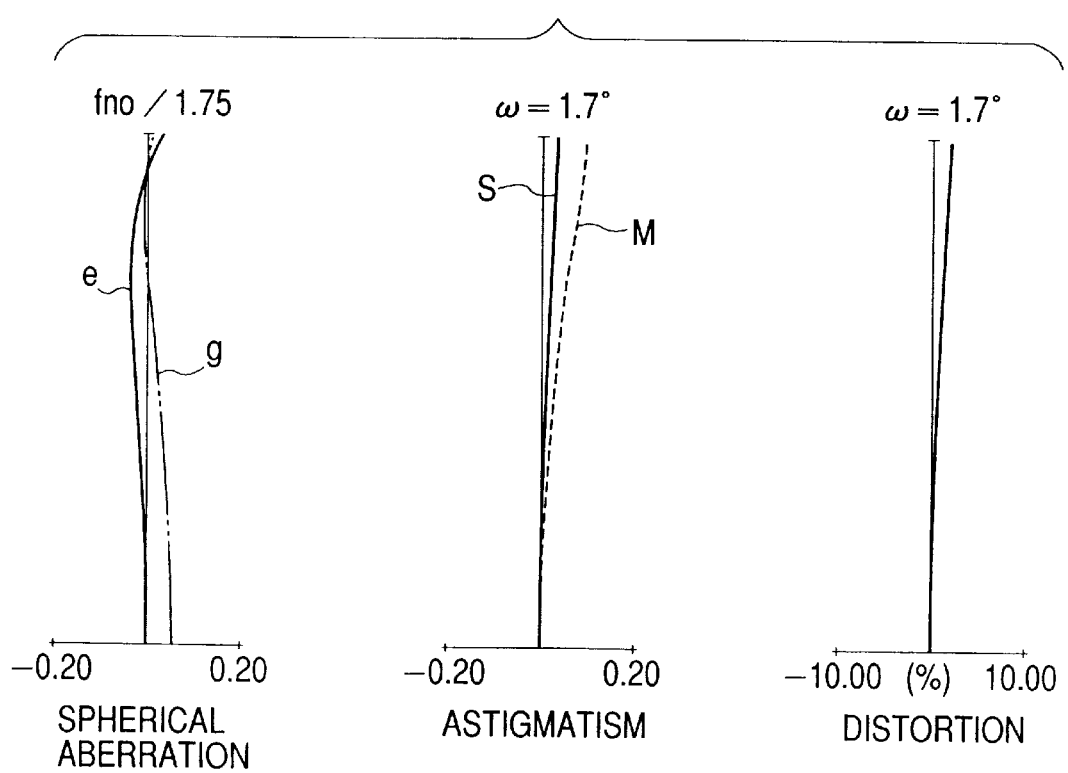
FIG. 45 shows the aberrations of Numerical Value Embodiment 7 of the present invention at the focal length fd.
Figure 46:
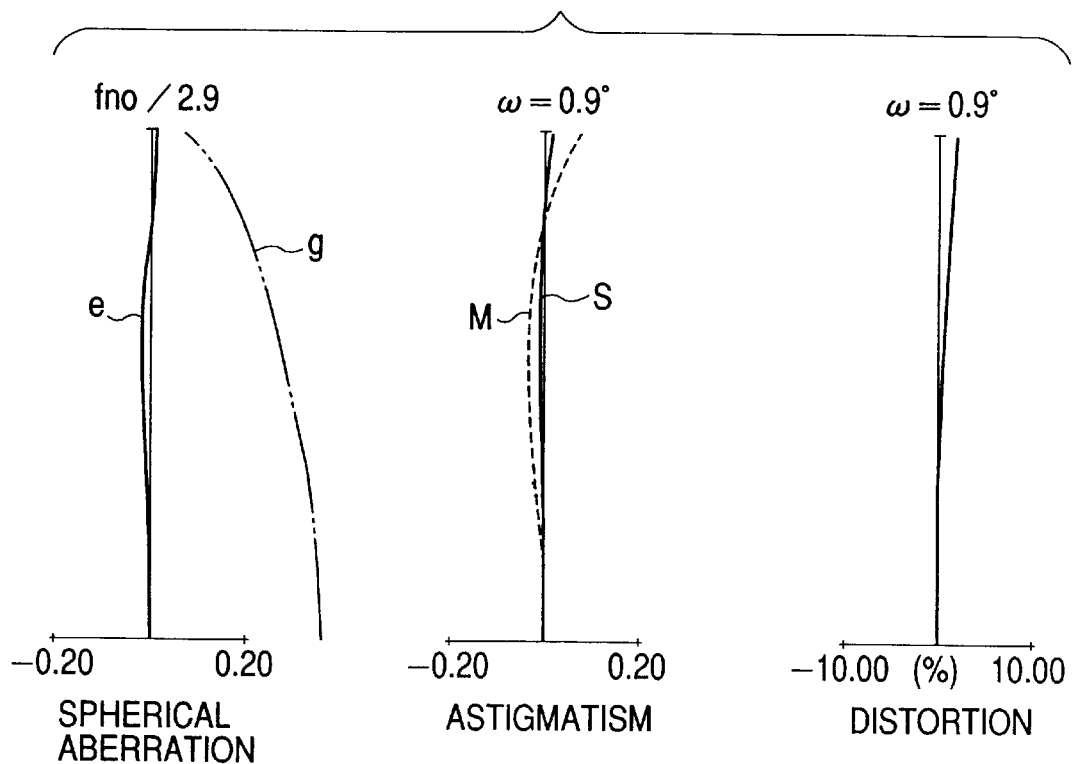
FIG. 46 shows the aberrations of Numerical Value Embodiment 7 of the present invention at the focal length ft.
Figure 47:
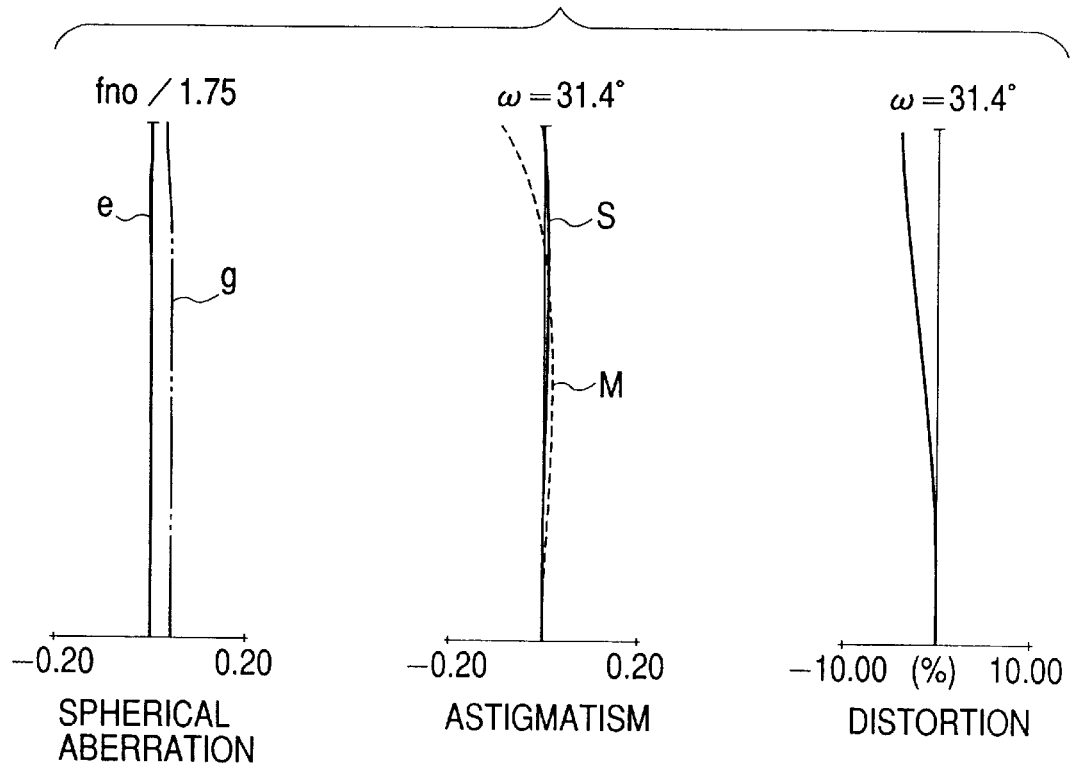
FIG. 47 shows the aberrations of Numerical Value Embodiment 8 of the present invention at the focal length fw.
Figure 48:
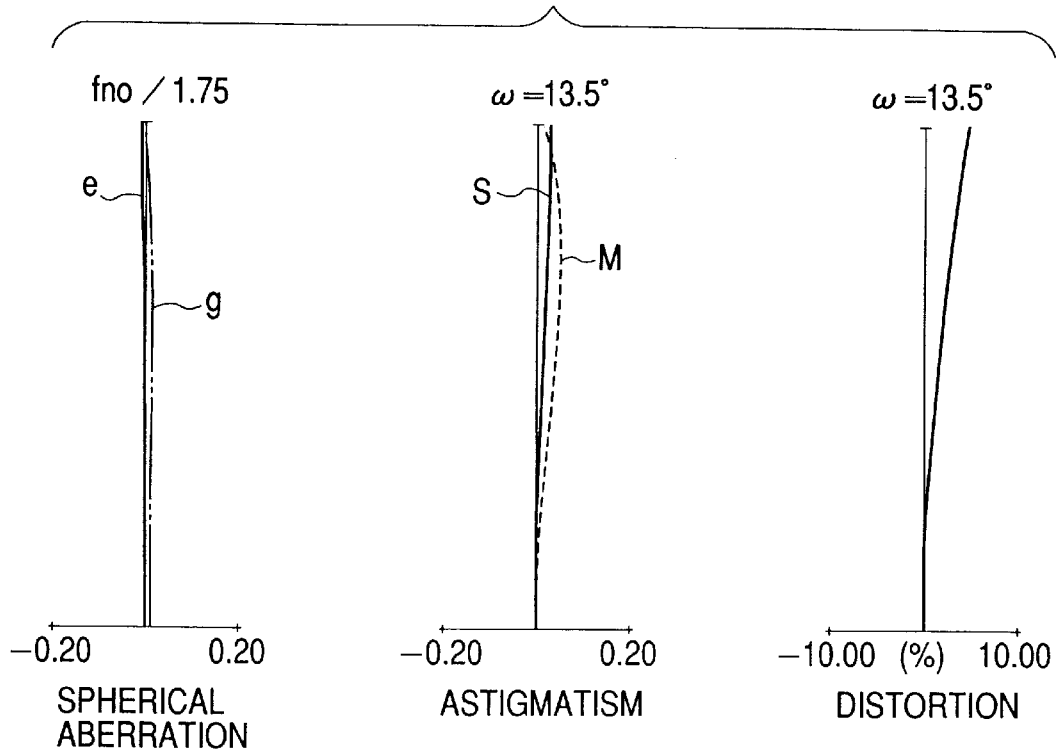
FIG. 48 shows the aberrations of Numerical Value Embodiment 8 of the present invention at the focal length fwm.
Figure 49:
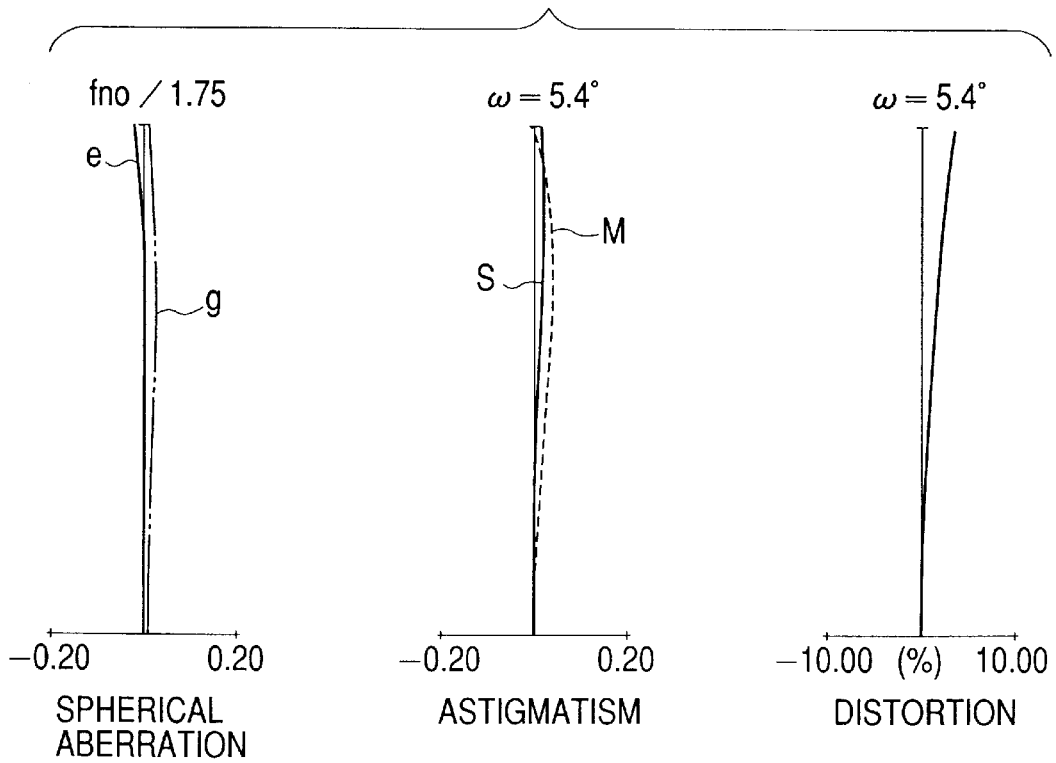
FIG. 49 shows the aberrations of Numerical Value Embodiment 8 of the present invention at the focal length fm.
Figure 50:
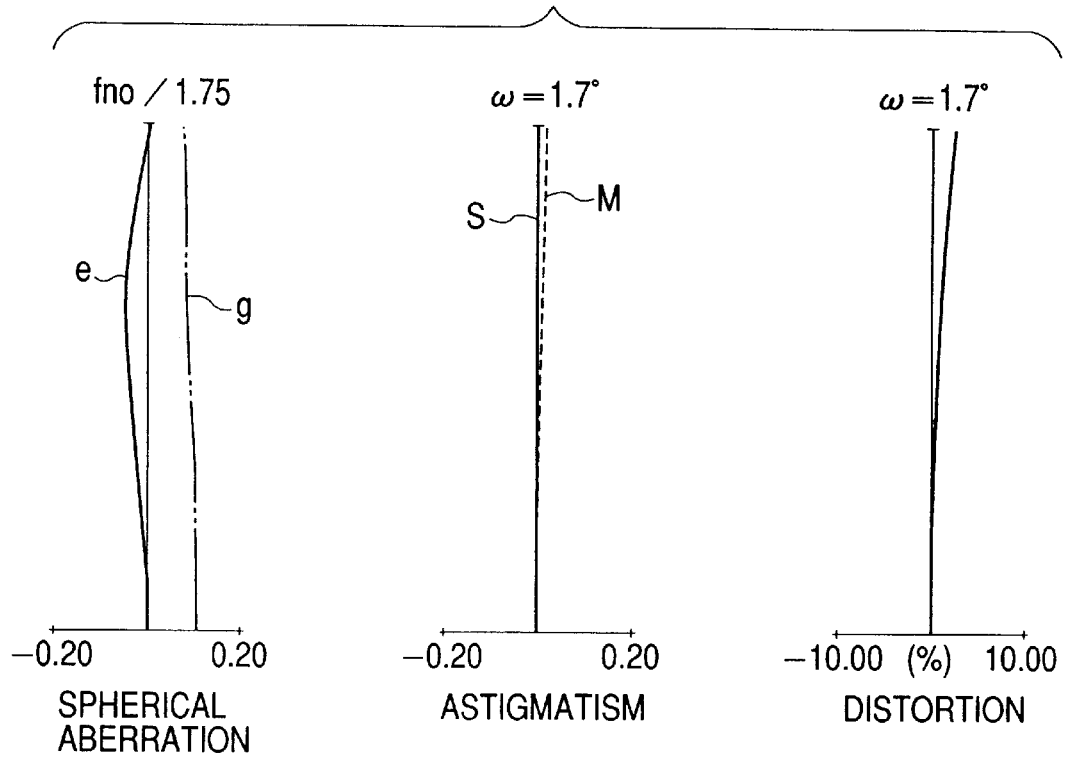
FIG. 50 shows the aberrations of Numerical Value Embodiment 8 of the present invention at the focal length fd.
Figure 51:
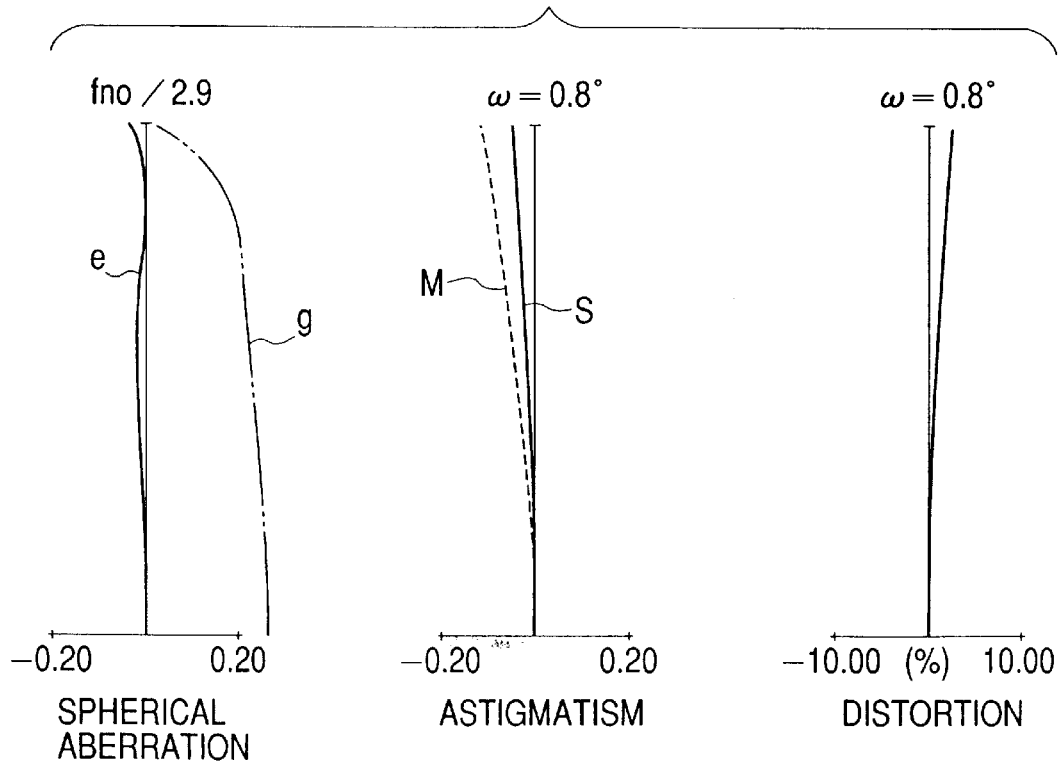
FIG. 51 shows the aberrations of Numerical Value Embodiment 8 of the present invention at the focal length ft.
Figure 52:
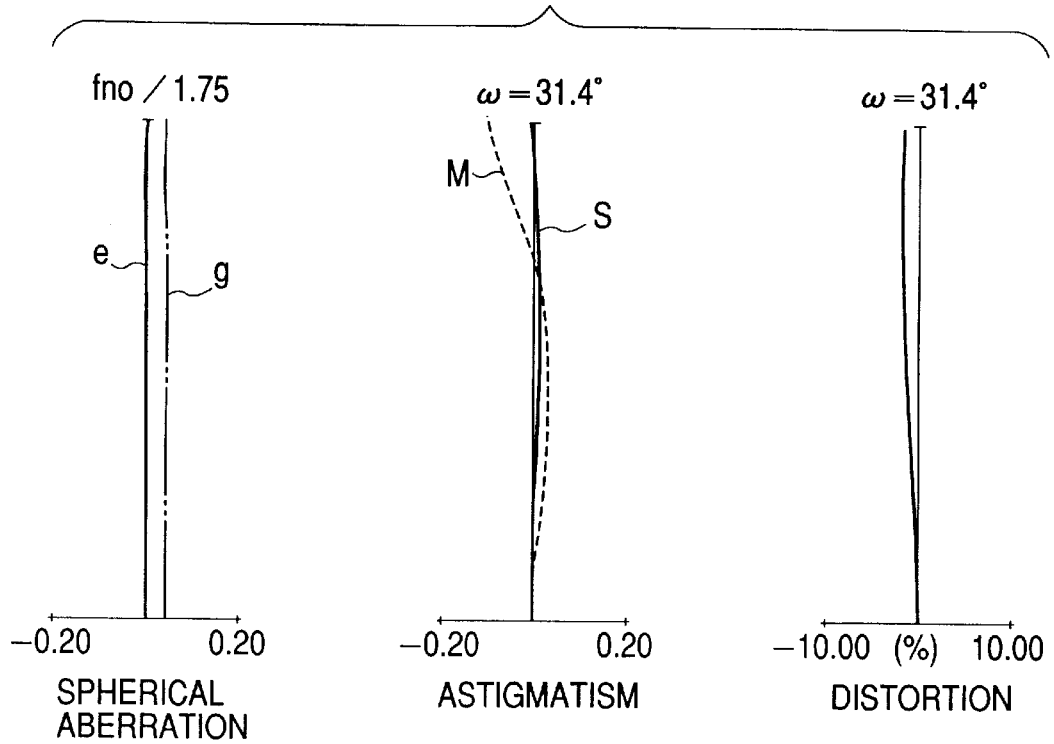
FIG. 52 shows the aberrations of Numerical Value Embodiment 9 of the present invention at the focal length fw.
Figure 53:
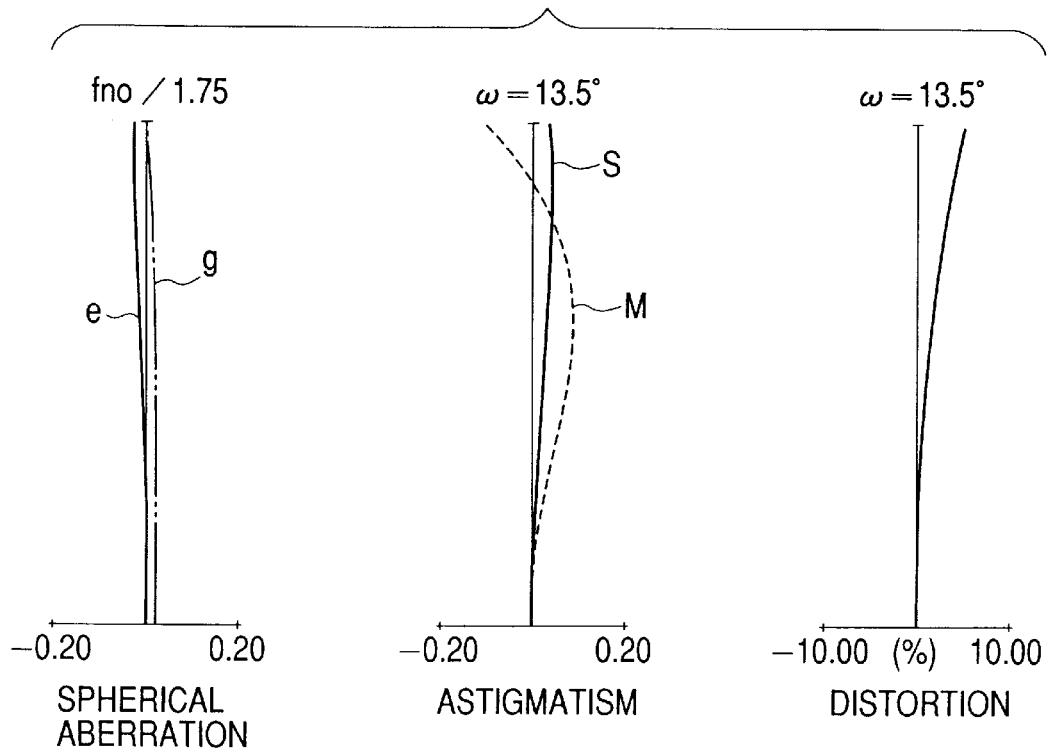
FIG. 53 shows the aberrations of Numerical Value Embodiment 9 of the present invention at the focal length fwm.
Figure 54:
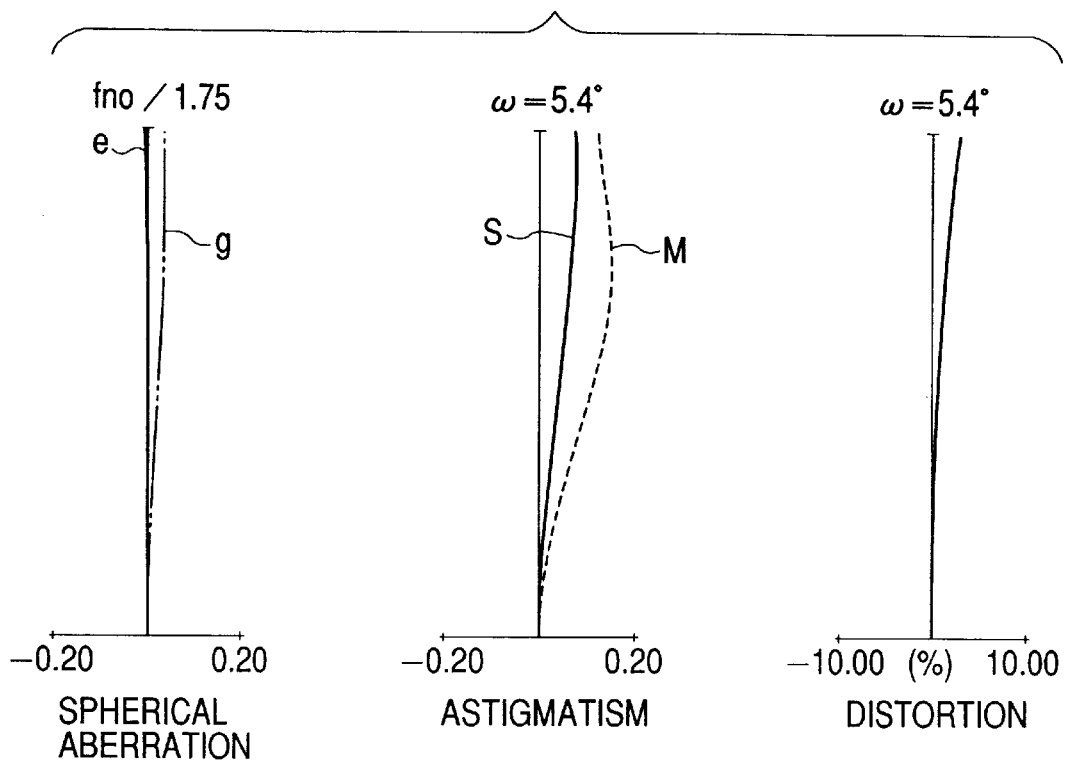
FIG. 54 shows the aberrations of Numerical Value Embodiment 9 of the present invention at the focal length fm.
Figure 55:
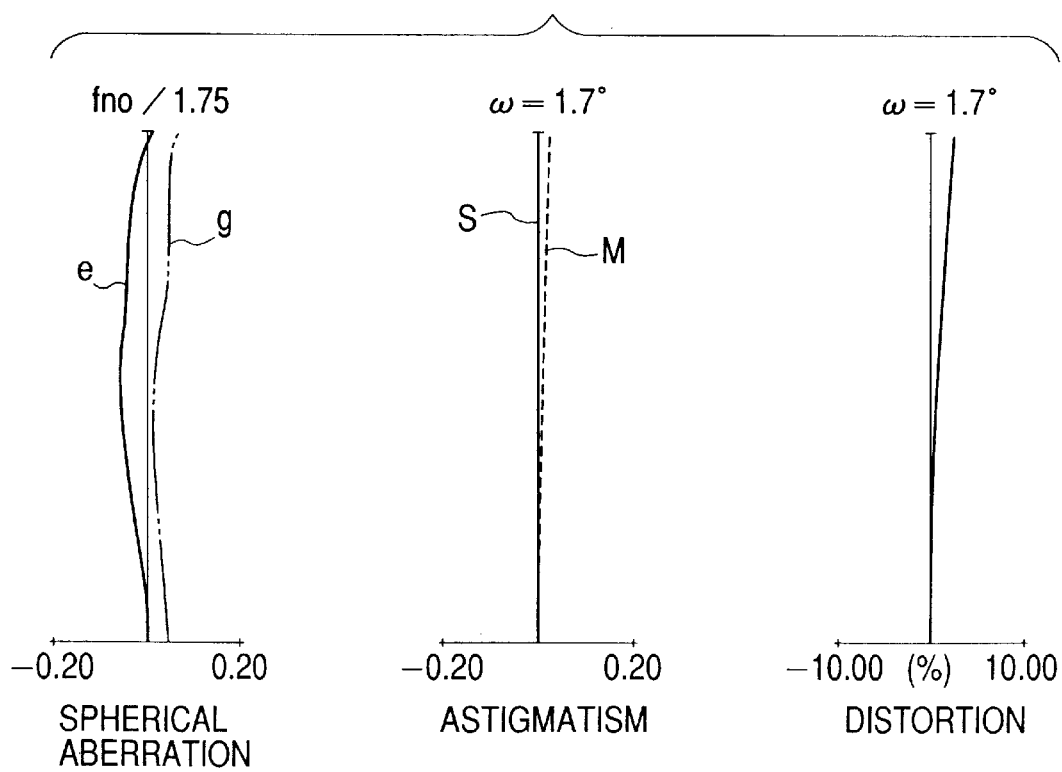
FIG. 55 shows the aberrations of Numerical Value Embodiment 9 of the present invention at the focal length fd.
Figure 56:
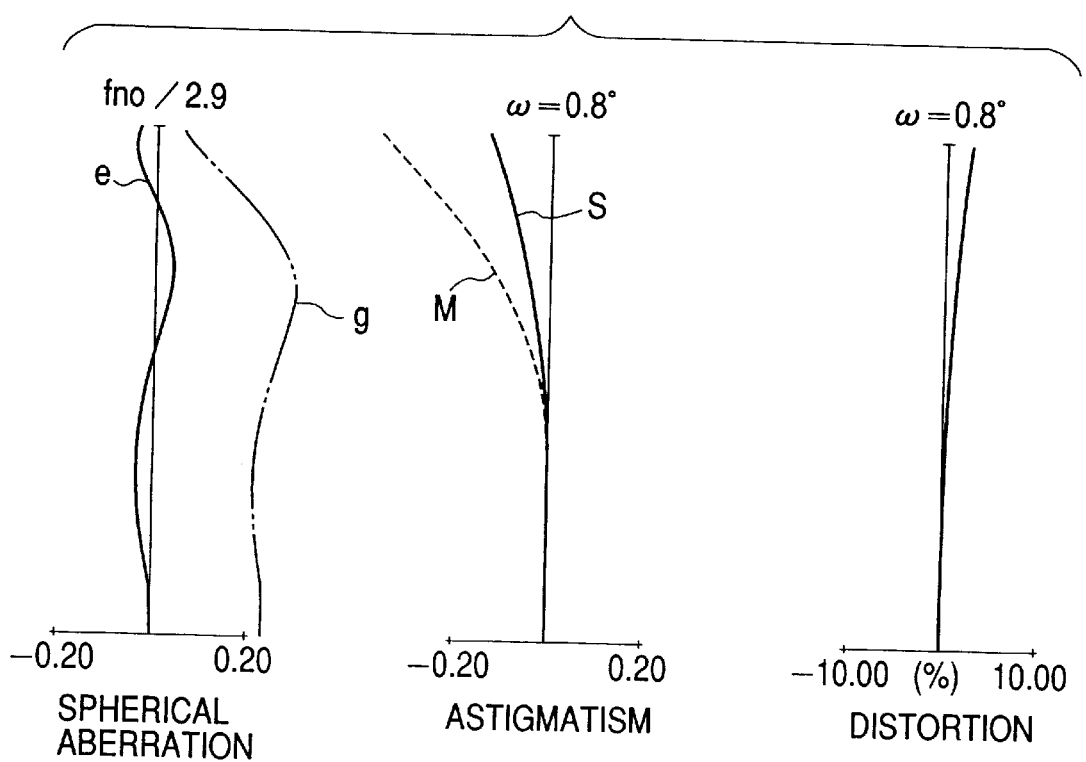
FIG. 56 shows the aberrations of Numerical Value Embodiment 9 of the present invention at the focal length ft.

FIGS. 10 and 11 are illustrations of the paraxial refractive power arrangements of a variator (a second lens unit) V and a compensator (a third lens unit) C in the zoom lens of the present invention. FIG. 10 shows the case where the third lens unit (compensator C) is of a negative refractive power, and FIG. 11 shows a case where the third lens unit (compensator C) is of a positive refractive power.

FIGS. 12 to 16 show the aberrations of Numerical Value Embodiment 1 at the wide angle end fw, the intermediate fwm, the intermediate fm, the zoom position fd of F drop and the telephoto end ft, respectively, FIGS. 17 to 21 show the aberrations of Numerical Value Embodiment 2 at the wide angle end fw, the intermediate fwm, the intermediate fm, the zoom position fd of F drop and the telephoto end ft, respectively, FIGS. 22 to 26 show the aberrations of Numerical Value Embodiment 3 at the wide angle end fw, the intermediate fwm, the intermediate fm, the zoom position fd of F drop and the telephoto end ft, respectively, FIGS. 27 to 31 show the aberrations of Numerical Value Embodiment 4 at the wide angle end fw, the intermediate fwm, the intermediate fm, the zoom position fd of F drop and the telephoto end ft, respectively, FIGS. 32 to 36 show the aberrations of Numerical Value Embodiment 5 at the wide angle end fw, the intermediate fwm, the intermediate fm, the zoom position fd of F drop and the telephoto end ft, respectively, FIGS. 37 to 41 show the aberrations of Numerical Value Embodiment 6 at the wide angle end fw, the intermediate fwm, the intermediate fm, the zoom position fd of F drop and the telephoto end ft, respectively, FIGS. 42 to 46 show the aberrations of Numerical Value Embodiment 7 at the wide angle end fw, the intermediate fwm, the intermediate fm, the zoom position fd of F drop and the telephoto end ft, respectively, FIGS. 47 to 51 show the aberrations of Numerical Value Embodiment 8 at the wide angle end fw, the intermediate fwm, the intermediate fm, the zoom position fd of F drop and the telephoto end ft, respectively, and FIGS. 52 to 56 show the aberrations of Numerical Value Embodiment 9 at the wide angle end fw, the intermediate fwm, the intermediate fm, the zoom position of F drop and the telephoto end ft, respectively.

In FIGS. 1 to 9, the letter F designates a focusing lens unit (fore lens unit) of positive refractive power as a first lens unit fixed during a focal length change. The letter V denotes a variator of negative refractive power for focal length change as a second lens unit having two lens units, i.e., a lens subunit Va of negative refractive power and a lens subunit Vb of positive refractive power having at least one positive lens. The second lens unit itself is monotonously moved to the image side during the focal length change from the wide angle end to the telephoto end, but the negative lens subunit Va and the positive lens subunit Vb utilize a so-called floating operation in which they are moved at different speeds. The letter C designates a compensator of positive or negative refractive power as a third lens unit. The compensator C is reciprocally moved so as to have a locus convex toward the object side in Numerical Value Embodiments 1 to 5 of FIGS. 1 to 5, and is monotonously moved toward the object side in Numerical Value Embodiments 6 to 9 of FIGS. 6 to 9, on the optical axis thereof to correct the fluctuation of the image plane resulting from a focal length change. The letter S denotes a stop, and the letter R designates a relay lens unit of positive refractive power fixed as a fourth lens unit. The letter G denotes a color resolving prism, an optical filter or the like, and in FIGS. 1 to 9, it is shown as a glass block.

The features of the zoom lens of the present invention will now be described.

In the present embodiment, the second lens unit V is divided into the two lens subunits Va and Vb, and their movement speeds are changed with a focal length change, whereby the spacing between the two lens subunits is reduced or enlarged to thereby change the angle and height at which the ray of light in the two lens subunits passes, thus correcting the fluctuations of aberrations resulting from the focal length change.

The design of the zoom lens is made such that when at this time, the focal lengths of the negative lens subunit and the positive lens subunit are defined as f2A and f2B, respectively, the condition that $$7.3 < |f2B/f2A| < 27 \quad (1)$$

is satisfied.

Now, when the focal length at the wide angle end is defined as fw and the zoom ratio (variable power ratio) is defined as Z, the spacing D between the principal points of the negative lens subunit Va and the positive lens subunit Vb is appropriately adjusted at a focal length fwm (=fw×$Z^{1/4}$) which is an intermediate zoom position at which spherical aberration becomes under, a focal length fm (=fw×$Z^{1/2}$) and a focal length fd at which F drop in which spherical aberration becomes over begins, that is, the movement speeds of the two lens subunits are changed, whereby the fluctuation of spherical aberration resulting from a focal length change is corrected well.

The optical action when in the zoom lens of the present invention, floating is effected by the use of the negative lens subunit Va and the positive lens subunit Vb will now be described with reference to FIG. 10 with respect to a case where the third lens unit is of a negative refractive power.

The height in the positive lens subunit Vb of the paraxial ray at a zoom position Z1 indicated by solid line is defined as h, the height of a ray near to the pupil is defined as hY, the height of the third lens unit C is defined as H, the height of a ray near to the pupil is defined HY, and the spacing between the negative lens subunit Va and the positive lens subunit Vb is defined as Dw. The height of the paraxial ray at zoom position Z2 (a position indicated by dotted line) when the positive lens subunit Vb is moved to the image plane side by floating is defined as h', the height of the ray near to the pupil is defined as hY' and the position of the third lens unit C when the image plane is compensated for is indicated by a dotted line, and the design of the zoom lens is made such that when the height of the paraxial ray onto the third lens unit C is defined as H' and the spacing between the negative lens subunit Va and the positive lens subunit Vb is defined as D, $$Dw < D \quad (2)$$

The negative lens subunit Va and the positive lens subunit Vb are moved so as to satisfy the conditional expression (2), whereby the fluctuation of spherical aberration resulting from the focal length change is corrected well.

As regards the paraxial rays h and H entering the positive lens subunit and the third lens unit C, the heights h' and H' of the paraxial rays in the positive lens subunit Vb and the third lens unit C are higher and therefore, the tertiary (third) spherical aberration coefficient changes to the plus direction in the lens subunit of positive refractive power, and to the minus direction in the third lens unit C of negative refractive power.

The design of the zoom lens is made such that, assuming that at the zoom position Z0, the sum total of the tertiary spherical aberration coefficients of the positive lens subunit and the third lens unit is Im, and the negative lens subunit is fixed at the zoom position Z0, and the relative positional relation between the negative lens subunit and the positive lens subunit is equal to the wide angle end (Dw=D), when the sum total of the tertiary spherical aberration coefficients of the positive lens subunit and the third lens unit is defined as Ip, in a case where the fluctuation of the image plane is corrected by the third lens unit, the condition that $$Im - Ip < 0 \quad (3)$$

is satisfied.

By conditional expression (3) being satisfied, spherical aberration is corrected to the over side. Conversely, near the F drop, the positive lens subunit Vb and the third lens unit C are moved from their positions indicated by dotted lines toward their positions indicated by solid lines to thereby correct the over spherical aberration to the under side.

Also, as regards the positive lens subunit Vb, at a zoom position Z2 indicated by dotted line, the height of the ray near to the pupil is $|hY'| < |hY|$ relative to a zoom position Z1 indicated by solid line, and this ray is refracted to a greater extent at the image plane side and therefore, $|hFY'| < |hFY|$ in the first lens unit F, and the diameter of the fore lens is decreased.

The optical action when floating is effected by the use of the negative lens subunit Va and the positive lens subunit Vb will now be described with reference to FIG. 11 with respect to a case where the third lens unit C is of a positive refractive power.

FIG. 11 differs from FIG. 10 in that the light beam from the third lens unit C to the fourth lens unit R is converged, but the reference characters in FIG. 11 are similar to those in FIG. 10. The height h of the paraxial ray to the positive lens subunit Vb is high at a zoom position Z2 after movement, and the height H of the paraxial ray to the third lens unit C is low at the zoom position Z2 after movement and therefore, the tertiary spherical aberration coefficient changes to the plus direction in the lens subunit of a positive refractive power, and to the minus direction in the third lens unit of a positive refractive power. Accordingly, when as in FIG. 10, the combined tertiary spherical aberration coefficient of the positive lens subunit Vb and the third lens unit C at the zoom position Z0 is defined Im and the combined tertiary spherical aberration coefficient of the positive lens subunit and the third lens unit after the movement thereof is defined as Ip, Im−Ip<0 (conditional expression (3)) is satisfied to thereby correct spherical aberration to the over side.

Conversely, near the F drop, the positive lens subunit Vb and the third lens unit C are moved from their positions indicated by dotted lines to their positions indicated by solid lines to thereby correct over spherical aberration to the under side. The ray near to the pupil at a position indicated by dotted line is $|hY'| < |hY|$ relative to a position indicated by solid line and is refracted to a greater extent at the image plane side and therefore, in the first lens unit F, $|hFY'| < |hFY|$, thus decreasing the diameter of the fore lens.

Figure 57:
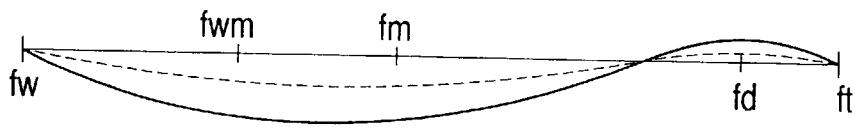
FIG. 57 is an illustration of the functuation of spherical aberration by a focal length change.
Figure 58:
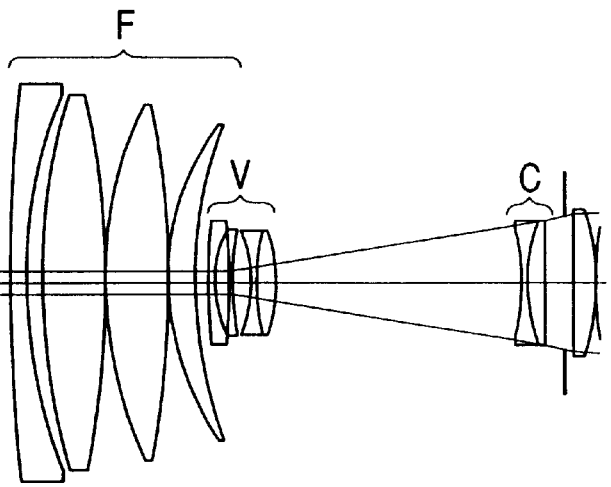
FIG. 58 is an illustration of an on-axis ray at the focal length fw in the prior art.
Figure 59:
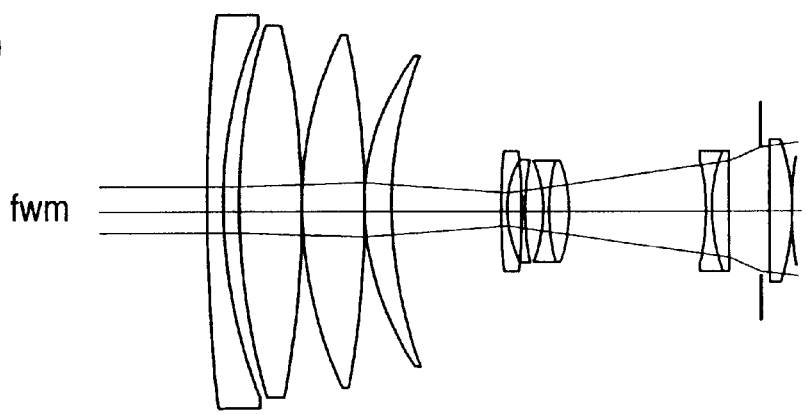
FIG. 59 is an illustration of the on-axis ray at the focal length fwm in the prior art.
Figure 60:
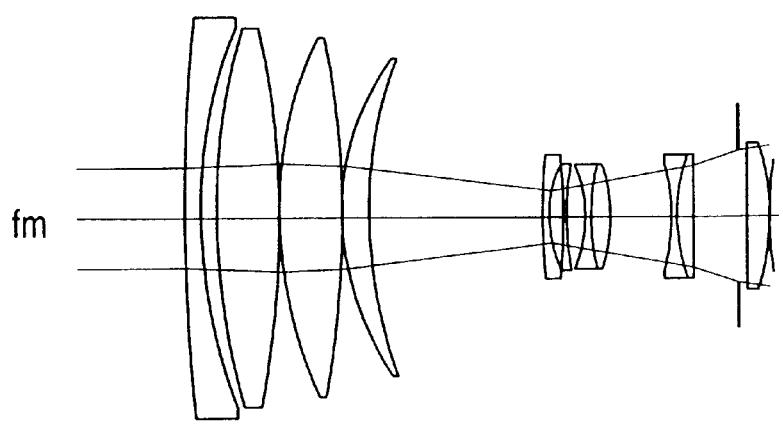
FIG. 60 is an illustration of the on-axis ray at the focal length fm in the prior art.
Figure 61:
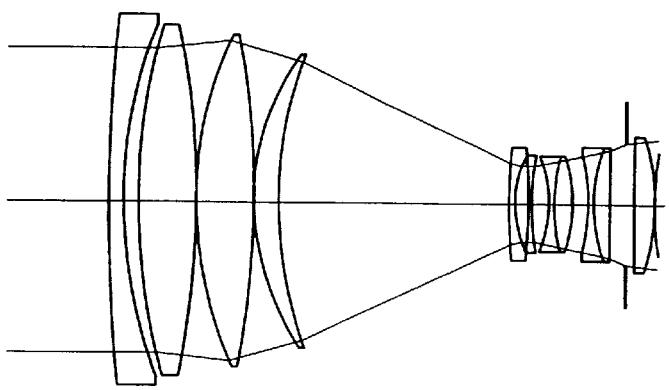
FIG. 61 is an illustration of the on-axis ray at the focal length fd in the prior art.
Figure 62:
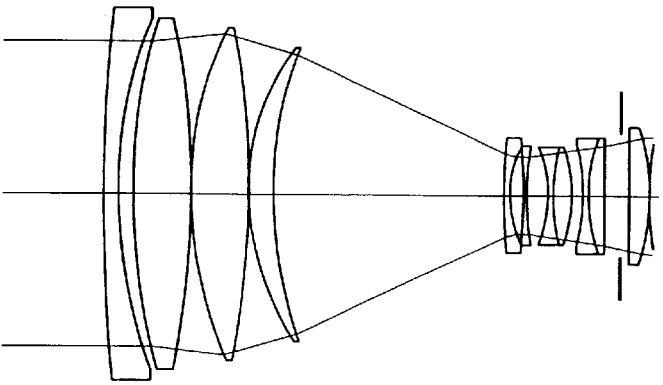
FIG. 62 is an illustration of the on-axis ray at the focal length ft in the prior art.

As described above, according to the present invention, the changes in aberrations, caused by changing the spacing between the negative lens subunit Va and the positive lens subunit Vb and moving the third lens unit C, is utilized to suppress the fluctuations of aberrations of zooming. Thereby, the fluctuation of spherical aberration in the prior art indicated by solid line is decreased, as indicated by dotted line in FIG. 57.

Even if the refractive power of the third lens unit C is negative (FIG. 10) or positive (FIG. 11), the height of the paraxial ray is h'>h and the height of the ray near to the pupil is $|hY'| < |hY|$ at the zoom position Z2 after the movement of the positive lens subunit and therefore, the correction of the chromatic aberration of the positive lens subunit is made excessive, whereby longitudinal chromatic aberration can be changed to over and lateral chromatic abberation can also be changed to over. Particularly in a zoom lens, generally at the intermediate zoom positions fwm and fm, longitudinal chromatic aberration fluctuates to under and lateral chromatic abberation also fluctuates to under and therefore, this becomes effective for correcting such fluctuations.

In a zoom lens, astigmatism and curvature of image field also fluctuate to the under side at the intermediate zoom positions, but at the zoom position Z2 after the movement of the positive lens subunit, |hY'|<|hY|, and this is effective for the correction to the over side.

At this time, in the present invention, the aforementioned conditional expression (1) is satisfied in order to efficiently effect aberration correction and the decrease in the diameter of the fore lens.

If the lower limit value of conditional expression (1) is exceeded, the refractive power of the positive lens subunit becomes too strong and therefore, the amount of change in the tertiary spherical aberration coefficient becomes great toward the plus side in the positive lens subunit, and in the vicinity of the focal lengths fwm and fm, the effect of correcting spherical aberration to the over side decreases. Also, if the upper limit value of conditional expression (1) is exceeded, the refractive power of the positive lens subunit becomes too weak and therefore, the effect of decreasing the diameter of the fore lens is lost or the amount of movement of the third lens unit toward the image plane side for the compensation of the image plane decreases, and in the vicinity of the focal lengths fwm and fm, the effect of correcting spherical aberration to the over side decreases.

The zoom lens of the present invention is achieved by satisfying the above-mentioned conditions, and further, preferably at least one of the following conditions may be satisfied for the correction of aberrations.

(a1) The third lens unit has a negative refractive power, and when the radii of curvature of the first lens surface of the positive lens subunit, which is adjacent to the object side, and the last lens surface, adjacent to the image plane side, are defined as Ra and Rb, respectively, and $$S = \frac{Rb + Ra}{Rb - Ra},$$

the following conditional expression is to be satisfied:

$$-5.72 < S < -0.66 \quad (4)$$

Conditional expression (4) suppresses the occurrence of under spherical aberration in the positive lens subunit, whereby it can be effectively accomplished to correct the fluctuation of spherical aberration during zooming by the utilization of the movement of the third lens unit. From the negative lens subunit to the third lens unit, the light beam is a convergent system and therefore, to suppress the occurrence of under spherical aberration, the radius of curvature Rb has a minus value in which a convex surface faces the image plane side. So, if the lower limit value of conditional expression (4) is exceeded, the radius of curvature Ra also comes to have a minus value in which a concave surface faces the object side, and the refractive power of the entire positive lens subunit becomes too weak and this is not good. Also, if the upper limit value of conditional expression (4) is exceeded, conversely, the radius of curvature Ra comes to have a small plus value in which a convex surface faces the object side, and the under spherical aberration occurring in the first lens surface increases and this is not good. That is, |Ra|>|Rb| is realized and the positive lens subunit has a positive refractive power, and yet suppresses the occurrence of under spherical aberration therein.

(a2) The third lens unit has positive refractive power, and during the focal length change from the wide angle end to the telephoto end, the lateral magnifications of the second lens unit and the third lens unit have −1 time at a time, and when the radii of curvature of the first lens surface of the positive lens subunit, which is adjacent to the object side, and the last lens surface, adjacent to the image plane side, are defined as Ra and Rb, respectively, and $$S = \frac{Rb + Ra}{Rb - Ra},$$

the following conditional expression is to be satisfied:

$$-5.88 < S < 0.6 \quad (5)$$

Conditional expression (5), like conditional expression (4), suppresses the occurrence of under spherical aberration in the positive lens subunit, but in the vicinity of the upper limit value, |Ra|<|Rb| and this is converse to conditional expression (4). This is because the third lens unit of positive refractive power also contributes to focal length change and the amount of change in spherical aberration during the movement thereof is great and the correction of spherical aberration to the over side is easy and therefore, the under spherical aberration occurring in the positive lens subunit can be allowed more than when the third lens unit is of a negative refractive power.

(a3) The positive lens subunit comprises a single positive lens L2BP, and when the Abbe number of the material of the positive lens L2BP is defined as ν2B, the following conditional expression is to be satisfied.

$$60 < \nu 2B \quad (6)$$

Conditional expression (6) is for suppressing the fluctuation of longitudinal chromatic aberration when the lens subunit of a positive refractive power is moved to the image plane side. When the Abbe number ν2B becomes smaller than 60 and dispersion becomes great, the amount of fluctuation of longitudinal chromatic aberration to under becomes great in the vicinity of the focal lengths fwm and fm.

(a4) The positive lens subunit comprises a cemented lens comprising a positive lens L2BP and a negative lens L2BN joined together and when the refractive indices of the materials of the positive lens L2BP and the negative lens L2BN are defined as Nt and No, respectively, the following conditional expression is to be satisfied:

$$Nt < No \quad (7)$$

Conditional expression (7) is for causing over spherical aberration to occur in the cemented lens surface, and negating any under spherical aberration remaining in the entire positive lens subunit.

(a5) The positive lens subunit comprises a cemented lens comprising a positive lens L2BP and a negative lens L2BN joined together, and when the Abbe numbers of the materials of the positive lens L2BP and the negative lens L2BN are defined as νt and νo, respectively, the following conditional expression is to be satisfied:

$$11.5 < \nu t - \nu o \quad (8)$$

Conditional expression (8) is for making the dispersion of the material of the negative lens L2BN greater than the dispersion of the material of the positive lens L2BP and suppressing the fluctuation of longitudinal chromatic aberration.

(a6) When the spacings between the principal points of the negative lens subunit and the positive lens subunit at a focal length fwm (=fw×$Z^{1/4}$, Z being a variable power ratio), a focal length fm (=fw×$Z^{1/2}$, Z being a variable power ratio) and a focal length fd (the zoom position at the starting point of the F drop) are defined as Dwm, Dm and Dd, respectively, it is preferable to satisfy $$Dw < Dwm \quad (9)$$

or $$Dw < Dm \quad (10)$$

or $$Dd < Dm \quad (11).$$

This is for correcting spherical aberration with respect to the zoom positions fwm and fm at which spherical aberration becomes greatly under, and the zoom position at which spherical aberration becomes over.

As described above, in the present invention, the second lens unit is comprised of two lens units, i.e., a lens unit of negative refractive power and a lens unit of positive refractive power. The present invention also relates to a moving method that changes the relative position of the two lens units to thereby change also the position of the third lens unit and suppresses the fluctuations of aberrations by zooming to the utmost. This is accomplished by prescribing power sharing, aberration coefficients, lens shapes, etc. so as to satisfy the predetermined conditions, whereby the fluctuations of aberrations, and particularly the fluctuation of spherical aberration, resulting from a focal length change are corrected well.

A description will now be provided of the features of the lens construction of each numerical value embodiment of the present invention which will be described later. In the following description each numerical value of each numerical value embodiment is represented in the unit of "mm".

(Embodiment 1)

Figure 1:
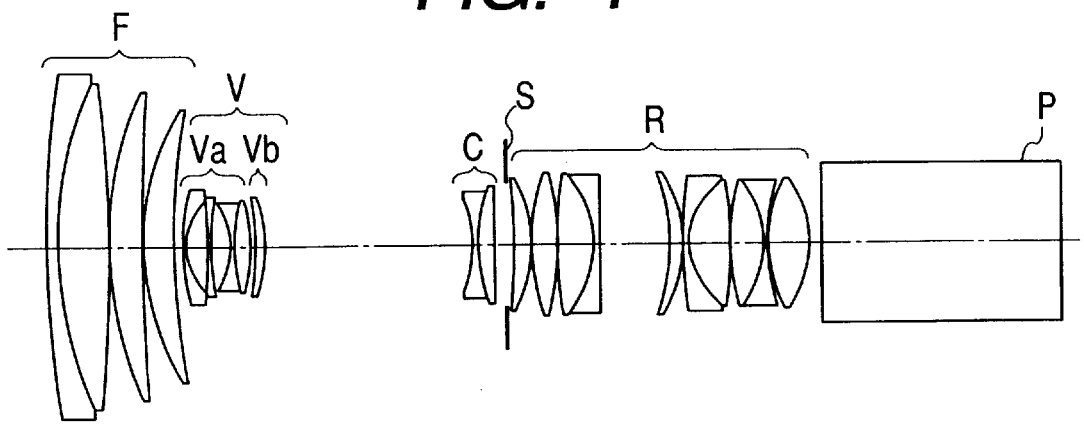
FIG. 1 is a cross-sectional view of the lens of Numerical Value Embodiment 1 of the present invention at the wide angle end thereof.

FIG. 1 is a cross-sectional view of the lens of Numerical Value Embodiment 1 of the present invention at the wide angle end thereof, and the object distance is 3.0 m and the aberrations at focal lengths fw, fwm, fm, fd and ft (telephoto end) are shown in FIGS. 12, 13, 14, 15 and 16, respectively.

In the present embodiment, the zoom lens has a zoom ratio of 16 times and the focal length at the wide angle end is 9.0 mm and F/1.8–2.7.

In Numerical Value Embodiment 1, r1–r8 designate a first lens unit F of positive refractive power for focusing. r9–r17 denote a second lens unit V of negative refractive power moved toward the image plane side from the wide angle end to the telephoto end for focal length change, and passing a combined lateral magnification −1 time on its way. Of these, r9–r15 designate a lens subunit Va of negative refractive power, and r16–r17 denote a lens subunit Vb of positive refractive power. r18–r20 designate a third lens unit C for compensating for the fluctuation of the image plane resulting from a focal length change, and the third lens unit C is moved convexly toward the object side from the wide angle end to the telephoto end. r21 denotes a stop S. r22–r38 designate a fourth lens unit R having the imaging action, and r39 and r40 denote glass blocks P equivalent to color resolving prisms, trimming filters or the like.

In the present embodiment, the first lens unit is comprised of a negative lens and three positive lenses for the correction of spherical aberration and on-axis chromatic aberration, and particularly the Abbe number of the negative lens is made as small as the order of 25, and an Abbe number as great as 82 is also used for the positive lenses.

The lens subunit having strong negative refractive power is comprised of two concave lenses (negative lenses) and a cemented lens, and the refractive index of each lens is made as high as 1.77 or greater to thereby suppress the occurrence of aberrations, and yet the difference between the Abbe numbers of concave lenses and a convex lens (positive lens) constituting the cemented lens is made as great as about 24 to thereby achromatize.

The positive lens subunit is comprised of a convex lens (positive lens), and the Abbe number thereof is made as great as about 64 to thereby satisfy conditional expression (6) and suppress the fluctuation of longitudinal chromatic aberration.

The third lens unit of negative refractive power is comprised of a cemented lens comprising a concave lens and a convex lens, and the refractive index of the material of each lens is made as high as 1.78 or greater to thereby suppress the occurrence of aberrations, and yet the Abbe number of the material of the convex lens is made as small as about 24, and the difference between the Abbe numbers of the materials of the concave and convex lenses constituting the cemented lens is made as great as about 20 to thereby achromatize.

At this time, power sharing is $|f2B/f2A|=10.28$ (conditional expression (1)) and the power of the positive lens subunit is kept proper, and the focal length at the wide angle end is regularized as fw=1, and at the focal length fwm, Im−Ip=−0.188 (conditional expression (3)) and S=−1.76 to thereby provide a meniscus shape having its convex surface facing the image plane side and satisfy conditional expression (4). Dw=11.40, Dwm=17.61, Dm=21.78 and Dd=13.66, whereby conditional expressions (2), (9), (10) and (11) are satisfied.

By this arrangement, as shown in FIGS. 12, 13, 14, 15 and 16, spherical aberration, longitudinal chromatic aberration, etc. are corrected well over the entire zoom area.

(Embodiment 2)

Figure 2:
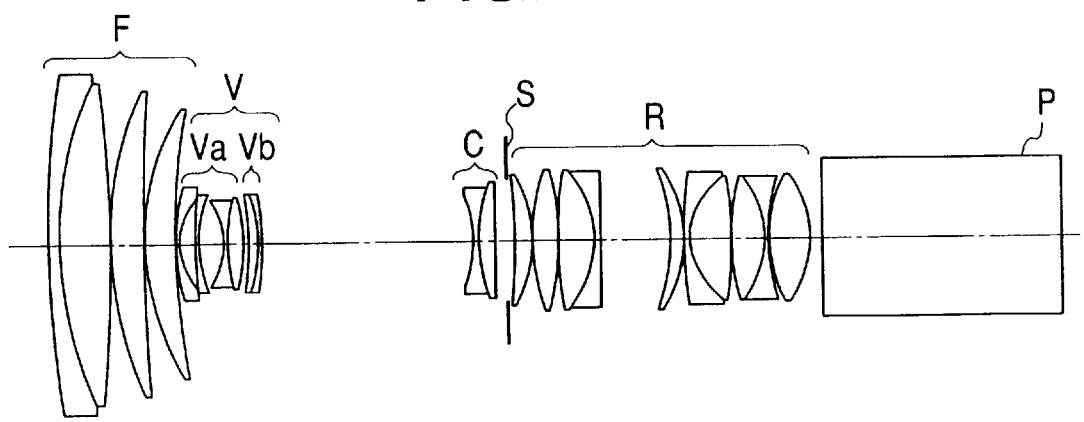
FIG. 2 is a cross-sectional view of the lens of Numerical Value Embodiment 2 of the present invention at the wide angle end thereof.

FIG. 2 is a cross-sectional view of the lens of Numerical Value Embodiment 2 of the present invention at the wide angle end thereof, and the object distance is 3.0 m and the aberrations at the focal lengths fw, fwm, fm, fd and ft (telephoto end) are shown in FIGS. 17, 18, 19, 20 and 21, respectively.

The present embodiment is similar in specification and construction to Numerical Value Embodiment 1, but differs from Numerical Value Embodiment 1 in that the positive lens subunit is comprised of a cemented lens.

The positive lens subunit is a cemented lens comprising a convex lens and a concave lens, and the refractive index and Abbe number of the material of the convex lens are Nt=1.5182 and vt=64.2, respectively, and the refractive index and Abbe number of the material of the concave lens are No=1.5736 and vo=50.8, respectively, to thereby satisfy conditional expressions (7) and (8).

At this time, power sharing is $|f2B/f2A|=18.74$ (conditional expression (1)) and the power of the positive lens subunit is kept proper, and the focal length at the wide angle end is regularized as fw=1, and at the focal length fwm, Im−Ip=−0.164 (conditional expression (3)), and S=−2.80, to thereby provide a meniscus shape having its convex surface facing the image plane side and satisfy conditional expression (4). Dw=16.00, Dwm=24.26, Dm=28.15 and Dd=16.77, to thereby satisfy conditional expressions (2), (9), (10) and (11).

As a result, as shown in FIGS. 17, 18, 19, 20 and 21, spherical aberration, longitudinal chromatic aberration, etc. are corrected well over the entire zoom area.

(Embodiment 3)

Figure 3:
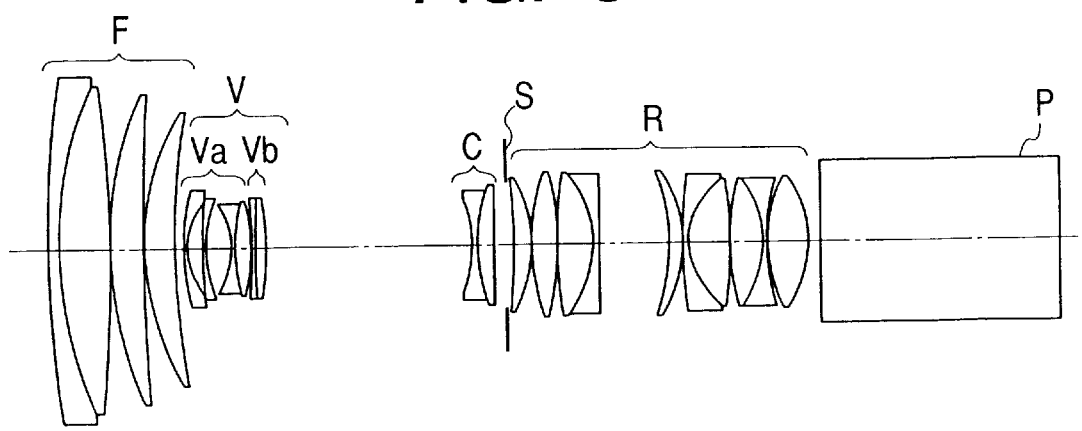
FIG. 3 is a cross-sectional view of the lens of Numerical Value Embodiment 3 of the present invention at the wide angle end thereof.

FIG. 3 is a cross-sectional view of the lens of Numerical Value Embodiment 3 of the present invention at the wide angle end thereof, and the object distance is 3.0 m and the aberrations at the focal lengths fw, fwm, fm, fd and ft (telephoto end) are shown in FIGS. 22, 23, 24, 25 and 26. respectively.

The present embodiment is similar in specification and construction to Numerical Value Embodiment 2. but differs from Numerical Value Embodiment 2 in that the cemented lens of the positive lens subunit comprises, in succession from the object side, a concave lens and a convex lens.

In the positive lens subunit, the refractive index and Abbe number of the material of the concave lens are No=1.5197 and νo=52.4, respectively, and the refractive index and Abbe number of the material of the convex lens are Nt=1.5182 and νt=64.2, respectively, and the refractive indices are substantially equal to each other, that is, No=Nt, but conditional expression (8) is satisfied.

At this time, power sharing is |f2B/f2A|=26.93 (conditional expression (1)) and the power of the positive lens subunit is kept proper, and the focal length at the wide angle end is regularized as fw=1 and at the focal length fwm, Im−Ip=−0.119 (conditional expression (3)), and S=−5.56 to thereby provide a meniscus shape having its convex surface facing the image plane side and satisfy conditional expression (4). Dw=17.50, Dwm=26.10, Dm=31.55 and Dd=20.55, and conditional expressions (2), (9), (10) and (11) are satisfied.

As a result, as shown in FIGS. 22, 23, 24, 25 and 26, spherical aberration, longitudinal chromatic aberration, etc. are corrected well over the entire zoom area.

(Embodiment 4)

Figure 4:
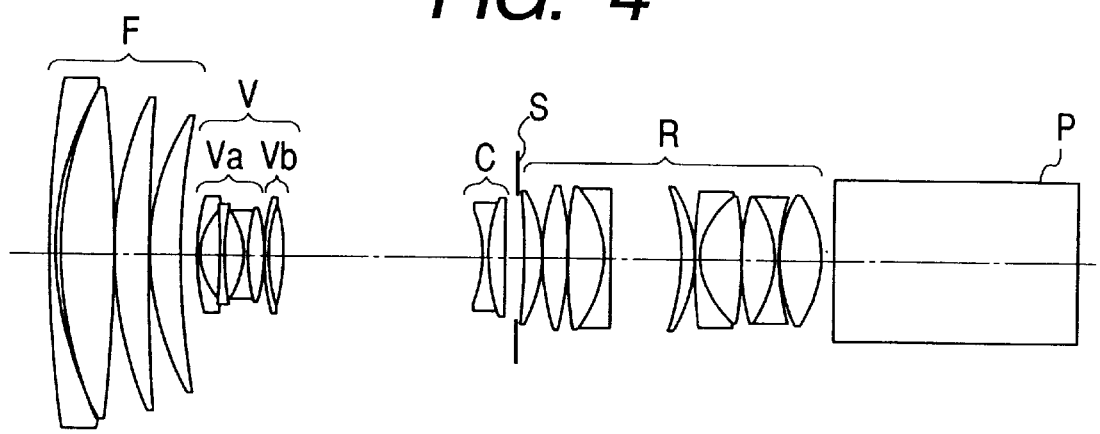
FIG. 4 is a cross-sectional view of the lens of Numerical Value Embodiment 4 of the present invention at the wide angle end thereof.

FIG. 4 is a cross-sectional view of the lens of Numerical Value embodiment 4 of the present invention at the wide angle end thereof, and the object distance is 3.0 m and the aberrations at the focal lengths fw, fwm, fm, fd and ft (telephoto end) are shown in FIGS. 27, 28, 29, 30 and 31, respectively.

In the present embodiment, the zoom lens has a zoom ratio of 15 times and the focal length at the wide angle end is 9.0 mm and F/1.8–2.6, and the construction is similar to that of Numerical Value Embodiment 2.

In the positive lens subunit, the refractive index and Abbe number of the material of the concave lens are No=1.8393 and νo=37.2, respectively, i.e., a high refractive index and low dispersion, and the refractive index and Abbe number of the material of the convex lens are Nt=1.4891 and νt=70.2, respectively, i.e., a low refractive index and low dispersion, and conditional expressions (7) and (8) are satisfied. An spherical surface is provided on the surface r16 to thereby correct the fluctuations of aberrations.

At this time, power sharing is |f2B/f2A|=7.323 (conditional expression (1) and the power of the positive lens subunit is kept proper, and the focal length at the wide angle end is regularized as fw=1, and at the focal length fwm, Im−Ip=−1.365 (conditional expression (3)). By the effect of rendering spherical aberration over by the joined surface and the increase in degree of freedom by the aspherical surface, S=−0.68 (conditional expression (4)) and even if the surface r16 (=Ra) is made into a biconvex shape having its convex surface facing the object side, spherical aberration can be corrected. Dw=11.40, Dwm=17.16, Dm=18.50 and Dd=14.22, thereby satisfying conditional expressions (2), (9), (10) and (11).

As a result, as shown in FIGS. 27, 28, 29, 30 and 31, spherical aberration, longitudinal chromatic aberration, etc. are corrected well over the entire zoom area.

(Embodiment 5)

Figure 5:
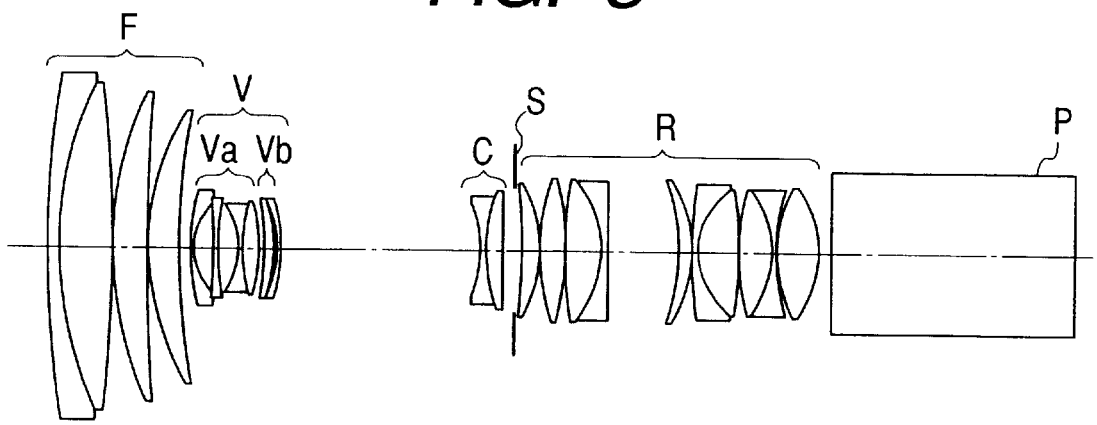
FIG. 5 is a cross-sectional view of the lens of Numerical Value Embodiment 5 of the present invention at the wide angle end thereof.

FIG. 5 is a cross-sectional view of the lens of Numerical Value Embodiment 5 of the present invention at the wide angle end thereof, and the object distance is 3.0 m and the aberrations at the focal lengths fw, fwm, fm, fd and ft (telephoto end) are shown in FIGS. 32, 33, 34, 35 and 36. respectively.

The present embodiment is similar in specification and construction to Numerical Value Embodiment 2. but differs from Numerical Value Embodiment 2 in that the positive lens subunit is comprised not of a cemented lens but two convex and concave single lenses.

The refractive index and Abbe number of the material of the convex lens of the positive lens subunit are Nt=1.5182 and νt=64.2, respectively and the refractive index and Abbe number of the material of the concave lens are No=1.5197 and νo=52.4, respectively, and the refractive indices are substantially equal to each other, that is, No=Nt, but conditional expression (8) is satisfied.

At this time, power sharing is |f2B/f2A|=18.74 (conditional expression (1)) similarly to Numerical Value Embodiment 2 and the power of the positive lens subunit is kept proper, and the focal length at the wide angle end is regularized as fw=1 and at the focal length fwm, Im−Ip=−0.203 (conditional expression (3)). S=−5.71 (conditional expression (4)) and the opposite end surfaces r16 and r19 of the positive lens subunit are made minus and the radius of curvature of the surface r of the concave lens is made smaller than that of the surface r17 to thereby suppress the under spherical aberration in the positive lens subunit. Dw=13.50, Dwm=20.78, Dm=24.28 and Dd=14.51, thereby satisfying conditional expressions (2), (9), (10) and (11).

As a result, as shown in FIGS. 32, 33, 34, 35 and 36, spherical aberration, longitudinal chromatic aberration, etc. are corrected well over the entire zoom area.

(Embodiment 6)

Figure 6:
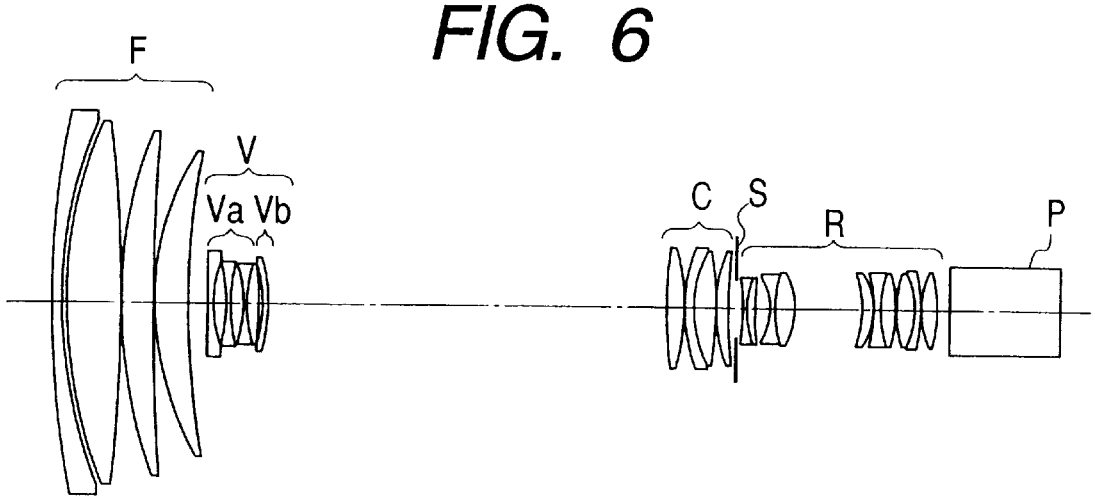
FIG. 6 is a cross-sectional view of the lens of Numerical Value Embodiment 6 of the present invention at the wide angle end thereof.

FIG. 6 is a cross-sectional view of the lens of Numerical Value Embodiment 6 of the present invention at the wide angle end thereof, and the object distance is 10.0 m and the aberrations at the focal lengths fw, fwm, fm, fd and ft (telephoto end) are shown in FIGS. 37, 38, 39, 40 and 41, respectively.

In the present embodiment, the zoom lens has a zoom ratio of 42 times, and the focal length at the wide angle end is 9.0 mm and F/1.75–2.9.

r1–r8 designate a first lens unit F of positive refractive power for focusing. r9–r17 denote a second lens unit V for focal length change, and of these, r9–r15 designate a lens subunit Va of negative refractive power and r16–r17 denote a lens subunit Vb of positive refractive power. r18–r24 designate a third lens unit C of positive refractive power compensating for the fluctuation of the image plane resulting from a focal length change and having the focal length changing action as well, and monotonously movable toward the object side from the wide angle end to the telephoto end. From the wide angle end to the telephoto end, the combined lateral magnification of the second lens unit and the Lateral magnification of the third lens unit have −1 time at a time. r25 denotes a stop S. r26–r41 designate a fourth lens unit R having the imaging action, and r42 and r43 denote a glass block P equivalent to a color resolving prism, a trimming filter or the like.

In the present embodiment, the focal length ft at the telephoto end is very great, i.e., 378 mm, and therefore, the first lens unit is comprised of a negative lens and three positive lenses in order to correct spherical aberration and on-axis chromatic aberration, and particularly the Abbe number of the material of the negative lens is made as small as the order of 27.5, and glass whose Abbe number is very great, i.e., 95.1, is used for two of the positive lenses.

The lens subunit having a strong negative refractive power is comprised of two concave lenses and a cemented lens, and the refractive index of each of these lenses is made as high as 1.77 or greater to thereby suppress the occurrence of aberrations, and yet the difference between the Abbe numbers of the materials of a concave lens and a convex lens constituting the cemented lens is made as great as about 28 to thereby achromatize.

The positive lens subunit is comprised of a convex lens and glass whose Abbe number is as great as about 70.2 is used for this lens to thereby satisfy conditional expression (6), and the correction of on-axis chromatic aberration is taken into consideration.

The third lens unit of positive refractive power is comprised of two convex lenses and a cemented lens comprising a concave lens and a convex lens, and glass of low refractive index and low dispersion whose refractive index and Abbe number are 1.489 and 81.2, respectively, is used as the material of the convex lenses, and glass of high refractive index and high dispersion whose refractive index and Abbe number are 1.855 and 23.8, respectively, is used as the material of the concave lens, and the correction of spherical aberration and on-axis chromatic aberration is taken into consideration.

At this time, power sharing is $|f2B/f2A|=26.70$ (conditional expression (1)) and the power of the positive lens subunit is kept proper, and the focal length at the wide angle end is regularized as fw=1 and at the focal length fwm, Im–Ip=–0.271 (conditional expression (3)), and S=–5.71 to thereby provide a meniscus shape having its convex surface facing the image plane side and satisfy conditional expression (5). Dw=23.00, Dwm=78.85, Dm=86.50 and Dd=40.08, thereby satisfying conditional expressions (2), (9), (10) and (11).

As a result, as shown in FIGS. 37, 38, 39, 40 and 41, spherical aberration, on-axis chromatic aberration, etc. are corrected well over the entire zoom area.

(Embodiment 7)

Figure 7:
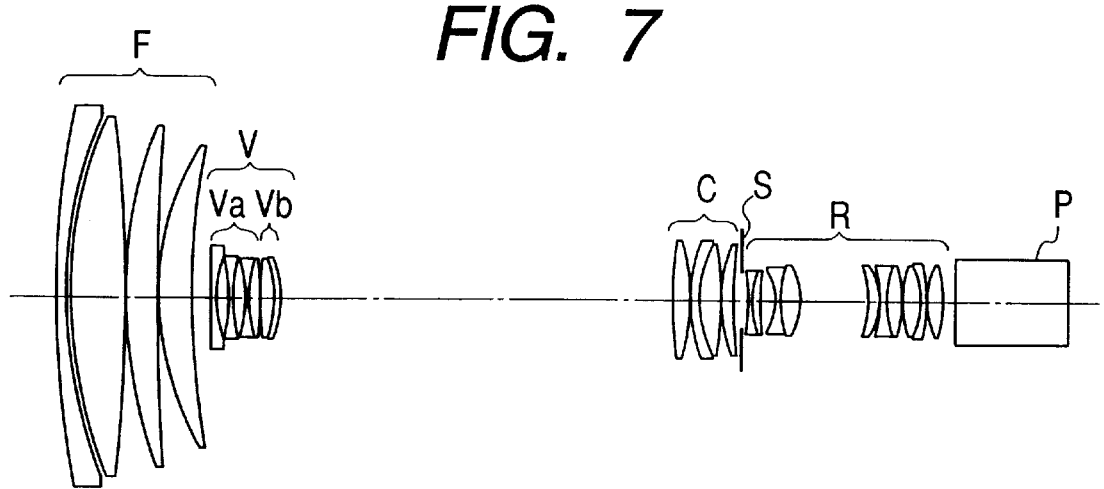
FIG. 7 is a cross-sectional view of the lens of Numerical Value Embodiment 7 of the present invention at the wide angle end thereof.

FIG. 7 is a cross-sectional view of the lens of Numerical Value Embodiment 7 of the present invention at the wide angle end thereof, and the object distance is 10.0 m and the aberrations at the focal lengths fw, fwm, fm, fd and ft (telephoto end) are shown in FIGS. 42, 43, 44, 45 and 46, respectively.

In the present embodiment, the zoom lens has a zoom ratio of 40 times, and the focal length at the wide angle end is 9.0 mm and F/1.75–2.9.

The present embodiment is similar in construction to Numerical Value Embodiment 6, but differs from Numerical Value Embodiment 6 in that the positive lens subunit is comprised of a cemented lens.

The positive lens subunit is a cemented lens comprising a convex lens and a concave lens, and the refractive index and Abbe number of the material of the convex lens are Nt=1.4891 and vt=70.2, respectively, and the refractive index and Abbe number of the material of the concave lens are No=1.8126 and vo=25.4, respectively, to thereby satisfy conditional expressions (7) and (8).

At this time, power sharing is $|f2B/f2A|=8.37$ (conditional expression (1)) and the power of the positive lens subunit is kept proper, and the focal length at the wide angle end is regularized as fw=1 and at the focal length fwm, Im–Ip=–0.366 to thereby satisfy conditional expression (3), and S=–1.32 to thereby provide a meniscus shape having its convex surface facing the image plane side and satisfy conditional expression (5). Dw=20.00, Dwm=52.18, Dm=43.29 and Dd=20.85, thereby satisfying conditional expressions (2), (9), (10) and (11).

As a result, as shown in FIGS. 42, 43, 44, 45 and 46. spherical aberration, on-axis chromatic aberration, etc. are corrected well over the entire zoom area.

(Embodiment 8)

Figure 8:
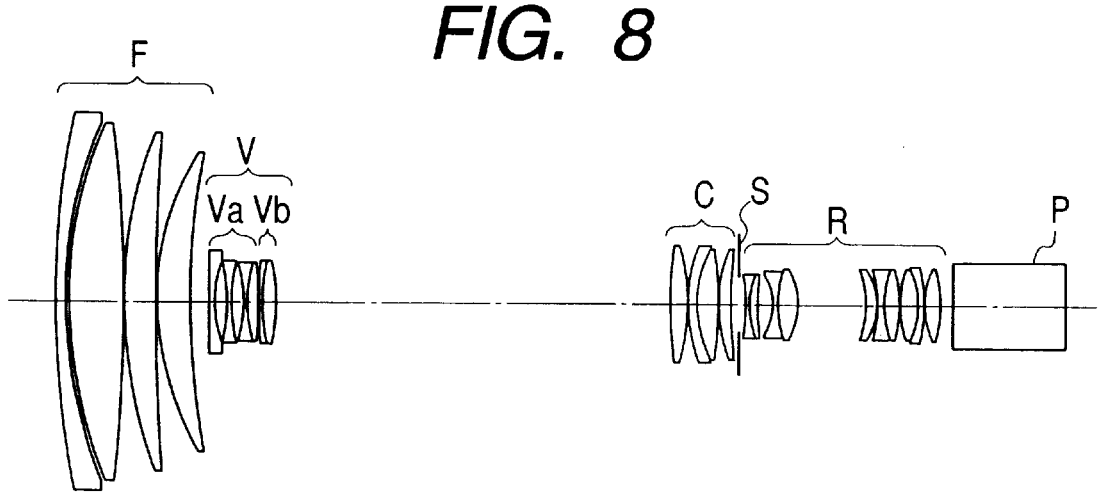
FIG. 8 is a cross-sectional view of the lens of Numerical Value Embodiment 8 of the present invention at the wide angle end thereof.

FIG. 8 is a cross-sectional view of the lens of Numerical Value Embodiment 8 of the present invention at the wide angle end thereof, and the object distance is 10.0 m and the aberrations at the focal lengths fw, fwm, fm, fd and ft (telephoto end) are shown in FIGS. 47, 48, 49, 50 and 51, respectively.

The present embodiment is similar in specification and construction to Numerical Value Embodiment 6, but differs from Numerical Value embodiment 6 in that the positive lens subunit is a cemented lens comprising, in succession from the object side, a concave lens and a convex lens.

In the positive lens subunit, the refractive index and Abbe number of the material of the concave lens are No=1.7762 and vo=49.6, respectively, and the refractive index and Abbe number of the material of the convex lens are Nt=1.5182 and vt=64.2, respectively, thereby satisfying conditional expressions (7) and (8).

At this time, power sharing is $|f2B/f2A|=10.89$ (conditional expression (1)) and the power of the positive lens subunit is kept proper, and the focal length at the wide angle end is regularized as fw=1 and at the focal length fwm, Im–Ip=–0.243 to thereby satisfy conditional expression (3), and S=–0.60 and the surface r16 is a biconvex shape having its loosely convex surface facing the object side to thereby satisfy conditional expression (5). Dw=18.00, Dwm=44.83, Dm=35.74 and Dd=18.63, thereby satisfying conditional expressions (2), (9), (10) and (11).

As a result, as shown in FIGS. 47, 48, 49, 50 and 51. spherical aberration, on-axis chromatic aberration, etc. are corrected well over the entire zoom area.

(Embodiment 9)

Figure 9:
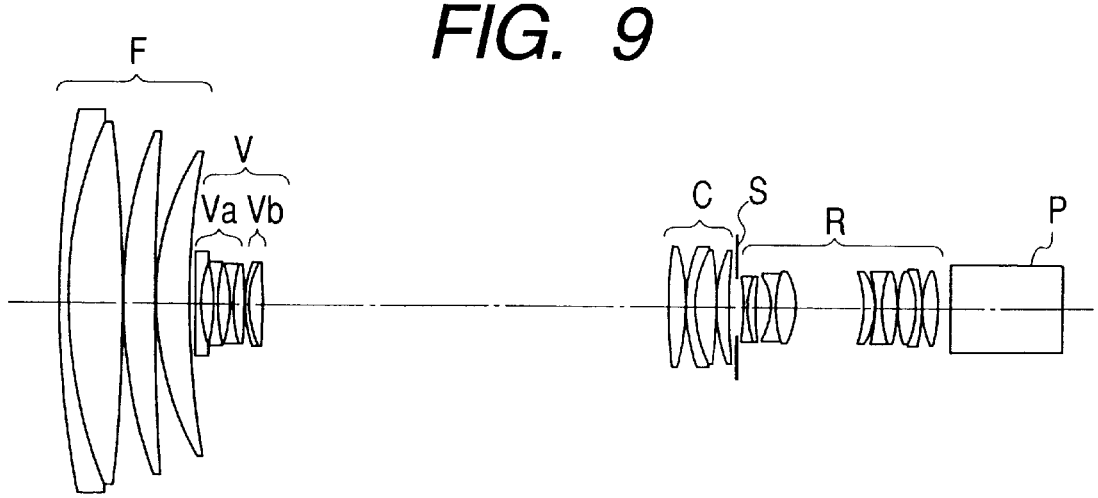
FIG. 9 is a cross-sectional view of the lens of Numerical Value Embodiment 9 of the present invention at the wide angle thereof.

FIG. 9 is a cross-sectional view of the lens of Numerical Value Embodiment 9 of the present invention at the wide angle end thereof, and the object distance is 10.0 m and the aberrations at the focal lengths fw, fwm, fm, fd and ft (telephoto end) are shown in FIGS. 52, 53, 54, 55 and 56, respectively.

The present embodiment is similar in specification and construction to Numerical Value Embodiment 8, in that aspherical surfaces are used on the opposite end surfaces r16 and r18 of the positive lens subunit.

As in Numerical Value Embodiment 8, conditional expressions (7) and (8) are satisfied by the positive lens subunit.

At this time, power sharing is $|f2B/f2A|=9.88$ (conditional expression (1)) and the power of the positive lens subunit is kept proper, and the focal length at the wide angle end is regularized as fw=1 and at the focal length fwm, Im–Ip=–0.260 to thereby satisfy conditional expression (3). Since aspherical surfaces are used on two surfaces and the degree of freedom of aberration correction is increased, S=0.60 (conditional expression (5)) and even if the positive lens subunit is biconvex and the radius of curvature of the surface r16 is made smaller than the radius of curvature of the surface r18, spherical aberration can be corrected. Dw=13.50, Dwm=33.67, Dm=31.12 and Dd=14.92, thereby satisfying conditional expressions (2), (9), (10) and (11).

As a result, as shown in FIGS. 52, 53, 54, 55 and 56, spherical aberration, on-axis chromatic aberration, etc. are corrected well over the entire zoom area.

The numerical value embodiments of the present invention will now be shown below. In the numerical value embodiments, Ri represents the radius of curvature of the ith lens surface from the object side, Di represents the thickness and air space of the ith lens from the object side, Ni and νi represent the refractive index and Abbe number, respectively, of the glass of the ith lens from the object side for e-line (e-ray).

Also, the relations between the aforementioned conditional expressions and the numerical values in the numerical value embodiments are shown in Table 3 below.

When the X-axis is the direction of the optical axis and the H-axis is a direction perpendicular to the optical axis and the direction of travel of light is positive and R is the paraxial radius of curvature and A, B, C, D and E are aspherical surface coefficients, the aspherical shape is represented by the following expression:

$$X = \frac{(1/R)H^2}{1+\sqrt{1-(H/R)^2}} + AH^2 + BH^4 + CH^6 + DH^8 + EH^{10}$$

Numerical Value Embodiment 1 f = 9.0 to 145.11   fno = 1:1.8 to 2.7   2ω = 62.9

| | | | | | | | |
|---|---|---|---|---|---|---|---|
| r 1 = | 217.118 | d 1 = | 2.30 | n 1 = | 1.81265 | ν 1 = | 25.4 |
| r 2 = | 75.931 | d 2 = | 0.07 | | | | |
| r 3 = | 75.717 | d 3 = | 12.20 | n 2 = | 1.49845 | ν 2 = | 81.6 |
| r 4 = | −393.111 | d 4 = | 0.20 | | | | |
| r 5 = | 81.608 | d 5 = | 7.96 | n 3 = | 1.48915 | ν 3 = | 70.2 |
| r 6 = | 1191.271 | d 6 = | 0.20 | | | | |
| r 7 = | 54.094 | d 7 = | 7.00 | n 4 = | 1.69979 | ν 4 = | 55.5 |
| r 8 = | 143.842 | d 8 = | variable | | | | |
| r 9 = | 57.274 | d 9 = | 0.80 | n 5 = | 1.82017 | ν 5 = | 46.6 |
| r10 = | 15.784 | d10 = | 3.71 | | | | |
| r11 = | 1615.831 | d11 = | 0.80 | n 6 = | 1.77621 | ν 6 = | 49.6 |
| r12 = | 32.274 | d12 = | 5.23 | | | | |
| r13 = | −14.536 | d13 = | 0.80 | n 7 = | 1.82017 | ν 7 = | 46.6 |
| r14 = | 33.139 | d14 = | 4.02 | n 8 = | 1.85501 | ν 8 = | 23.9 |
| r15 = | −36.649 | d15 = | variable | | | | |
| r16 = | −137.078 | d16 = | 2.08 | n 9 = | 1.51825 | ν 9 = | 64.2 |
| r17 = | −37.746 | d17 = | variable | | | | |
| r18 = | −25.588 | d18 = | 0.80 | n10 = | 1.79013 | ν10 = | 44.2 |
| r19 = | 26.189 | d19 = | 4.34 | n11 = | 1.85501 | ν11 = | 23.9 |
| r20 = | 369.911 | d20 = | variable | | | | |
| r21 = | stop | d21 = | 1.40 | | | | |
| r22 = | −238.533 | d22 = | 4.40 | n12 = | 1.70557 | ν12 = | 41.2 |
| r23 = | −32.465 | d23 = | 0.20 | | | | |
| r24 = | 49.261 | d24 = | 6.04 | n13 = | 1.48915 | ν13 = | 70.2 |
| r25 = | −66.591 | d25 = | 0.20 | | | | |
| r26 = | 77.972 | d26 = | 7.28 | n14 = | 1.48915 | ν14 = | 70.2 |
| r27 = | −26.079 | d27 = | 1.66 | n15 = | 1.83932 | ν15 = | 37.2 |
| r28 = | −439.655 | d28 = | 15.69 | | | | |
| r29 = | −60.927 | d29 = | 3.50 | n16 = | 1.48915 | ν16 = | 70.2 |
| r30 = | −29.701 | d30 = | 0.20 | | | | |
| r31 = | 91.216 | d31 = | 1.40 | n17 = | 1.81077 | ν17 = | 41.0 |
| r32 = | 17.038 | d32 = | 8.48 | n18 = | 1.51977 | ν18 = | 52.4 |
| r33 = | −152.754 | d33 = | 0.20 | | | | |
| r34 = | 53.396 | d34 = | 7.81 | n19 = | 1.52032 | ν19 = | 59.0 |
| r35 = | −22.534 | d35 = | 1.40 | n20 = | 1.80401 | ν20 = | 42.2 |
| r36 = | 56.305 | d36 = | 0.30 | | | | |
| r37 = | 40.353 | d37 = | 8.36 | n21 = | 1.51977 | ν21 = | 52.4 |
| r38 = | −25.328 | d38 = | 3.00 | | | | |
| r39 = | ∞ | d39 = | 55.50 | n22 = | 1.51825 | ν22 = | 64.2 |
| r40 = | ∞ | | | | | | |

| focal length variable spacing | 9.00 | 18.22 | 35.37 | 96.20 | 145.11 |
|---|---|---|---|---|---|
| d 8 | 0.73 | 18.73 | 30.73 | 41.03 | 43.43 |
| d 15 | 1.10 | 7.31 | 11.48 | 3.35 | 0.35 |
| d 17 | 45.94 | 20.61 | 4.32 | 2.48 | 5.31 |
| d 20 | 2.90 | 4.03 | 4.14 | 3.81 | 1.59 |

Numerical Value Embodiment 2 f = 9.0 to 144.31   fno = 1:1.8 to 2.7   2ω = 62.9

| | | | | | | | |
|---|---|---|---|---|---|---|---|
| r 1 = | 205.096 | d 1 = | 2.30 | n 1 = | 1.81265 | ν 1 = | 25.4 |
| r 2 = | 74.828 | d 2 = | 0.05 | | | | |
| r 3 = | 74.636 | d 3 = | 13.37 | n 2 = | 1.49845 | ν 2 = | 81.6 |
| r 4 = | −452.184 | d 4 = | 0.20 | | | | |
| r 5 = | 82.681 | d 5 = | 8.54 | n 3 = | 1.48915 | ν 3 = | 70.2 |
| r 6 = | 1153.423 | d 6 = | 0.20 | | | | |
| r 7 = | 55.035 | d 7 = | 7.66 | n 4 = | 1.69979 | ν 4 = | 55.5 |
| r 8 = | 155.632 | d 8 = | variable | | | | |
| r 9 = | 70.745 | d 9 = | 0.80 | n 5 = | 1.82017 | ν 5 = | 46.6 |
| r10 = | 17.254 | d10 = | 3.30 | | | | |
| r11 = | 246.034 | d11 = | 0.80 | n 6 = | 1.77621 | ν 6 = | 49.6 |
| r12 = | 31.499 | d12 = | 5.83 | | | | |
| r13 = | −16.015 | d13 = | 0.80 | n 7 = | 1.82017 | ν 7 = | 46.6 |
| r14 = | 28.500 | d14 = | 4.37 | n 8 = | 1.85501 | ν 8 = | 23.9 |
| r15 = | −39.582 | d15 = | variable | | | | |
| r16 = | −96.838 | d16 = | 2.80 | n 9 = | 1.51825 | ν 9 = | 64.2 |
| r17 = | −23.850 | d17 = | 0.80 | n10 = | 1.57366 | ν10 = | 50.8 |
| r18 = | −45.800 | d18 = | variable | | | | |
| r19 = | −25.208 | d19 = | 0.80 | n11 = | 1.79013 | ν11 = | 44.2 |
| r20 = | 27.711 | d20 = | 4.47 | n12 = | 1.85501 | ν12 = | 23.9 |
| r21 = | 489.301 | d21 = | variable | | | | |
| r22 = | stop | d22 = | 1.40 | n13 = | 1.70557 | ν13 = | 41.2 |
| r23 = | −161.820 | d23 = | 4.20 | | | | |
| r24 = | −33.366 | d24 = | 0.20 | n14 = | 1.48915 | ν14 = | 70.2 |
| r25 = | 39.003 | d25 = | 7.51 | | | | |
| r26 = | −69.068 | d26 = | 0.20 | n15 = | 1.48915 | ν15 = | 70.2 |
| r27 = | 66.822 | d27 = | 7.50 | n16 = | 1.83932 | ν16 = | 37.2 |
| r28 = | −27.452 | d28 = | 1.66 | | | | |
| r29 = | 1612.600 | d29 = | 15.69 | n17 = | 1.48915 | ν17 = | 70.2 |
| r30 = | −45.956 | d30 = | 3.05 | | | | |
| r31 = | −28.013 | d31 = | 0.20 | n18 = | 1.83945 | ν18 = | 42.7 |
| r32 = | 84.930 | d32 = | 1.40 | n19 = | 1.51977 | ν19 = | 52.4 |
| r33 = | 16.940 | d33 = | 8.25 | | | | |
| r34 = | −184.267 | d34 = | 0.20 | n20 = | 1.52032 | ν20 = | 59.0 |
| r35 = | 44.265 | d35 = | 8.25 | n21 = | 1.80401 | ν21 = | 42.2 |
| r36 = | −22.509 | d36 = | 1.40 | | | | |
| r37 = | 65.480 | d37 = | 0.30 | n22 = | 1.51977 | ν22 = | 52.4 |
| r38 = | 41.455 | d38 = | 8.96 | | | | |
| r39 = | −26.484 | d39 = | 3.00 | n23 = | 1.51825 | ν23 = | 64.2 |
| r40 = | ∞ | d40 = | 55.50 | | | | |
| r41 = | ∞ | | | | | | |

| focal length variable spacing | 9.00 | 18.01 | 35.41 | 96.74 | 144.31 |
|---|---|---|---|---|---|
| d 8 | 0.27 | 18.27 | 30.27 | 40.27 | 42.57 |
| d 15 | 1.87 | 10.13 | 14.02 | 2.64 | 0.69 |
| d 18 | 45.63 | 18.06 | 1.59 | 3.75 | 5.89 |
| d 21 | 2.90 | 4.20 | 4.79 | 4.02 | 1.52 |

Numerical Value Embodiment 3 f = 9.0 to 143.50   fno = 1:1.8 to 2.7   2ω = 62.9

| | | | | | | | |
|---|---|---|---|---|---|---|---|
| r 1 = | 209.931 | d 1 = | 2.30 | n 1 = | 1.81265 | ν 1 = | 25.4 |
| r 2 = | 75.707 | d 2 = | 0.05 | | | | |
| r 3 = | 75.481 | d 3 = | 13.95 | n 2 = | 1.49845 | ν 2 = | 81.6 |
| r 4 = | −447.364 | d 4 = | 0.20 | | | | |
| r 5 = | 82.540 | d 5 = | 9.07 | n 3 = | 1.48915 | ν 3 = | 70.2 |
| r 6 = | 1629.257 | d 6 = | 0.20 | | | | |
| r 7 = | 55.030 | d 7 = | 7.80 | n 4 = | 1.69979 | ν 4 = | 55.5 |
| r 8 = | 151.779 | d 8 = | variable | | | | |
| r 9 = | 71.811 | d 9 = | 0.80 | n 5 = | 1.82017 | ν 5 = | 46.6 |
| r10 = | 17.536 | d10 = | 3.29 | | | | |
| r11 = | 302.935 | d11 = | 0.80 | n 6 = | 1.77621 | ν 6 = | 49.6 |
| r12 = | 32.441 | d12 = | 5.64 | | | | |
| r13 = | −16.451 | d13 = | 0.80 | n 7 = | 1.82017 | ν 7 = | 46.6 |
| r14 = | 29.608 | d14 = | 4.79 | n 8 = | 1.85501 | ν 8 = | 23.9 |
| r15 = | −39.282 | d15 = | variable | | | | |
| r16 = | −71.392 | d16 = | 0.80 | n 9 = | 1.51977 | ν 9 = | 52.4 |

-continued

Numerical Value Embodiment 3

| | | | | | | |
|---|---|---|---|---|---|---|
| r17 = | 104.250 | d17 = | 2.83 | n10 = | 1.51825 v10 = | 64.2 |
| r18 = | −49.612 | d18 = | variable | | | |
| r19 = | −25.157 | d19 = | 0.80 | n11 = | 1.79013 v11 = | 44.2 |
| r20 = | 27.736 | d20 = | 4.49 | n12 = | 1.85501 v12 = | 23.9 |
| r21 = | 507.123 | d21 = | variable | | | |
| r22 = | stop | d22 = | 1.40 | n13 = | 1.70557 v13 = | 41.2 |
| r23 = | −163.414 | d23 = | 4.13 | | | |
| r24 = | −33.824 | d24 = | 0.20 | n14 = | 1.48915 v14 = | 70.2 |
| r25 = | 38.807 | d25 = | 7.61 | | | |
| r26 = | −68.583 | d26 = | 0.20 | n15 = | 1.48915 v15 = | 70.2 |
| r27 = | 66.349 | d27 = | 7.70 | n16 = | 1.83932 v16 = | 37.2 |
| r28 = | −27.361 | d28 = | 1.66 | | | |
| r29 = | 2623.641 | d29 = | 15.69 | n17 = | 1.48915 v17 = | 70.2 |
| r30 = | −44.669 | d30 = | 3.07 | | | |
| r31 = | −27.846 | d31 = | 0.20 | n18 = | 1.83945 v18 = | 42.7 |
| r32 = | 84.193 | d32 = | 1.40 | n19 = | 1.51977 v19 = | 52.4 |
| r33 = | 16.963 | d33 = | 8.24 | | | |
| r34 = | −177.171 | d34 = | 0.20 | n20 = | 1.52032 v20 = | 59.0 |
| r35 = | 44.535 | d35 = | 8.19 | n21 = | 1.80401 v21 = | 42.2 |
| r36 = | −22.461 | d36 = | 1.40 | | | |
| r37 = | 65.150 | d37 = | 0.30 | n22 = | 1.51977 v22 = | 52.4 |
| r38 = | 41.181 | d38 = | 9.02 | | | |
| r39 = | −26.630 | d39 = | 3.00 | n23 = | 1.51825 v23 = | 64.2 |
| r40 = | ∞ | d40 = | 55.50 | | | |
| r41 = | ∞ | | | | | |

| focal length variable spacing | 9.00 | 18.00 | 35.68 | 96.43 | 143.50 |
|---|---|---|---|---|---|
| d 8 | 0.21 | 18.21 | 30.21 | 40.01 | 42.26 |
| d 15 | 0.51 | 9.11 | 14.56 | 3.56 | 0.47 |
| d 18 | 48.11 | 20.08 | 2.00 | 4.36 | 7.60 |
| d 21 | 2.90 | 4.33 | 4.96 | 3.81 | 1.41 |

Numerical Value Embodiment 4 f = 9.0 to 136.18    fno = 1:1.8 to 2.6    2ω = 62.9

| | | | | | | |
|---|---|---|---|---|---|---|
| r 1 = | 718.571 | d 1 = | 2.30 | n 1 = | 1.81265 v1 = | 25.4 |
| r 2 = | 93.662 | d 2 = | 1.64 | | | |
| r 3 = | 119.778 | d 3 = | 10.34 | n 2 = | 1.49845 v2 = | 81.6 |
| r 4 = | −189.152 | d 4 = | 0.20 | | | |
| r 5 = | 75.511 | d 5 = | 8.66 | n 3 = | 1.48915 v3 = | 70.2 |
| r 6 = | −2302.562 | d 6 = | 0.20 | | | |
| r 7 = | 54.127 | d 7 = | 6.76 | n 4 = | 1.69979 v4 = | 55.5 |
| r 8 = | 148.099 | d 8 = | variable | | | |
| r 9 = | 44.033 | d 9 = | 0.80 | n 5 = | 1.82017 v5 = | 46.6 |
| r10 = | 13.189 | d10 = | 3.39 | | | |
| r11 = | −116.644 | d11 = | 0.80 | n 6 = | 1.77621 v6 = | 49.6 |
| r12 = | 38.830 | d12 = | 4.41 | | | |
| r13 = | −11.930 | d13 = | 0.80 | n 7 = | 1.82017 v7 = | 46.6 |
| r14 = | 26.136 | d14 = | 3.56 | n 8 = | 1.85501 v8 = | 23.9 |
| r15 = | −31.285 | d15 = | variable | | | |
| *r16 = | 132.562 | d16 = | 0.80 | n 9 = | 1.83932 v9 = | 37.2 |
| r17 = | 38.945 | d17 = | 4.20 | n10 = | 1.48915 v10 = | 70.2 |
| r18 = | −25.461 | d18 = | variable | | | |
| r19 = | −28.570 | d19 = | 0.80 | n11 = | 1.79013 v11 = | 44.2 |
| r20 = | 29.821 | d20 = | 3.77 | n12 = | 1.85501 v12 = | 23.9 |
| r21 = | 168.121 | d21 = | variable | | | |
| r22 = | stop | d22 = | 1.40 | n13 = | 1.70557 v13 = | 41.2 |
| r23 = | −230.715 | d23 = | 4.28 | | | |
| r24 = | −35.004 | d24 = | 0.20 | n14 = | 1.48915 v14 = | 70.2 |
| r25 = | 35.880 | d25 = | 7.91 | | | |
| r26 = | −102.662 | d26 = | 0.20 | n15 = | 1.48915 v15 = | 70.2 |
| r27 = | 68.210 | d27 = | 9.63 | n16 = | 1.83932 v16 = | 37.2 |
| r28 = | −30.979 | d28 = | 1.66 | | | |
| r29 = | −338.478 | d29 = | 15.69 | n17 = | 1.48915 v17 = | 70.2 |
| r30 = | −36.438 | d30 = | 2.34 | | | |
| r31 = | −28.925 | d31 = | 0.20 | n18 = | 1.81077 v18 = | 41.0 |
| r32 = | 80.788 | d32 = | 1.40 | n19 = | 1.51977 v19 = | 52.4 |
| r33 = | 16.022 | d33 = | 8.64 | | | |
| r34 = | −147.309 | d34 = | 0.20 | n20 = | 1.52032 v20 = | 59.0 |

-continued

Numerical Value Embodiment 4

| | | | | | | |
|---|---|---|---|---|---|---|
| r35 = | 47.545 | d35 = | 7.49 | n21 = | 1.80401 v21 = | 42.2 |
| r36 = | −20.862 | d36 = | 1.40 | | | |
| r37 = | 62.915 | d37 = | 0.30 | n22 = | 1.51977 v22 = | 52.4 |
| r38 = | 41.070 | d38 = | 9.02 | | | |
| r39 = | −24.916 | d39 = | 3.00 | n23 = | 1.51825 v23 = | 64.2 |
| r40 = | ∞ | d40 = | 55.50 | | | |
| r41 = | ∞ | | | | | |

| focal length variable spacing | 9.00 | 17.73 | 35.66 | 92.42 | 136.18 |
|---|---|---|---|---|---|
| d 8 | 2.72 | 20.02 | 33.22 | 43.52 | 45.92 |
| d 15 | 0.52 | 6.28 | 7.62 | 3.34 | 0.19 |
| d 18 | 45.50 | 22.01 | 7.13 | 1.13 | 2.87 |
| d 21 | 2.90 | 3.34 | 3.68 | 3.65 | 2.66 |

*aspherical surface
aspherical surface coefficient
r16: A = B = E = O
C = 2.27238 × 10$^{-8}$
D = −1.18863 × 10$^{-10}$ Numerical Value Embodiment 5 f = 9.0 to 145.73    fno = 1:1.8 to 2.7    2ω = 62.9

| | | | | | | |
|---|---|---|---|---|---|---|
| r 1 = | 208.097 | d 1 = | 2.30 | n 1 = | 1.81265 v1 = | 25.4 |
| r 2 = | 75.000 | d 2 = | 0.05 | | | |
| r 3 = | 74.739 | d 3 = | 13.46 | n 2 = | 1.49845 v2 = | 81.6 |
| r 4 = | −403.056 | d 4 = | 0.20 | | | |
| r 5 = | 80.480 | d 5 = | 8.56 | n 3 = | 1.48915 v3 = | 70.2 |
| r 6 = | 917.836 | d 6 = | 0.20 | | | |
| r 7 = | 55.296 | d 7 = | 7.42 | n 4 = | 1.69979 v4 = | 55.5 |
| r 8 = | 152.708 | d 8 = | variable | | | |
| r 9 = | 61.947 | d 9 = | 0.80 | n 5 = | 1.82017 v5 = | 46.6 |
| r10 = | 17.608 | d10 = | 3.28 | | | |
| r11 = | 491.589 | d11 = | 0.80 | n 6 = | 1.77621 v6 = | 49.6 |
| r12 = | 28.667 | d12 = | 5.15 | | | |
| r13 = | −16.292 | d13 = | 0.80 | n 7 = | 1.82017 v7 = | 46.6 |
| r14 = | 27.557 | d14 = | 4.36 | n 8 = | 1.85501 v8 = | 23.9 |
| r15 = | −40.399 | d15 = | variable | | | |
| r16 = | −87.567 | d16 = | 2.67 | n 9 = | 1.51825 v9 = | 64.2 |
| r17 = | −26.843 | d17 = | 0.83 | | | |
| r18 = | −22.354 | d18 = | 0.80 | n10 = | 1.51977 v10 = | 52.4 |
| r19 = | −35.649 | d19 = | variable | | | |
| r20 = | −25.182 | d20 = | 0.80 | n11 = | 1.79013 v11 = | 44.2 |
| r21 = | 28.752 | d21 = | 4.28 | n12 = | 1.85501 v12 = | 23.9 |
| r22 = | 520.534 | d22 = | variable | | | |
| r23 = | stop | d23 = | 1.40 | | | |
| r24 = | −177.931 | d24 = | 4.18 | n13 = | 1.70557 v13 = | 41.2 |
| r25 = | −33.376 | d25 = | 0.20 | | | |
| r26 = | 39.242 | d26 = | 7.47 | n14 = | 1.48915 v14 = | 70.2 |
| r27 = | −70.570 | d27 = | 0.20 | | | |
| r28 = | 64.604 | d28 = | 8.03 | n15 = | 1.48915 v15 = | 70.2 |
| r29 = | −27.609 | d29 = | 1.66 | n16 = | 1.83932 v16 = | 37.2 |
| r30 = | 933.598 | d30 = | 15.69 | | | |
| r31 = | −44.425 | d31 = | 3.04 | n17 = | 1.48915 v17 = | 70.2 |
| r32 = | −27.748 | d32 = | 0.20 | | | |
| r33 = | 82.885 | d33 = | 1.40 | n18 = | 1.83945 v18 = | 42.7 |
| r34 = | 16.810 | d34 = | 8.25 | n19 = | 1.51977 v19 = | 52.4 |
| r35 = | −167.784 | d35 = | 0.20 | | | |
| r36 = | 45.309 | d36 = | 7.91 | n20 = | 1.52032 v20 = | 59.0 |
| r37 = | −22.312 | d37 = | 1.40 | n21 = | 1.80401 v21 = | 42.2 |
| r38 = | 65.977 | d38 = | 0.30 | | | |
| r39 = | 41.498 | d39 = | 9.09 | n22 = | 1.51977 v22 = | 52.4 |
| r40 = | −26.211 | d40 = | 3.00 | | | |

-continued

Numerical Value Embodiment 5

| | | | | | | |
|---|---|---|---|---|---|---|
| r41 = | ∞ | d41 = | 55.50 | n23 = | 1.51825 | v23 = 64.2 |
| r42 = | ∞ | | | | | | focal length

| variable spacing | 9.00 | 18.10 | 35.86 | 97.68 | 145.73 |
|---|---|---|---|---|---|
| d 8 | 0.40 | 18.40 | 30.40 | 40.40 | 42.70 |
| d 15 | 1.01 | 8.28 | 11.79 | 2.01 | 0.42 |
| d 19 | 46.22 | 19.49 | 3.26 | 3.98 | 5.82 |
| d 22 | 2.90 | 4.35 | 5.07 | 4.13 | 1.58 |

Numerical Value Embodiment 6 f = 9.0 to 378.65   fno = 1:1.75 to 2.9   $2\omega$ = 62.9

| | | | | | | |
|---|---|---|---|---|---|---|
| r 1 = | 322.408 | d 1 = | 5.50 | n 1 = | 1.76168 | v1 = 27.5 |
| r 2 = | 180.274 | d 2 = | 1.78 | | | |
| r 3 = | 178.335 | d 3 = | 25.40 | n 2 = | 1.43496 | v2 = 95.1 |
| r 4 = | −1047.890 | d 4 = | 0.30 | | | |
| r 5 = | 211.704 | d 5 = | 15.30 | n 3 = | 1.43496 | v3 = 95.1 |
| r 6 = | 2413.835 | d 6 = | 0.30 | | | |
| r 7 = | 139.720 | d 7 = | 14.28 | n 4 = | 1.49845 | v4 = 81.6 |
| r 8 = | 416.349 | d 8 = | variable | | | |
| r 9 = | 524.472 | d 9 = | 2.00 | n 5 = | 1.82017 | v5 = 46.6 |
| r10 = | 42.624 | d10 = | 7.60 | | | |
| r11 = | −80.700 | d11 = | 1.80 | n 6 = | 1.77621 | v6 = 49.6 |
| r12 = | 72.517 | d12 = | 5.27 | | | |
| r13 = | −91.866 | d13 = | 1.80 | n 7 = | 1.77621 | v7 = 49.6 |
| r14 = | 48.545 | d14 = | 5.93 | n 8 = | 1.93306 | v8 = 21.3 |
| r15 = | −467.030 | d15 = | variable | | | |
| r16 = | −128.478 | d16 = | 3.65 | n 9 = | 1.48915 | v9 = 70.2 |
| r17 = | −90.194 | d17 = | variable | | | |
| r18 = | 121.226 | d18 = | 8.55 | n10 = | 1.49845 | v10 = 81.6 |
| r19 = | −86.480 | d19 = | 0.30 | | | |
| r20 = | 88.406 | d20 = | 2.50 | n11 = | 1.85501 | v11 = 23.9 |
| r21 = | 44.982 | d21 = | 10.31 | n12 = | 1.49845 | v12 = 81.6 |
| r22 = | −230.602 | d22 = | 0.30 | | | |
| r23 = | 57.568 | d23 = | 6.92 | n13 = | 1.48915 | v13 = 70.2 |
| r24 = | 285.771 | d24 = | variable | | | |
| r25 = | stop | d25 = | 2.24 | | | |
| r26 = | −115.381 | d26 = | 1.80 | n14 = | 1.79013 | v14 = 44.2 |
| r27 = | 25.736 | d27 = | 4.53 | n15 = | 1.81265 | v15 = 25.4 |
| r28 = | 94.728 | d28 = | 6.53 | | | |
| r29 = | −23.480 | d29 = | 1.60 | n16 = | 1.73234 | v16 = 54.7 |
| r30 = | 39.480 | d30 = | 9.56 | n17 = | 1.59911 | v17 = 39.2 |
| r31 = | 24.387 | d31 = | 30.29 | | | |
| r32 = | −56.492 | d32 = | 5.20 | n18 = | 1.48915 | v18 = 70.2 |
| r33 = | −28.055 | d33 = | 0.20 | | | |
| r34 = | −50.067 | d34 = | 2.20 | n19 = | 1.79013 | v19 = 44.2 |
| r35 = | 37.464 | d35 = | 7.34 | n20 = | 1.50349 | v20 = 56.4 |
| r36 = | −56.934 | d36 = | 1.10 | | | |
| r37 = | 85.675 | d37 = | 8.66 | n21 = | 1.55099 | v21 = 45.8 |
| r38 = | −26.487 | d38 = | 2.20 | n22 = | 1.81265 | v22 = 25.4 |
| r39 = | −80.383 | d39 = | 0.20 | | | |
| r40 = | 60.920 | d40 = | 6.24 | n23 = | 1.51977 | v23 = 52.4 |
| r41 = | −64.786 | d41 = | 5.00 | | | |
| r42 = | ∞ | d42 = | 50.00 | n24 = | 1.51825 | v24 = 64.2 |
| r43 = | ∞ | | | | | | focal length

| variable spacing | 9.00 | 22.91 | 58.62 | 179.36 | 378.65 |
|---|---|---|---|---|---|
| d 8 | 3.74 | 63.24 | 101.74 | 121.44 | 128.94 |
| d 15 | 2.14 | 57.99 | 65.64 | 19.22 | 2.13 |
| d 17 | 174.41 | 54.49 | 2.49 | 10.10 | 0.64 |
| d 24 | 3.30 | 7.86 | 13.72 | 32.83 | 51.87 |

Numerical Value Embodiment 7 f = 9.0 to 359.67   fno = 1:1.75 to 2.9   $2\omega$ = 62.9

| | | | | | | |
|---|---|---|---|---|---|---|
| r 1 = | 252.428 | d 1 = | 5.50 | n 1 = | 1.76168 | v1 = 27.5 |
| r 2 = | 154.780 | d 2 = | 1.76 | | | |
| r 3 = | 153.011 | d 3 = | 26.00 | n 2 = | 1.43496 | v2 = 95.1 |
| r 4 = | −1588.744 | d 4 = | 0.30 | | | |
| r 5 = | 264.615 | d 5 = | 11.67 | n 3 = | 1.43496 | v3 = 95.1 |
| r 6 = | 2203.678 | d 6 = | 0.30 | | | |
| r 7 = | 132.304 | d 7 = | 14.68 | n 4 = | 1.49845 | v4 = 81.6 |
| r 8 = | 422.091 | d 8 = | variable | | | |
| r 9 = | 439.445 | d 9 = | 2.00 | n 5 = | 1.82017 | v5 = 46.6 |
| r10 = | 35.093 | d10 = | 7.64 | | | |
| r11 = | −60.788 | d11 = | 1.80 | n 6 = | 1.77621 | v6 = 49.6 |
| r12 = | 80.442 | d12 = | 5.52 | | | |
| r13 = | −51.762 | d13 = | 1.80 | n 7 = | 1.77621 | v7 = 49.6 |
| r14 = | 59.597 | d14 = | 5.42 | n 8 = | 1.93306 | v8 = 21.3 |
| r15 = | −160.506 | d15 = | variable | | | |
| r16 = | −394.814 | d16 = | 5.11 | n 9 = | 1.48915 | v9 = 70.2 |
| r17 = | −45.891 | d17 = | 1.80 | n10 = | 1.81265 | v10 = 25.4 |
| r18 = | −54.910 | d18 = | variable | | | |
| r19 = | 214.350 | d19 = | 8.59 | n11 = | 1.49845 | v11 = 81.6 |
| r20 = | −75.861 | d20 = | 0.30 | | | |
| r21 = | 89.872 | d21 = | 2.50 | n12 = | 1.85501 | v12 = 23.9 |
| r22 = | 50.882 | d22 = | 10.54 | n13 = | 1.49845 | v13 = 81.6 |
| r23 = | −192.468 | d23 = | 0.30 | | | |
| r24 = | 62.121 | d24 = | 6.33 | n14 = | 1.48915 | v14 = 70.2 |
| r25 = | 361.084 | d25 = | variable | | | |
| r26 = | stop | d26 = | 2.43 | | | |
| r27 = | −103.320 | d27 = | 1.80 | n15 = | 1.79013 | v15 = 44.2 |
| r28 = | 33.001 | d28 = | 4.34 | n16 = | 1.81265 | v16 = 25.4 |
| r29 = | 137.665 | d29 = | 6.67 | | | |
| r30 = | −24.862 | d30 = | 1.60 | n17 = | 1.73234 | v17 = 54.7 |
| r31 = | 39.511 | d31 = | 10.02 | n18 = | 1.59911 | v18 = 39.2 |
| r32 = | −25.976 | d32 = | 27.27 | | | |
| r33 = | −69.879 | d33 = | 4.70 | n19 = | 1.48915 | v19 = 70.2 |
| r34 = | −29.569 | d34 = | 0.20 | | | |
| r35 = | −56.690 | d35 = | 2.20 | n20 = | 1.79013 | v20 = 44.2 |
| r36 = | 34.021 | d36 = | 7.63 | n21 = | 1.50349 | v21 = 56.4 |
| r37 = | −57.671 | d37 = | 1.10 | | | |
| r38 = | 121.776 | d38 = | 7.85 | n22 = | 1.55099 | v22 = 45.8 |
| r39 = | −26.585 | d39 = | 2.20 | n23 = | 1.81265 | v23 = 25.4 |
| r40 = | −87.415 | d40 = | 0.20 | | | |
| r41 = | 68.561 | d41 = | 5.85 | n24 = | 1.51977 | v24 = 52.4 |
| r42 = | −55.590 | d42 = | 5.00 | | | |
| r43 = | ∞ | d43 = | 50.00 | n25 = | 1.51825 | v25 = 64.2 |
| r44 = | ∞ | | | | | | focal length

| variable spacing | 9.00 | 23.99 | 57.31 | 181.22 | 359.67 |
|---|---|---|---|---|---|
| d 8 | 3.50 | 67.50 | 103.50 | 123.00 | 129.35 |
| d 15 | 0.88 | 33.07 | 24.18 | 1.73 | 0.12 |
| d 18 | 175.65 | 79.08 | 45.84 | 25.01 | 0.49 |
| d 25 | 3.30 | 3.69 | 9.81 | 33.59 | 53.38 |

Numerical Value Embodiment 8 f = 9.0 to 378.05   fno = 1:1.75 to 2.9   $2\omega$ = 62.9

| | | | | | | |
|---|---|---|---|---|---|---|
| r 1 = | 226.496 | d 1 = | 5.50 | n 1 = | 1.76168 | v1 = 27.5 |
| r 2 = | 146.041 | d 2 = | 1.55 | | | |
| r 3 = | 144.757 | d 3 = | 25.11 | n 2 = | 1.43496 | v2 = 95.1 |
| r 4 = | −3122.507 | d 4 = | 0.30 | | | |
| r 5 = | 273.595 | d 5 = | 11.52 | n 3 = | 1.43496 | v3 = 95.1 |
| r 6 = | 4200.517 | d 6 = | 0.30 | | | |
| r 7 = | 136.633 | d 7 = | 13.58 | n 4 = | 1.49845 | v4 = 81.6 |
| r 8 = | 429.148 | d 8 = | variable | | | |
| r 9 = | 530.480 | d 9 = | 2.00 | n 5 = | 1.82017 | v5 = 46.6 |
| r10 = | 38.869 | d10 = | 7.26 | | | |
| r11 = | −78.639 | d11 = | 1.80 | n 6 = | 1.77621 | v6 = 49.6 |
| r12 = | 78.715 | d12 = | 4.99 | | | |
| r13 = | −68.231 | d13 = | 1.80 | n 7 = | 1.77621 | v7 = 49.6 |

-continued

Numerical Value Embodiment 8

| r14 = | 46.875 | d14 = | 5.82 | n 8 = | 1.93306 | v8 = | 21.3 |
| r15 = | −553.115 | d15 = | variable | | | | |
| r16 = | 379.132 | d16 = | 1.80 | n 9 = | 1.77621 | v9 = | 49.6 |
| r17 = | 89.593 | d17 = | 6.49 | n10 = | 1.51825 | v10 = | 64.2 |
| r18 = | −94.986 | d18 = | variable | | | | |
| r19 = | 159.079 | d19 = | 8.90 | n11 = | 1.49845 | v11 = | 81.6 |
| r20 = | −76.724 | d20 = | 0.30 | | | | |
| r21 = | 85.213 | d21 = | 2.50 | n12 = | 1.85501 | v12 = | 23.9 |
| r22 = | 46.582 | d22 = | 10.98 | n13 = | 1.49845 | v13 = | 81.6 |
| r23 = | −231.103 | d23 = | 0.30 | | | | |
| r24 = | 59.757 | d24 = | 7.34 | n14 = | 1.48915 | v14 = | 70.2 |
| r25 = | 265.186 | d25 = | variable | | | | |
| r26 = | stop | d26 = | 2.39 | | | | |
| r27 = | −98.164 | d27 = | 1.80 | n15 = | 1.79013 | v15 = | 44.2 |
| r28 = | 28.441 | d28 = | 4.42 | n16 = | 1.81265 | v16 = | 25.4 |
| r29 = | 115.232 | d29 = | 6.53 | | | | |
| r30 = | −23.707 | d30 = | 1.60 | n17 = | 1.73234 | v17 = | 54.7 |
| r31 = | 37.887 | d31 = | 9.80 | n18 = | 1.59911 | v18 = | 39.2 |
| r32 = | −25.116 | d32 = | 27.89 | | | | |
| r33 = | −69.030 | d33 = | 5.13 | n19 = | 1.48915 | v19 = | 70.2 |
| r34 = | −29.080 | d34 = | 0.20 | | | | |
| r35 = | −55.763 | d35 = | 2.20 | n20 = | 1.79013 | v20 = | 44.2 |
| r36 = | 37.272 | d36 = | 7.65 | n21 = | 1.50349 | v21 = | 56.4 |
| r37 = | −54.294 | d37 = | 1.10 | | | | |
| r38 = | 98.853 | d38 = | 7.58 | n22 = | 1.55099 | v22 = | 45.8 |
| r39 = | −28.012 | d39 = | 2.20 | n23 = | 1.81265 | v23 = | 25.4 |
| r40 = | −94.808 | d40 = | 0.20 | | | | |
| r41 = | 68.271 | d41 = | 5.66 | n24 = | 1.51977 | v24 = | 52.4 |
| r42 = | −63.115 | d42 = | 5.00 | | | | |
| r43 = | ∞ | d43 = | 50.00 | n25 = | 1.51825 | v25 = | 64.2 |
| r44 = | ∞ | | | | | | |

| focal length variable spacing | 9.00 | 22.97 | 58.55 | 181.29 | 378.05 |
|---|---|---|---|---|---|
| d 8 | 3.40 | 62.40 | 99.40 | 120.60 | 128.23 |
| d 15 | 0.49 | 27.32 | 18.23 | 1.12 | 0.36 |
| d 18 | 178.06 | 88.65 | 52.26 | 26.89 | 0.31 |
| d 25 | 3.30 | 6.87 | 15.35 | 36.64 | 56.34 |

Numerical Value Embodiment 9 f = 9.0 to 378.14  fno = 1:1.75 to 2.9  2ω = 62.9

| r 1 = | 213.820 | d 1 = | 5.50 | n 1 = | 1.76168 | v1 = | 27.5 |
| r 2 = | 140.472 | d 2 = | 0.80 | | | | |
| r 3 = | 140.638 | d 3 = | 23.35 | n 2 = | 1.43496 | v2 = | 95.1 |
| r 4 = | 11368.276 | d 4 = | 0.30 | | | | |
| r 5 = | 236.872 | d 5 = | 11.14 | n 3 = | 1.43496 | v3 = | 95.1 |
| r 6 = | 1256.331 | d 6 = | 0.30 | | | | |
| r 7 = | 143.791 | d 7 = | 13.65 | n 4 = | 1.49845 | v4 = | 81.6 |
| r 8 = | 577.391 | d 8 = | variable | | | | |
| r 9 = | 246.140 | d 9 = | 2.00 | n 5 = | 1.82017 | v5 = | 46.6 |
| r10 = | 37.382 | d10 = | 7.76 | | | | |
| r11 = | −82.661 | d11 = | 1.80 | n 6 = | 1.77621 | v6 = | 49.6 |
| r12 = | 67.535 | d12 = | 5.13 | | | | |
| r13 = | −79.425 | d13 = | 1.80 | n 7 = | 1.77621 | v7 = | 49.6 |
| r14 = | 43.670 | d14 = | 6.75 | n 8 = | 1.93306 | v8 = | 21.3 |
| r15 = | −2838.080 | d15 = | variable | | | | |
| *r16 = | 73.257 | d16 = | 1.80 | n 9 = | 1.77621 | v9 = | 49.6 |

-continued

Numerical Value Embodiment 9

| r17 = | 35.412 | d17 = | 7.42 | n10 = | 1.51825 | v10 = | 64.2 |
| *r18 = | −292.764 | d18 = | variable | | | | |
| r19 = | 151.538 | d19 = | 8.64 | n11 = | 1.49845 | v11 = | 81.6 |
| r20 = | −94.399 | d20 = | 0.30 | | | | |
| r21 = | 82.511 | d21 = | 2.50 | n12 = | 1.85501 | v12 = | 23.9 |
| r22 = | 48.012 | d22 = | 11.51 | n13 = | 1.49845 | v13 = | 81.6 |
| r23 = | −198.507 | d23 = | 0.30 | | | | |
| r24 = | 65.711 | d24 = | 7.86 | n14 = | 1.48915 | v14 = | 70.2 |
| r25 = | 656.575 | d25 = | variable | | | | |
| r26 = | stop | d26 = | 2.26 | | | | |
| r27 = | −117.343 | d27 = | 1.80 | n15 = | 1.79013 | v15 = | 44.2 |
| r28 = | 29.160 | d28 = | 4.13 | n16 = | 1.81265 | v16 = | 25.4 |
| r29 = | 84.628 | d29 = | 6.85 | | | | |
| r30 = | −23.828 | d30 = | 1.60 | n17 = | 1.73234 | v17 = | 54.7 |
| r31 = | 48.328 | d31 = | 9.35 | n18 = | 1.59911 | v18 = | 39.2 |
| r32 = | −25.043 | d32 = | 33.98 | | | | |
| r33 = | −83.322 | d33 = | 5.19 | n19 = | 1.48915 | v19 = | 70.2 |
| r34 = | −31.208 | d34 = | 0.20 | | | | |
| r35 = | −55.290 | d35 = | 2.20 | n20 = | 1.79013 | v20 = | 44.2 |
| r36 = | 42.258 | d36 = | 7.02 | n21 = | 1.50349 | v21 = | 56.4 |
| r37 = | −61.206 | d37 = | 1.10 | | | | |
| r38 = | 113.866 | d38 = | 7.49 | n22 = | 1.55099 | v22 = | 45.8 |
| r39 = | −27.590 | d39 = | 2.20 | n23 = | 1.81265 | v23 = | 25.4 |
| r40 = | −80.256 | d40 = | 0.20 | | | | |
| r41 = | 57.430 | d41 = | 5.72 | n24 = | 1.51977 | v24 = | 52.4 |
| r42 = | −78.256 | d42 = | 5.00 | | | | |
| r43 = | ∞ | d43 = | 50.00 | n25 = | 1.51825 | v25 = | 64.2 |
| r44 = | ∞ | | | | | | |

| focal length variable spacing | 9.00 | 22.90 | 58.59 | 180.78 | 378.14 |
|---|---|---|---|---|---|
| d 8 | 2.86 | 60.36 | 98.36 | 120.16 | 127.80 |
| d 15 | 0.54 | 20.71 | 18.16 | 1.96 | 0.26 |
| d 18 | 177.08 | 94.99 | 51.93 | 25.89 | 0.36 |
| d 25 | 3.30 | 7.72 | 15.33 | 35.76 | 55.36 |

*aspherical surface aspherical surface coefficient r16: A = B = E = O r18: A = B = E = O

C = 5.39339 × 10$^{-9}$

C = 4.83785 × 10$^{-9}$

D = −4.42113 × 10$^{-12}$

D = −2.15482 × 10$^{-12}$

TABLE 3

| Conditional expression | Numerical value Embodiment 1 | Numerical value Embodiment 2 | Numerical value Embodiment 3 | Numerical value Embodiment 4 | Numerical value Embodiment 5 |
|---|---|---|---|---|---|
| (1) \|f2B/f2A\| | 10.28 | 18.74 | 26.93 | 7.32 | 18.74 |
| (3) Im–Ip | −0.188 | −0.164 | −0.119 | −1.365 | −0.203 |
| (4) S | −1.76 | −2.80 | −5.56 | −0.68 | −5.71 |

TABLE 3-continued

| (5) | | | | | |
|---|---|---|---|---|---|
| (2) Dw | 11.40 | 16.00 | 17.50 | 11.40 | 13.50 |
| (2) Dwm (D) | 17.61 | 24.26 | 26.10 | 17.16 | 20.78 |
| (2) Dm (D) | 21.78 | 28.15 | 31.55 | 18.50 | 24.28 |
| (2) Dd (D) | 13.66 | 16.77 | 20.55 | 14.22 | 14.51 |

| | Conditional expression | Numerical value Embodiment 6 | Numerical value Embodiment 7 | Numerical value Embodiment 8 | Numerical value Embodiment 9 |
|---|---|---|---|---|---|
| (1) | \|f2B/f2A\| | 26.70 | 8.37 | 10.89 | 9.88 |
| (3) | Im–Ip | −0.271 | −0.366 | −0.243 | −0.260 |
| (4) | S | −5.71 | −1.32 | −0.60 | 0.60 |
| (5) | | | | | |
| (2) | Dw | 23.00 | 20.00 | 18.00 | 13.50 |
| (2) | Dwm (D) | 78.85 | 52.18 | 44.83 | 33.67 |
| (2) | Dm (D) | 86.50 | 43.29 | 35.74 | 31.12 |
| (2) | Dd (D) | 40.08 | 20.85 | 18.63 | 14.92 |

According to the present invention, as described above, there can be achieved a so-called four-unit zoom lens of a great aperture ratio and a high variable power ratio at the wide angle end, in which floating is applied to a variator (second lens unit) for focal length change and various elements, such as the lens construction and power sharing thereof, are appropriately set to thereby well correct the fluctuations of aberrations, particularly the fluctuation of spherical aberration, resulting from a focal length change, and which has high optical performance over the entire variable power range.

Particularly, in the present invention, the second lens unit is comprised of two lens subunits, i.e., a lens subunit of negative refractive power and a lens subunit of positive refractive power, and a moving method of changing the relative position thereof to thereby change the position of the third lens unit as well and be capable of suppressing the fluctuations of aberrations of zooming to the utmost. This is accomplished by prescribing power sharing, aberration coefficients, lens shape, etc. so as to satisfy predetermined conditions, whereby the fluctuations of aberrations, particularly the fluctuation of spherical aberration resulting from a focal length change, can be corrected well.

Also, at the zoom position on the wide angle side, the lens subunit of positive refractive power is moved more greatly toward the image plane side relative to the lens subunit of negative refractive power, whereby longitudinal chromatic aberration, lateral chromatic abberation, astigmatism, curvature of image field, etc. at intermediate zoom positions (fwm and fm) become correctable and the height of the off-axis principal ray in the first lens unit can be made low and therefore, a decrease in the diameter of the fore lens is made possible thereby making it possible to construct a zoom lens that is compact and light weight. Further, if the surplus in aberration correction according to the present invention is appropriated for the strengthening of the refractive power of each lens unit and a decrease in a number of lenses, the light weight and compact lens system will also become possible.

What is claimed is:

1. A zoom lens comprising, in succession from the object side:
   a first lens unit of positive refractive power fixed during a focal length change;
   a second lens unit of negative refractive power for focal length change;
   a third lens unit for correcting the fluctuation of the image plane resulting from the focal length change; and
   a fixed fourth lens unit of positive refractive power,
   said second lens unit having a lens subunit of negative refractive power and a lens subunit of positive refractive power, characterized in that said lens subunits are moved at different speeds during the focal length change from the wide angle end to the telephoto end, and when the focal lengths of said negative lens subunit and said positive lens subunit are defined as f2A and f2B, respectively, $$7.3 < |f2B/f2A| < 27$$

is satisfied, and when the focal length of the entire system at the wide angle end is defined as fw and the principal point spacings of the negative lens subunit and the positive lens subunit at the wide angle end and any zoom position are defined as DW and D, respectively, and the zoom ratio is defined as Z, at a zoom position Z0 in at least a portion within the zoom range of a focal length fm ($=fw \times Z^{1/2}$) from the wide angle end, the condition that $$DW < D$$

is satisfied, and when at said zoom position Z0, the sum total of the tertiary spherical aberration coefficients of said positive lens subunit and said third lens unit is defined as Im and the sum total of the tertiary spherical aberration coefficients of said negative lens subunit and said third lens unit, when said negative lens subunit is fixed at said zoom position Z0 and the positional relation of said positive lens subunit relative to said negative lens subunit is a state at the wide angle end and a case where the fluctuation of the image plane is corrected by said third lens unit is prescribed, is defined as Ip, the condition that $$Im - Ip < 0$$

is satisfied.

2. A zoom lens according to claim 1, wherein said third lens unit has negative refractive power, and when the radii of curvature of the object side first lens surface and the image plane side last lens surface of said positive lens subunit are defined as Ra and Rb, respectively, and $$S = \frac{Rb + Ra}{Rb - Ra},$$

the condition that $$-5.72 < S < -0.66$$

is satisfied.

3. A zoom lens according to claim 1, wherein said third lens unit has positive refractive power, and during the focal length change from the wide angle end to the telephoto end, the lateral magnifications of said second lens unit and said third lens unit have −1 time at a time, and when the radii of curvature of the object side first lens surface and the image plane side last lens surface of said positive lens subunit are defined as Ra and Rb, respectively, and $$S = \frac{Rb + Ra}{Rb - Ra},$$

the condition that $$-5.88 < S < 0.6$$

is satisfied.

4. A zoom lens according to claim 1, wherein said positive lens subunit comprises a single positive lens, and when the Abbe number of the material of said positive lens of said positive lens subunit is defined as ν2B, the condition that $$60 < \nu 2B$$

is satisfied.

5. A zoom lens according to claim 1, wherein said positive lens subunit comprises a cemented lens comprising a positive lens and a negative lens joined together, and when the refractive indices of the materials of said positive lens and said negative lens of said cemented lens are defined as Nt and No, respectively, the condition that $$Nt < No$$

is satisfied.

6. A zoom lens according to claim 1, wherein said positive lens subunit comprises a cemented lens comprising a positive lens and a negative lens joined together, and when the Abbe numbers of the materials of said positive lens and said negative lens of said cemented lens are defined as νt and νo, respectively, the condition that $$11.5 < \nu t - \nu o$$

is satisfied.

7. A zoom lens according to claim 1, said positive lens subunit having a single positive lens and a single negative lens.

\* \* \* \* \*

UNITED STATES PATENT AND TRADEMARK OFFICE
CERTIFICATE OF CORRECTION

PATENT NO. : 6,084,721

DATED : July 4, 2000

INVENTOR(S) : TERASAWA

It is certified that error appears in the above-identified patent and that said Letters Patent is hereby corrected as shown below:

COLUMN 2:
Line 30, "telephote" should read --telephoto--.

COLUMN 5:
Line 44, "angle" should read --angle end--.

COLUMN 7:
Line 36, "functuation" should read --fluctuation--.

COLUMN 9:
Line 24, "defined" should read --defined as--.
Line 54, "and" (second occurrence) should be deleted.

COLUMN 13:
Line 26, "are" should read --is--.

COLUMN 15:
Line 46, "An" should read --A--.

COLUMN 16:
Line 21, "Im-Ip=-" should read --Im-Ip=--.
Line 22, "0.203" should read -- -0.203--.
Line 54, "Lateral" should read --lateral--.

COLUMN 17:
Line 61, "Im-Ip=-" should read --Im-Ip=--.
Line 62, "0.366" should read -- -0.366--.

UNITED STATES PATENT AND TRADEMARK OFFICE
CERTIFICATE OF CORRECTION

PATENT NO. : 6,084,721

DATED : July 4, 2000

INVENTOR(S) : TERASAWA

It is certified that error appears in the above-identified patent and that said Letters Patent is hereby corrected as shown below:

COLUMN 18:
Line 13, "embodiment" should read --Embodiment--.
Line 52, "Im-Ip=-" should read --Im-Ip=---.
Line 53, "0.260" should read -- -0.260--.

COLUMN 23:
Line 49, " r31= 24.387" should read --r31= -24.387--.

COLUMN 27:
Line 56, "lenses, the light weight" should read --lenses, a lightweight--.

COLUMN 28:
Line 24, "characterized in that" should read --wherein--.
Line 51, "negative" should read --positive--.

Signed and Sealed this

Eighth Day of May, 2001

Attest:

NICHOLAS P. GODICI

*Attesting Officer*    Acting Director of the United States Patent and Trademark Office